United States Patent [19]
Okamoto et al.

[11] Patent Number: 5,812,757
[45] Date of Patent: Sep. 22, 1998

[54] PROCESSING BOARD, A COMPUTER, AND A FAULT RECOVERY METHOD FOR THE COMPUTER

[75] Inventors: Hiromu Okamoto; Takashi Tanabe; Kaoru Abe; Tsugihiko Ohno; Toyohito Hatashita; Toshihisa Kamemaru; Norihisa Kaneda; Mamoru Katoh; Masakazu Soga, all of Kanagawa, Japan

[73] Assignee: Mitsubishi Denki Kabushiki Kaisha, Tokyo, Japan

[21] Appl. No.: 675,951

[22] Filed: Jul. 5, 1996

Related U.S. Application Data

[63] Continuation of Ser. No. 321,822, Oct. 5, 1994, abandoned.

[30] Foreign Application Priority Data

| Oct. 8, 1993 | [JP] | Japan | 5-253281 |
| Oct. 25, 1993 | [JP] | Japan | 5-266622 |
| Dec. 27, 1993 | [JP] | Japan | 5-332662 |

[51] Int. Cl.[6] .................................................. G06F 11/16
[52] U.S. Cl. ........................... 395/182.09; 395/185.1; 371/36
[58] Field of Search .................. 395/182.08, 182.09, 395/182.1, 182.11, 185.1, 184.01, 185.02, 182.02; 371/36, 68.3, 67.1

[56] References Cited

U.S. PATENT DOCUMENTS

| 4,453,215 | 6/1984 | Reid | 395/575 |
| 4,589,066 | 5/1986 | Lam et al. | 395/182.1 |
| 4,710,926 | 12/1987 | Brown et al. | 395/182.06 |
| 4,751,639 | 6/1988 | Corcoran et al. | 395/575 |
| 4,757,442 | 7/1988 | Sakata | 395/182.09 |
| 4,817,091 | 3/1989 | Katzman et al. | 371/11.3 |
| 4,907,232 | 3/1990 | Harer et al. | 371/11.3 |
| 4,980,857 | 12/1990 | Walter et al. | 395/575 |
| 4,984,239 | 1/1991 | Suzuki et al. | 371/18 |
| 5,020,059 | 5/1991 | Gorin et al. | 371/11.3 |
| 5,068,851 | 11/1991 | Bruckert et al. | 371/16.5 |
| 5,086,429 | 2/1992 | Gray et al. | 395/182.1 |
| 5,123,099 | 6/1992 | Shibata et al. | 371/10.1 |
| 5,179,708 | 1/1993 | Piepho | 395/725 |
| 5,276,862 | 1/1994 | McCulley et al. | 371/16.5 |
| 5,295,258 | 3/1994 | Jewett et al. | 395/575 |
| 5,325,517 | 6/1994 | Baker et al. | 395/182.09 |
| 5,339,404 | 8/1994 | Vandling, III | 395/182.1 |
| 5,446,910 | 8/1995 | Kennedy et al. | 395/800 |

FOREIGN PATENT DOCUMENTS

| 0496506 | 7/1992 | European Pat. Off. | G06F 11/16 |

OTHER PUBLICATIONS

Chean et al., "A Taxonomy of Reconfiguration Techniques for Faultolerantt Processor Arrays", ieee cOMPUTER, pp. 55–69, Jan. 1990.

Blough et al., "Diagnosis and Repair in Multiprocessor Systems" IEEE Trans. on Computers, vol. 42, No. 2, pp. 205–217, Feb. 1993.

*Primary Examiner*—Joseph Palys
*Attorney, Agent, or Firm*—Wolf, Greenfield & Sacks, P.C.

[57] ABSTRACT

A fault recovery process of a computer is provided for removing a fault from the system as soon as possible, minimizing the secondary fault and improving the availability of the system. In a reliable computer, which includes a system bus, a main memory connected to the system bus, and at least one processing board connected to the system bus, at least one processing board executes the same instructions by n (n>=3) processing units having cache memories respectively. When one of the processing units of the processing board becomes faulty, the other processing units continue executing the processes, which are being executed by the faulty processing board, and then, the processes to be registered in the faulty processing board, are succeeded by other processing boards.

19 Claims, 46 Drawing Sheets

COMPARATOR 41

ERROR DETECTOR 8

FIG.7

TABLE FOR EXPLAINING EMBODIMENT 1

| LIN. | 31 A | 32 B | 33 C | 51 AB | 52 BC | 53 CA | 7 V | 9 ES | 10 EM |
|---|---|---|---|---|---|---|---|---|---|
| ① | 0 0 | 0 0 | 0 0 | 1 | 1 | 1 | 0 0 | 0 | 0 |
| ② | 1 0 | 1 0 | 1 0 | 1 | 1 | 1 | 1 0 | 0 | 0 |
| ③ | 1 0 | 0 1 | 0 1 | 0 | 1 | 0 | 0 1 | 1 | 0 |
| ④ | 1 0 | 0 1 | 0 0 | 0 | 0 | 0 | 0 0 | 0 | 1 |
| ⑤ | 0 1 | 1 0 | 1 1 | 0 | 0 | 0 | 0 0 | 0 | 1 |
| ⑥ | 1 1 | 1 1 | 1 0 | 1 | 0 | 0 | 1 1 | 1 | 0 |
| ⑦ | 1 1 | 0 1 | 1 0 | 0 | 0 | 0 | 0 0 | 0 | 1 |

FIG.10

| LINE | INPUT SIGNAL | | | OUTPUT SIGNAL | | |
|---|---|---|---|---|---|---|
| | AB | BC | CA | EA* | EB* | EC* |
| ① | 1 | 1 | 1 | 1 | 1 | 1 |
| ② | 1 | 1 | 0 | – | – | – |
| ③ | 1 | 0 | 1 | – | – | – |
| ④ | 1 | 0 | 0 | 1 | 1 | 0 |
| ⑤ | 0 | 1 | 1 | – | – | – |
| ⑥ | 0 | 1 | 0 | 0 | 1 | 1 |
| ⑦ | 0 | 0 | 1 | 1 | 0 | 1 |
| ⑧ | 0 | 0 | 0 | – | – | – |

– : MULTIPLE ERROR

| | START (INITIALIZE) | STOP | PROCESS AFTER TIME HAS PASSED |
|---|---|---|---|
| ISOLATION OBSERVING TIMER T1 | SETTING OF ISOLATE FLAG BY NORMAL CPU | RESETTING OF ISOLATE FLAG BY CPU UNDER ISOLATED MODE | FINISH ISOLATED MODE AND RETURN TO NORMAL MODE BY INTERRUPT |
| ISOLATING TIMER T2 | SETTING OF ISOLATE FLAG BY NORMAL CPU | PASSING OF T2 | INTERRUPT TO CPU UNDER ISOLATED MODE AND RESETTING OF ISOLATE FLAG BY CPU UNDER ISOLATED MODE |
| ISOLATING INTERVAL TIMER T3 | SETTING OF ISOLATE FLAG BY NORMAL CPU | PASSING OF T3 | INTERRUPT TO NORMAL CPUs AND SETTING OF ISOLATE FLAG BY NORMAL CPU |

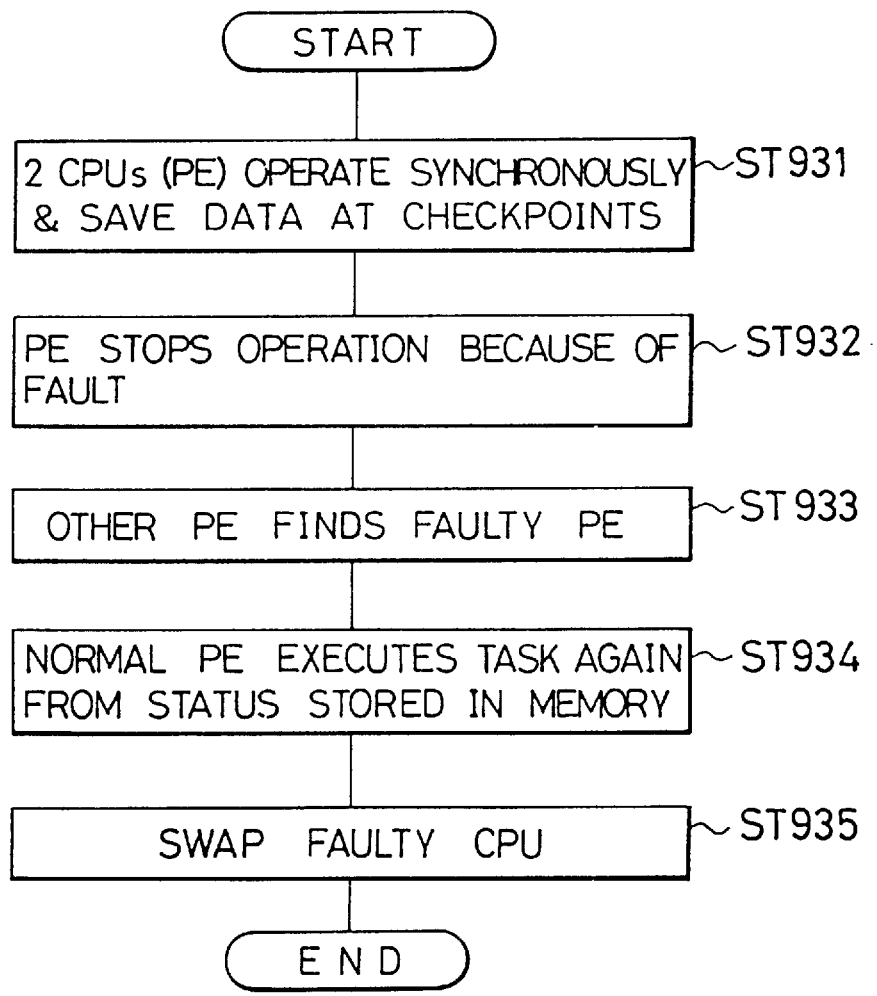

PROCESSING BOARD, A COMPUTER, AND A FAULT RECOVERY METHOD FOR THE COMPUTER

This application is a continuation of application Ser. No. 08/321,822, filed Oct. 5, 1994, now abandoned.

BACKGROUND OF THE INVENTION

1. Field of the Invention

This invention relates to a fault tolerant computer which can continue processing as a system in case of a fault. The invention relates to a recovery method of a processing board which enables a faulty processing board to continue processing.

2. Description of the Related Art

In the field of the fault tolerant computer, generally, modules which have a high failure rate are multiplexed to get a high reliability. Even if one of the modules becomes faulty, normal processing can be done by the other modules. A high reliability can be got by multiplexing processing units, memories, buses and so on, and adding various kinds of error check function to these modules.

A conventional system, for example, is Japanese Unexamined Patent Application SHO 58-137054 "A reliable digital data processor" (Japanese patent application corresponding to U.S. Pat. No. 4,654,857) shown in FIG. 43 and explained below. Each two processing boards, main memories, and input/output controllers are configured as a pair of duplicate boards (four processors are needed as a whole), which are called "pair & spare". The operations of these two boards are completely synchronized.

Two outputs are compared, one for each board, and when they do not match, a board is judged to be faulty and is suspended from accessing the outside bus.

The spare board is informed of the fault of the board, and the operation may be continued by the spare board.

The specific features of the configuration of this system are described below.

(1) Pair & Spare Method

Each functional unit has a back up redundancy partner, and each functional unit has error detecting ability in itself.

(2) Bus Configuration

Functional units are connected by duplicate buses (A and B) and a common bus (X). The operation of each functional unit is completely synchronized with the partner by the same clock phase supplied by the common bus (X). Each functional unit and its partner output the same signals to duplicate buses simultaneously.

(3) Bus Observing Mechanism

The duplicate buses are observed on the memory board (i.e., compare data and check a parity).

(4) Power Supply

The power supply is duplicated, and power is supplied to duplicate CPUs and memories through respective paths. An independent direct current/direct current (DC/DC) converter is mounted on each CPU board, memory board and IOC. A power detector and a clamping circuit are provided to suspend each output to the bus when the power becomes lower than a predetermined value.

FIG. 44 shows a flow of the fault recovery procedure according to the above system. Step ST901 shows a normal operation. Namely, operations of the partners are completely synchronized. As a result, both partners input and output data to the duplicate buses respectively.

At step ST902, duplicate internal modules of each partner are compared to check the normal operation by the comparator. If a fault is detected by this check, the faulty partner suspends its output to the bus. As a result, the other partner, which operates normally, continues processing at step ST904 as shown in the figure.

At step ST905, the faulty module is swapped. At step ST905, the status of the normally operating module is copied to the newly swapped module. Then, two partners operate completely synchronously. Namely, the status of the system returns to the normal operation of the step ST901.

Another example of a conventional system is "Computer having the fault-tolerant function", Japanese Unexamined Patent Application HEI 2-202636 (Japanese patent application corresponding to U.S. Pat. No. 5,193,175), shown in FIG. 45 and described below. Three independent processing boards operate by clocks, each of which has the same frequency but has different phase. Each processing board includes a processor, a cache memory, and a local memory.

Operations of the processing boards are synchronized in case of access to the global memory and overflow of the counter, i.e., so called cycle counter. When one of the processing boards becomes faulty, the board is disconnected from the outside bus, and operation is continued by the other processing boards.

The followings are specialties of the configuration of this system.

(1) TMR (Triple Modular Redundancy) Method

One BPU (Basic Processing Unit) includes three CPU boards, each of which has a CPU, a cache memory, and a local memory. Each CPU board operates by each independent clock phase.

(2) Bus Configuration

A bus is provided for connecting the CPU board with the global memory. Duplicate input/output buses are provided for connecting the global memory with the IO processors.

(3) Majority Circuit

A majority circuit is provided with the global memory board, and the operation of the CPU is checked in case of access to the global memory.

(4) Synchronizing Method

Each of the CPUs and the global memories operate asynchronously (each has a different clock). Loose synchronization is adapted. For example, the operation of the ahead CPU is stalled in case of access to the global memory and overflow of the cycle counter.

FIG. 46 shows a flow of fault recovery procedure according to this system. At step ST911, three CPUs operate independently using each local memory of each processing board. Each processing board operates independently by each clock phase, which has the same frequency but different phase. The operations of the processing boards are loosely synchronized. At step ST912, the majority circuit checks for a fault of the processing board in case of access to the outside global memory of these CPUs. If one of the processing boards is judged to be faulty by the majority circuit, the faulty CPU board is disconnected at step ST913.

At step ST914, the operation is continued by the other two CPU boards.

At step ST915, the faulty CPU board is swapped.

At step ST916, the normal CPU copies the data stored in the internal local memory and transfers them to the global memory.

At step ST917, all CPUs execute a software reset and the executions of the instructions by three CPUs are synchronized. All CPUs copy the data from the global memory by this software reset. Three CPUs continue processing using the common data from the global memory.

For other examples of conventional systems, Japanese Unexamined Patent Application HEI 4-241039 "A reliable computer system" and Japanese Unexamined Patent Application HEI 4-241038 "Recovery method of a reliable computer" are shown in FIG. 47 and explained below. One processing board has three processors and the operations of these processors are synchronized completely using the same clock.

Two outputs of the processors are selected by a majority circuit and bus gates, and the outputs are transmitted to the outside.

An access path from the processor to a cache memory or to the outside is determined by opening/closing the internal bus gates according to the result selected by the majority circuit and the bus gates. When one of the processing boards becomes faulty, the rest of the configuration continues processing. A new board is inserted and the process is succeeded by the new board.

The followings are specialties of the configuration according to this system.

(1) TPR Method

Three CPUs and two cache memories are mounted on one board, a so-called BPU. The CPU located in the middle operates as a checker. Outputs from two CPUs are detected as normal and selected by the majority.

(2) Bus Configuration

Internal buses are provided for connecting CPUs, cache memories, and input/output interface. Duplicate system buses are provided for connecting BPU boards, main memories, and IOCs.

(3) Recovery Method

Multi-processor configuration is basically provided for succeeding a process of a faulty BPU. BPU board is swapped as a recovery unit to avoid a failure, which may be caused by swapping CPUs.

FIG. 48 shows a flow of the fault recovery procedure according to the above system.

At step ST921, the operations of three CPUs are completely synchronized on the same board. In this system, the majority circuit detects the same outputs of two CPUs, and then selects and transmits the outputs of two CPUs to the outside.

At step ST922, a normal CPU is detected based on the majority result and a parity check. When one CPU is detected to be faulty at the step ST922, the faulty CPU and/or the faulty cache memory is disconnected at step ST923. At step ST924, the rest of the configuration continues operating.

At step ST925, the executing task is saved in the main memory. At step ST926, a new CPU board is added and the executing task, saved in the main memory at the step ST925, is succeeded and executed by the new CPU board.

And at step ST927, the operation of the faulty CPU board is suspended and the processing board is removed.

FIGS. 49(a), 49(b) and 49(c) show three examples of the status before and after the recovery of a system fault according to the above three conventional systems.

In the figures, each A, B, . . . , F shows CPU. Blocks drawn with heavy continuous lines show boards having CPUs. FIG. 49(a) shows the status before and after the fault recovery by the first conventional system, FIG. 49(b) shows the status by the second conventional system, and FIG. 49(c) shows the status by the third conventional system. In each example, the CPU A is supposed to be faulty. In FIG. 49(a), the processing board having faulty CPU A is swapped for a new processing board having CPU E, and F. In FIG. 49(b), the processing board having faulty CPU A is swapped for a new processing board having CPU D. In FIG. 49(c), the processing board having faulty CPU A swapped for a new processing board having CPU D, E, and F.

FIG. 50 shows another conventional system, Japanese Unexamined Patent Application SHO 59-160899 "Memory back up system" (Japanese patent application corresponding to U.S. Pat. No. 282,629). In this method, two processing boards are provided, which are similar to the processing boards of the above conventional system, Japanese Unexamined Patent Application SHO 58-137054. A board PE mounts two processing units, which operate synchronously by the same clock phase, and two outputs are compared. When the comparison result does not match, the processing board is judged to be faulty and is disconnected from the external bus. Another processing board succeeds the process from the previous flush point of the cache memory.

The followings are the specialties of the configuration according to this system.

(1) Pair & Back-up Method

The board PE has two CPUs, a cache memory, and two interface units. CPUs on each board PE operate synchronously by the same clock phase and two outputs are compared. When a fault is detected, the PE stops the operation.

(2) Check Point Saving

Each PE updates a status block in the memory at prefixed intervals (100 mS). At every switching point of tasks, all status of the PE is saved in the memory.

(3) Status of Memory

The memory bus and the memory are duplicated and each unit can detect an error. One bus is used and one memory is accessed for one transaction. After writing in one memory, another memory is accessed to write. Namely, at least one memory always stores the normal status.

FIG. 51 shows a flow of fault recovery procedure according to this system. At step ST931, two CPUs (on PE) operate synchronously, and the status is saved every check point as described above. At step ST932, if the comparison result does not match in PE, the operation of the PE is suspended. At step ST933, the other normal PE finds the faulty PE. At step ST934, the status saved in the memory by the faulty PE at the check point is transferred to the normal PE. And the normal PE succeeds the process from the read out status. Then, at step ST935, the faulty CPU board is swapped.

Problems to be Solved by the Invention

Various kinds of systems and methods have been proposed and used for providing a fault tolerant computer, which can continue normal operation even if one unit becomes faulty, but there are still problems to be solved as follows.

In the above conventional system, Japanese Unexamined Patent Application SHO 58-137054, the process scheduled to the faulty processing board does not need to be succeeded in case of swapping the faulty CPU (the fault causes little impact or influence to S/W). Two processing boards are provided as "pair & spare" (four processors are used as a whole) and the operations are completely synchronized.

The clock has to pass between the boards, so that the clock frequency is difficult to improve. For another disadvantage, each processing board needs two CPUs, thus four processors are needed in total. When a pair board becomes faulty, the degradation is performed by the spare board. However, in this system, swapping time for a new board reduces the availability of the system.

In another above-mentioned conventional system, Japanese Unexamined Patent Application HEI 2-202636, three independent processing boards are provided (i.e., operating by clocks having the same frequency, but different phase). The operations of the CPUs are loosely synchronized. Thus, the processing boards can be easily applied to a high speed operation and each CPU can be swapped by CPU unit.

The following are problems of this conventional system. An overhead for accessing the memories occurs because three CPUs have to synchronize with each other, which complicates the logic. To eliminate this overhead, each CPU mounts a local memory, which increases the number of the memories. The global memory includes the majority circuit and is tightly connected with each CPU, so that another global memory cannot be added. Recovery time of the faulty CPU is likely long because of the increased amount of H/W in each CPU. Furthermore, the processing board cannot be a multi-processor configuration because the cache memory cannot keep the coherency. When one of the processing boards becomes faulty, the degradation can be performed by the other boards, but subsequent swapping time for a new board reduces the availability of the system.

In other above-mentioned conventional methods, Japanese Unexamined Patent Applications HEI 4-241038 and HEI 4-241039, only two cache memories are needed. Three processors are mounted on the same processing board, and the operations of the processors are completely synchronized by the same clock phase.

However, more than two bit errors in the cache memory may cause a malfunction of the system because there are only two cache memories. There are still other problems as follows: In case of an access to the cache memory, increasing the operating speed may cause the CPU to wait even when the cache is hit because of an overhead for switching the buses from the majority result. When the checker CPU becomes faulty, the operation can be continued, but the operation cannot be guaranteed to be normal. When one unit of the processing board becomes faulty, the degradation is performed by the rest of the configuration, but swapping time for a new board reduces the availability of the system.

In another above-mentioned conventional method, Japanese Unexamined Patent Application SHO 59-160899, two processing boards, each of which has two processors, operate by independent clocks. When one of the processors becomes faulty, the contents, which were saved in the main memory at the previous flush timing point of the cache memory based on the check point saving method, is transferred to the other processing board to succeed the process of the faulty processing board. By this method, the processing board only needs error detecting ability by itself and the configuration of H/W becomes simple.

Yet, there are some problems: There is a processing overhead and the execution of the process has to return to and start from the check point, and the load of S/W becomes significant (e.g., the OS needs to be modified to achieve this function). The faulty PE is detected by the program with the other processing boards every 100 mS, so that the method cannot be suitable to real-time processing. In addition, a spare processing board is needed for swapping the whole board even if one processing unit becomes faulty, consequently adding cost.

SUMMARY OF THE INVENTION

To solve the above and other problems, an object of this invention is to provide a fault tolerant computer which can continue the operation as a computer system and can operate in high frequency even if one module becomes faulty. The fault tolerant computer does not require complicated logic for synchronizing the processing boards to each other.

Another object of the invention is to improve reliability of the whole processing unit including the cache memory.

Another object of the invention is to provide a system and a method for getting a high availability of the system not only by multiplexing units but reducing the recovery time as much as possible.

Another object of the invention is to provide a recovery method, by which the faulty unit can be disconnected as early as possible, to minimize the secondary fault and to get a high availability as a system.

Another object of the invention is to provide a method which enables to swap the faulty processing unit by a unit to reduce the maintenance cost.

A processing board according to the invention may include the following:

(a) x (x>=3) number of processing units for executing the same instructions, each of which has a processor and a cache memory;

(b) a majority unit for selecting one processing unit and interfacing with external units; and (c) a processor bus for connecting the processing units and the majority unit.

The processing board may further include a clock for supplying a same clock signal to the processing units.

In the above processing board, the majority unit is duplexed.

In the processing board, one embodiment of the majority unit may include the following:

(a) a majority circuit for comparing signals from the processing units and selecting one signal as a majority signal; and (b) a function circuit for interfacing the majority signal selected by the majority circuit with the external units.

In the processing board, the above majority circuit may further include a freeze circuit for responding response signals to the processing units when the function circuit is ready to receive a next majority signal from the majority circuit.

In the processing board, one embodiment of the majority circuit may include the following:

(a) a compare mechanism for receiving a plurality of x signals from the processing units as input signals, making a plurality of signal combinations of y (x>y>=2) input signals, and comparing the y input signals in each of the signal combinations; and (b) a select mechanism for receiving the x input signals and selecting one input signal as the majority signal based on a comparison result of the compare mechanism.

In the processing board, the majority circuit may further include an error recognition mechanism for recognizing an existence of a faulty processing unit among the x processing units based on the comparison result of the compare mechanism.

In the processing board, the signal may have n bits, and the compare mechanism may include a plurality of comparison circuits, corresponding to the combinations of the y input signals, each of which compares corresponding bits of the y input signals for detecting a correspondence of the y input signals, and the compare circuits may output a comparison result showing the correspondence of the y input signals.

In the processing board, the freeze circuit may include the following:

(a) an error detect mechanism for detecting a faulty processing unit based on the comparison result of the compare mechanism;

(b) a connect control mechanism for not responding to the response signal of the faulty processing unit, detected by the error detect mechanism, such that the execution of the instruction in the faulty processing unit is temporally suspended; and (c) a notify mechanism for notifying a detection of the faulty processing unit to other normal processing units.

In the processing board, one embodiment of the freeze circuit may include an isolate mechanism for isolating one processing unit from other processing units for a single operation.

In the processing board, a faulty processing unit may have a diagnostic mechanism for executing self diagnosis and memorizing the diagnostic result under the single operation by the isolate mechanism. In addition, in the processing board, the normal processing units may have analyze mechanism for analyzing the diagnostic result memorized by the faulty processing unit.

The processing board may further include a synchronize mechanism for synchronizing the faulty processing unit with the normal processing units based on an analysis result of the analyze mechanism.

The processing board may further include a self diagnose mechanism for diagnosing each processing unit in turn under the single operation by the isolate mechanism when the processing board is reset.

In the processing board, another embodiment of the freeze circuit may further include a diagnosis watch mechanism for terminating the self diagnosis of the faulty processing unit by canceling the single operation under the isolate mechanism when the self diagnosis is not completed in a predefined time.

The processing board may have a memory mechanism for storing the diagnostic result in a memory space. The function circuit may include a check circuit for checking and limiting the memory space when the diagnostic mechanism writes the diagnosis result in the memory mechanism.

In the processing board, another embodiment of the freeze circuit may include dividing the execution of the self diagnosis according to the diagnostic mechanism into a plurality of executions.

A computer according to the invention may include the following:
- (a) the processing board having:
  - (a1) x (x>=3) number of processing units for executing same instructions, each of which has a processor and a cache memory;
  - (a2) a majority unit for selecting one processing unit and interfacing with external units; and
  - (a3) a processor bus for connecting the processing units and the majority unit.
- (b) a system bus coupled to the majority unit;
- (c) a main memory coupled to the system bus;
- (d) an input/output bus adaptor coupled to the system bus;
- (e) an input/output bus coupled to the input/output bus adaptor; and
- (f) an input/output unit coupled to the input/output bus.

The processing board may further include the following:
- (a) dual system bus coupled to the majority unit;
- (b) dual main memories coupled to the dual system bus; and
- (c) dual input/output bus adaptor coupled to the dual system bus.

According to the invention, a computer may include the following:
- (a) processing board having:
  - (a1) x (x>=3) number of processing units for executing same instructions, each processing unit having a processor and a cache memory;
  - (a2) a majority unit for selecting one processing unit and interfacing with external units;
  - (a3) a processor bus for connecting the processing units and the majority unit;
  - (a4) dual system bus coupled to the majority unit;
  - (a5) dual main memories coupled to the dual system bus; and
  - (a6) dual input/output bus adaptor coupled to the dual system bus;
- (b) an input/output bus coupled to the dual input/output bus adaptor; and
- (c) an input/output unit coupled to the input/output bus.

According to the invention, a recovery method is provided for a processing board, having a plurality of x (x>=3) processing units for executing same instructions, each processing unit having a processor and a cache memory, the processing board also having a majority unit for selecting one processing unit and interfacing with external units. The method may include the following steps:
- (a) detecting a faulty processing unit by the majority unit and suspending the operation of the faulty processing unit detected;
- (b) executing a self diagnosis in the faulty processing unit; and
- (c) synchronizing the faulty processing unit with other processing units to recover the suspended operation of the faulty processing unit based on the diagnosis result.

In the above recovery method, the processing board may have a control register for designating connections of the processing units, and the detecting step may have the step of setting the control register so as to suspend the operation of the faulty processing unit by disconnecting the faulty processing unit.

In the recovery method, the processing board may have a control register for designating connections of the processing units, and the executing step may have the step of setting the control register so that the faulty processing unit operates alone to execute the self diagnosis by connecting the faulty processing unit only.

In the recovery method, the processing board may have a control register for designating connections of the processing units, and the synchronizing step may have the step of setting the control register so as to synchronize the faulty processing unit and the other processing units by designating the connection of the all processing units at the same time.

According to the invention, a fault recovery method is provided for a computer having a plurality of processing boards, each of which includes x (x>=3) processing units and executes a process scheduled by an operating system. The fault recovery method may include the following steps:
- (a) detecting a fault of the processing unit and suspending the operation of the faulty processing unit;
- (b) diagnosing the faulty processing unit independently for self diagnosis;
- (c) synchronizing the operation of the above faulty processing unit with the normal processing units and starting the operation again when the fault is judged to be temporary by the self diagnostic result; and
- (d) continuing the execution of the process with the other normal processing units and succeeding the scheduled process of the processing board having the faulty processing unit by another processing board when the fault is judged to be fixed by the self diagnostic result.

According to the invention, a fault recovery method is provided for a computer having a plurality of processing boards, each of which includes x (x>=3) processing units and executes a process scheduled by an operating system. The fault recovery method may include the following steps:

(a) continuing the execution of the process with the other normal processing units in the same processing board when one of the processing units becomes faulty; and (b) succeeding the process, which was scheduled to the processing board having the faulty processing unit, except the process continued by the other processing units at the continuing step, by another processing board.

According to the invention, a fault recovery method is provided for a computer having a plurality of removable processing boards, each of which includes x (x>=3) removable processing units for executing same instructions and each executing a process scheduled by an operating system. The fault recovery method may include the following steps:

(a) continuing the execution of the instructions with the other normal processing units on the processing board having the faulty processing unit when one of the processing units becomes faulty;

(b) succeeding the process scheduled to the processing board having the faulty processing unit by another processing board;

(c) removing the processing board having the faulty processing unit, swapping the faulty processing unit for a new processing unit, and reinstalling the processing board having the new processing unit; and (d) operating the reinstalled processing board again after the above reinstalling step.

According to the invention, a fault recovery method is provided for a computer having a processing board, which includes x (x>=3) processing units for executing same instructions. The fault recovery method may include the following steps:

(a) continuing the execution of the instructions with the other normal processing units on the processing board having the faulty processing unit when one of the processing units becomes faulty;

(b) swapping the faulty processing unit for a new processing unit during continuing the execution of the instructions; and (c) synchronizing an operation of the new processing unit with operations of the other processing units.

According to the invention, a fault recovery method is provided for a computer having a plurality of processing boards, each of which includes x (x>=3) processing units for executing same instructions and a plurality of independent systems for operating based on majority result of outputs of the processing units. The fault recovery method may include the following steps:

(a) continuing the execution of the instructions based on the majority result of the outputs of the other processing units when one of the processing units becomes faulty in any of the independent systems; and (b) succeeding a process scheduled to the processing board having the faulty processing unit, except continued process at the above continuing step, by other processing board.

According to the invention, a fault recovery method is provided for a computer having a plurality of processing boards, each of which includes x (x>=3) processing units for executing same instructions and a plurality of independent systems for operating based on majority result of outputs of the processing units. The fault recovery method may include the following steps:

(a) continuing the execution of the instructions with the other independent systems when one of the independent systems becomes faulty; and (b) succeeding a process scheduled to the processing board having the faulty independent system, except the continued process at the above continuing step, by other processing board.

According to the invention, a fault recovery method is provided for a computer having a logic processing board, which includes a pair of processing boards for executing a process with a plurality of units. The fault recovery method may include the following steps:

(a) executing the process using one of the processing boards of the logic processing board;

(b) continuing the execution of the process with other normal units of the processing boards when one of processing boards, which executes the process at the above executing step, becomes faulty; and (c) succeeding the process by the other processing board in the logic processing board after the above continuing step.

In the fault recovery method according to the invention, the continuing step may further include the following steps:

(a) executing the process scheduled to the faulty processing board with the faulty processing board; and (b) suspending the operation of the faulty processing board after executing the scheduled process at the above executing step.

In the fault recovery method, the succeeding step may include the following steps:

(a) informing the operating system of the fault of the processing board; and (b) prohibiting a new process from being scheduled to the faulty processing board and the operating system scheduling a new process to other processing board.

In the fault recovery method, the continuing step may include the following steps:

(a) executing the process, being executed by the faulty processing board, with the faulty processing board; and (b) suspending the operation of the faulty processing board after executing the process at the above executing step.

In the fault recovery method, the succeeding step may further include the following steps:

(a) informing the operating system of the fault of the processing board; and (b) scheduling the process, which was once scheduled to the faulty processing board, to other processing board, suspending the scheduling of a new process to the faulty processing board, and scheduling the new process to other processing board.

In the fault recovery method of the computer, the scheduling step may further include the step of distributing the process to a specific processing board in case of scheduling a new process to other processing board.

In the fault recovery method of the computer, the scheduling step further may include the step of distributing the process, which was scheduled to the above specific processing board, to other processing board.

The fault recovery method of the computer according to another embodiment of the invention may further include the step of informing the operator of the removable status of the processing board having the faulty processing unit before the above removing step.

The fault recovery method of the computer according to another embodiment of the invention may further include the step of informing the operator of the swappable status of the faulty processing unit before the above swapping step.

In the fault recovery method of the computer according to another embodiment of the invention, the synchronizing step may further include the following steps:

(a) testing the new processing unit based on self diagnosis; and (b) synchronizing the operation of the new processing unit with the other processing units when the above self diagnosis results in normal.

In the fault recovery method of the computer, the processing board may further include an identifier for identifying the processing board. The computer may distribute the process to each processing board according to the identifiers and execute the instructions, and the succeeding step may further include the step of changing an identifier of other normal processing board to the identifier of the faulty processing board when one of the processing boards becomes faulty.

In the fault recovery method of the computer, the identifier may be an interrupt vector for receiving I/O interruption assigned to the processing board, and the changing step may further include the step of reassigning an interrupt vector of the processing board.

In the fault recovery method of the computer according to another embodiment of the invention, the succeeding step may further include the following steps:

(a) transferring to a main memory data to be succeeded by the faulty processing board;

(b) receiving the data from the main memory by the other processing board;

(c) reassigning the interrupt vector of the faulty processing board to the other processing board;

(d) starting to execute the succeeded process by the other processing board; and (e) swapping the faulty processing board.

In the fault recovery method of the computer, the computer may further include N+1 (N>=1) processing boards for processing amount of N processing boards, and the fault recovery method may further include the following steps:

(a) operating with N+1 processing boards;

(b) operating with N+1 processing boards during the above continuing step; and (c) operating with N processing boards after the above succeeding step.

In the fault recovery method of the computer, the computer may include N (N>=1) processing boards for processing amount of N processing boards, and the fault recovery method may further include the following steps:

(a) operating with N processing boards, (b) adding a new processing board and operating with N+1 processing boards during the above continuing step; and (c) operating with N processing boards after the above succeeding step.

According to the invention, a fault recovery method is provided for a computer having a processing board, which includes x (x>=3) removable processing units for executing same instructions, and which also includes an inform mechanism for informing a request by the processing board to remove each processing unit regardless of a fault's existence. The fault recovery method may include the following steps:

(a) requesting to remove a processing unit by the above inform mechanism;

(b) suspending an operation of the processing unit after the requesting step;

(c) informing removable status of the processing unit after the suspending step; and (d) removing the processing unit after the informing step.

According to the invention, a fault recovery method is provided for a computer having a removable processing board, which includes x (x>=3) removable processing units and an inform mechanism for informing a request to remove the processing board regardless of a fault's existence by the processing board. The fault recovery method may include the following steps:

(a) requesting to remove the processing board by the above inform mechanism;

(b) executing the process being executed by the processing board and suspending the operation of the processing board after the above requesting step;

(c) informing removable status of the processing board after the suspending step; and (d) removing the processing board after the above informing step.

According to the invention, a fault recovery method is provided for a computer having a plurality of processing boards, each of which includes x (x>=3) processing units for executing same instructions and each of which executes processes scheduled by an operating system. The fault recovery method may include the following steps:

(a) informing the operating system of a fault by the faulty processing board when one of the processing boards becomes faulty;

(b) the operating system prohibiting a new process from being distributed to the faulty processing board;

(c) executing the scheduled process with the faulty processing board, flushing a cache memory, informing swappable status of the board, and suspending an operation of the faulty processing board;

(d) swapping the faulty processing board for a new processing board;

(e) informing the operator of the normally setting status of the new processing board, testing the new processing board according to self diagnosis, and informing the operating system of the self diagnostic result when the self diagnosis results in normal; and (f) the operating system distributing a process to the new processing board, and starting processing by the same configuration with the operating status before becoming faulty.

According to the invention, a fault recovery method is provided for a computer having a plurality of processing boards, each of which includes x (x>=3) processing units for executing same instructions, and each of which executes processes scheduled by an operating system. According to another embodiment of the invention, two kinds of the processing boards include the following:

interrupt master processing board which receives I/O interruption and distributes it to other processing boards; and interrupt slave processing board which receives the I/O interruption distributed by the interrupt master processing board, each processing board receives I/O interruption by an interrupt vector distributed to each processing board. The fault recovery method of the computer having a faulty interrupt master processing board may include the following steps:

(a) informing the operating system of the fault by the faulty processing board;

(b) prohibiting the operating system from distributing a new process to the faulty processing board;

(c) succeeding the new process to be distributed to the faulty processing board by other processing board with the operating system;

(d) starting to execute the succeeded process by the processing board, by which the process was succeeded;

(e) reassigning an interrupt vector of the faulty processing board to the processing board, by which the process was succeeded, and informing the reassignment to the operating system after the reassigning step;

(f) flushing a cache memory by the faulty processing board;

(g) informing an operator of the swappable status of the faulty processing board after the flushing step;

(h) swapping the faulty processing board for a new processing board;

(i) informing the operator of normally setting status of the new processing board, causing the new board to perform self diagnosis, and informing the operating system of the self diagnostic result when the self diagnosis results in normal; and (j) the operating system distributing a process to the new processing board, and starting processing by the same configuration with the operating status before becoming faulty.

According to the invention, a fault recovery method is provided for a computer having a plurality of processing boards, each of which includes x (x>=3) processing units for executing same instructions, and each of which executes processes scheduled by an operating system. According to another embodiment of the invention, two kinds of the processing board include the following:

interrupt master processing board which receives I/O interruption and distributes it to other processing boards; and interrupt slave processing board which receives the I/O interruption distributed by the interrupt master processing board, each processing board receives I/O interruption by an interrupt vector distributed to each processing board. The fault recovery method of the computer having a faulty interrupt slave processing board may include the following steps:

(a) informing the operating system of the fault by the faulty processing board;

(b) prohibiting the operating system from distributing a new process to the faulty processing board and suspending the faulty processing board from receiving I/O interruption;

(c) succeeding the new process to be distributed to the faulty processing board by other processing boards with the operating system;

(d) starting the succeeded process by the processing board;

(e) flushing a cache memory by the faulty processing board;

(f) informing an operator of the swappable status of the faulty processing board after the flushing step;

(g) swapping the faulty processing board for a new processing board;

(h) informing the operator of normally setting status of the new processing board, causing the new board to perform self diagnosis, and informing the operating system of the self diagnostic result when the self diagnosis results in normal; and (i) the operating system distributing a process to the new processing board, and starting processing by the same configuration with the operating status before becoming faulty.

According to the invention, a fault recovery method is provided for a computer having a plurality of processing boards, each of which includes x (x>=3) processing units for executing same instructions, and each of which executes processes scheduled by an operating system. According to another embodiment of the invention, two kinds of the processing board include the following:

interrupt master processing board which receives I/O interruption and distributes it to other processing boards; and interrupt slave processing board which receives the I/O interruption distributed by the interrupt master processing board, each processing board receives I/O interruption by an interrupt vector distributed to each processing board. The fault recovery method of the computer having a faulty interrupt master processing board may include the following steps:

(a) informing the operating system of the fault by the faulty processing board;

(b) continuing the execution of the process by the faulty processing board until a new processing board is inserted;

(c) inserting a new processing board;

(d) informing the operator of normally setting status of the new processing board, causing the new board to perform self diagnosis, and informing the operating system of the self diagnostic result when the self diagnosis results in normal;

(e) the operating system distributing a process to the new processing board;

(f) the operating system prohibiting the distribution of a new process to the faulty processing board;

(g) succeeding the new process, to be distributed to the faulty processing board, by other processing boards with the operating system;

(h) starting to execute the succeeded process by the processing board;

(i) reassigning an interrupt vector of the fault processing board to the processing board, by which the process was succeeded, and informing the reassignment to the operating system after the vector reassigning step;

(j) flushing a cache memory by the faulty processing board;

(k) informing an operator of the removable status of the faulty processing board after the flushing step; and (1) removing the faulty processing board.

According to the invention, a fault recovery method is provided for a computer having a plurality of processing boards, each of which includes x (x>=3) processing units for executing same instructions, and each of which executes processes scheduled by an operating system. According to another embodiment of the invention, two kinds of the processing boards may include the following:

interrupt master processing board which receives I/O interruption and distributes it to other processing boards; and interrupt slave processing board which receives the I/O interruption distributed by the interrupt master processing board, each processing board receives I/O interruption by an interrupt vector distributed to each processing board. The fault recovery method of the computer having a faulty interrupt slave processing board may include the following steps:

(a) informing the operating system of the fault by the faulty processing board;

(b) continuing the execution of the process by the faulty processing board until a new processing board is inserted;

(c) inserting a new processing board;

(d) informing the operator of normally setting status of the new processing board, causing the new board to perform self diagnosis, and informing the operating system of the self diagnostic result when the self diagnosis results in normal;

(e) the operating system distributing a process to the new processing board;

(f) prohibiting to distribute a new process to the faulty processing board and suspending the faulty processing board from receiving I/O interruption;

(g) succeeding the new process, to be distributed to the faulty processing board, by other processing board;

(h) starting to execute the succeeded process by the processing board;

(i) flushing a cache memory by the faulty processing board;

(j) informing the operator of removable status of the faulty processing board after the flushing step; and (k) removing the faulty processing board.

According to the invention, a fault recovery method is provided for a computer having a plurality of processing boards, each of which includes x (x>=3) processing units for executing same instructions scheduled by an operating system, and which also includes a process queue for scheduling processes to the plurality of processing boards. The fault recovery method may include the following steps:

(a) continuing the execution of the instructions by the other normal processing units of the processing board having the faulty processing unit when one of the processing units becomes faulty;

(b) informing the operating system of the fault of the processing board; and (c) the operating system suspending the process queue from scheduling a new process to the faulty processing board and scheduling the new process, to be scheduled to the faulty processing board, to other processing board.

According to the invention, a fault recovery method is provided for a computer having a plurality of processing boards, which includes x (x>=3) processing units for executing same instructions scheduled by an operating system, the processing boards receive I/O interruption by a common interrupt vector and in case of becoming faulty of one of the processing boards. The fault recovery method may include the following steps:

(a) informing the operating system of the fault by the faulty processing board;

(b) the operating system prohibiting the distribution of a new process to the faulty processing board and suspending the faulty processing board from receiving I/O interruption;

(c) succeeding the new process, to be distributed to the faulty processing board, by other processing board with the operating system;

(d) starting the succeeded process by the processing board, by which the process is succeeded at the above succeeding step;

(e) flushing a cache memory by the faulty processing board;

(f) informing the operator of swappable status of the faulty processing board after the flushing step;

(g) swapping the faulty processing board for a new processing board;

(h) informing the operator of normally setting status of the new processing board, causing the new board to perform self diagnosis, and informing the operating system of the self diagnostic result when the self diagnosis results in normal; and (i) the operating system distributing a process to the new processing board and starting processing by the same configuration with the normally operating status before becoming faulty.

According to the invention, a faulty recovery method is provided for a computer having a plurality of processing boards, which includes x (x>=3) processing units for executing same instructions scheduled by an operating system, the processing boards receive I/O interruption by a common interrupt vector and in case of becoming faulty of one of the processing boards. The fault recovery method may include the following steps:

(a) informing the operating system of the fault by the faulty processing board;

(b) continuing the execution of the process by the faulty processing board until a new processing board is inserted;

(c) inserting a new processing board;

(d) informing the operator of normally setting status of the new processing board, causing the new board to perform self diagnosis, and informing the operator of the self diagnostic result when the self diagnosis results in normal;

(e) the operating system distributing a process to the new processing board;

(f) prohibiting to distribute a new process to the faulty processing board and suspending the faulty processing board from receiving I/O interruption;

(g) succeeding the new process, to be distributed to the faulty processing board, by other processing boards;

(h) starting the succeeded process by the processing board, by which the process was succeeded;

(i) flushing a cache memory by the faulty processing board;

(j) informing the operator of removable status of the faulty processing board after the flushing step; and (k) removing the faulty processing board.

According to the invention, a fault recovery method is provided for the computer, the processing unit may include a cache memory and a processor, and the succeeding step may further include the step of flushing the cache memory of the faulty processing board.

BRIEF EXPLANATION OF THE DRAWINGS

In the drawings.

FIG. 7 shows an operation of the majority circuit 2;

FIG. 10 is a truth-table based on an error detect circuit 260;

17

Figure 11:
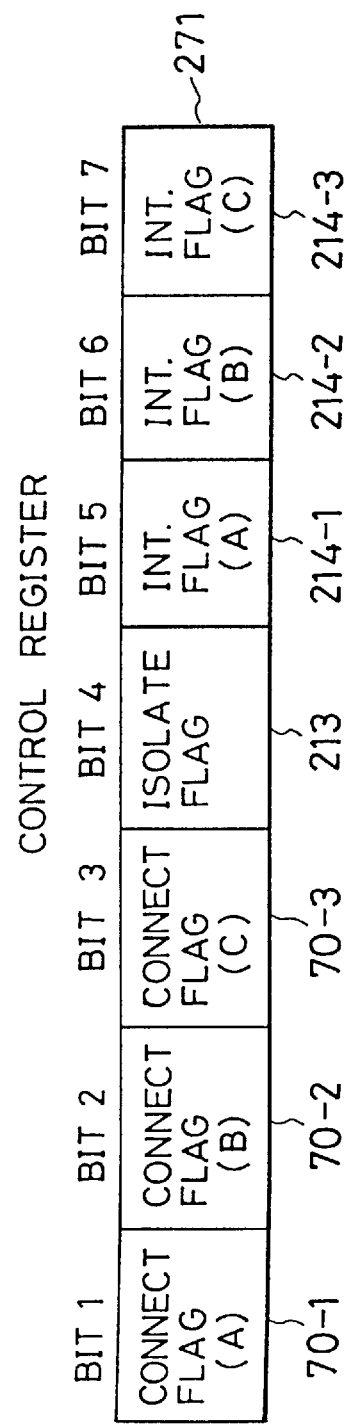
Figure 12:
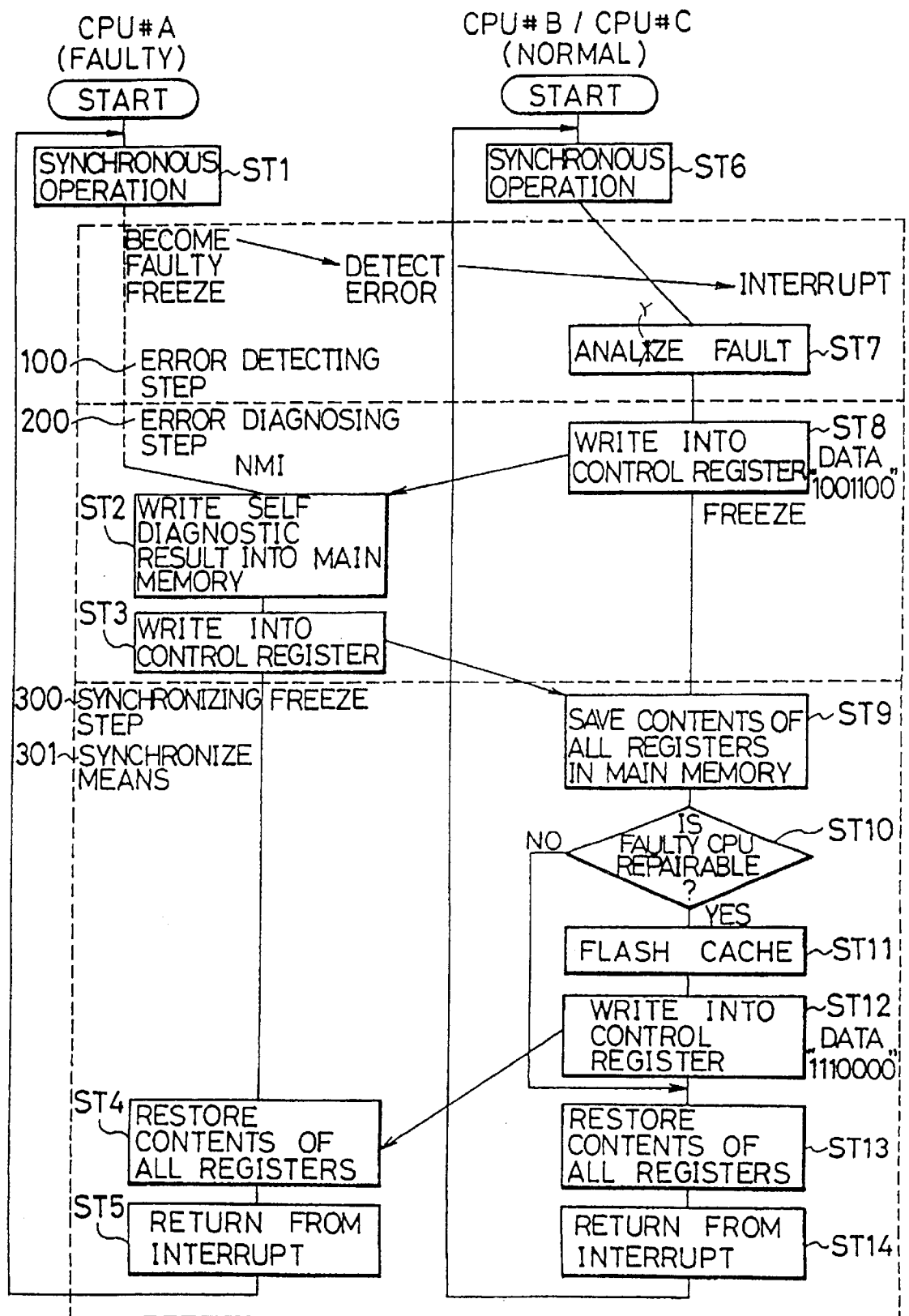
Figure 13:
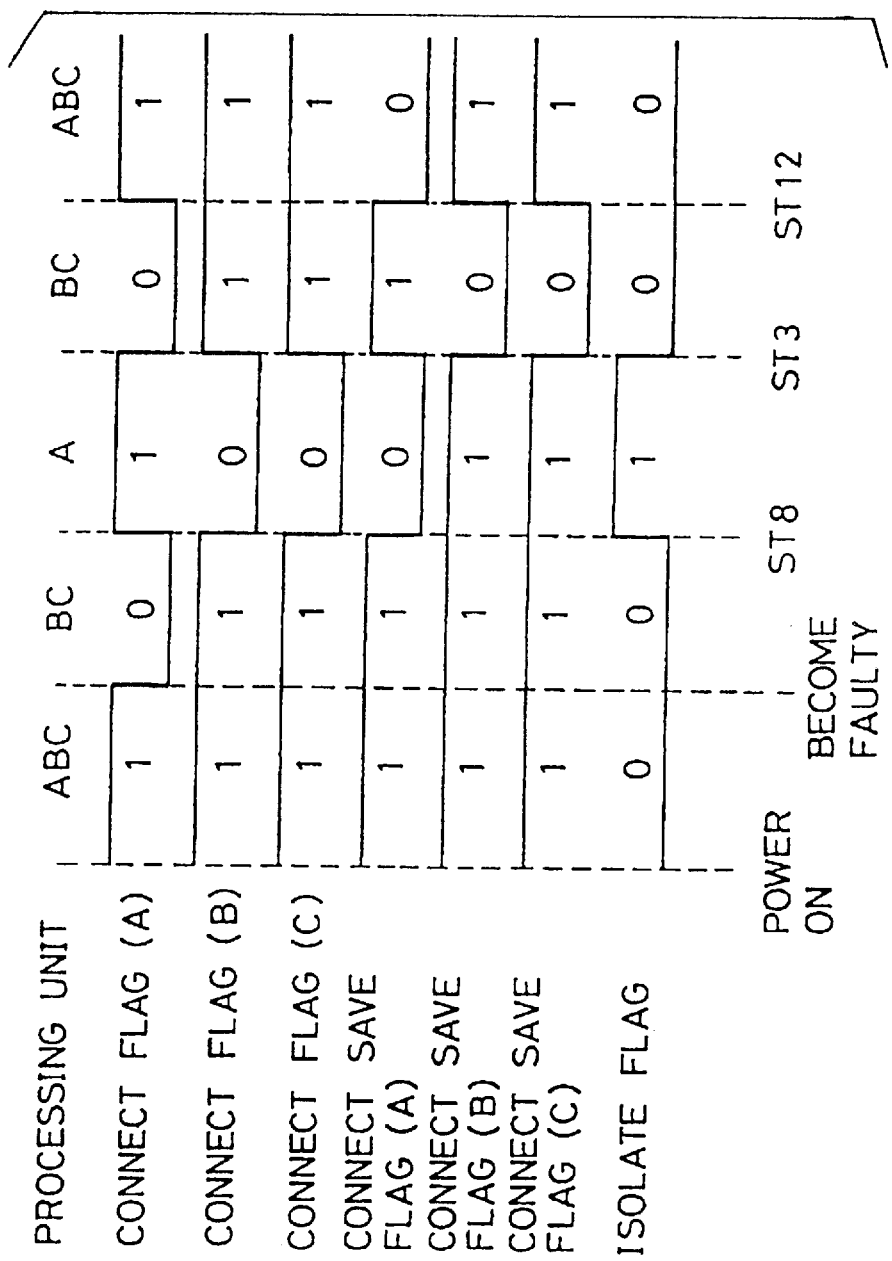
Figure 14:
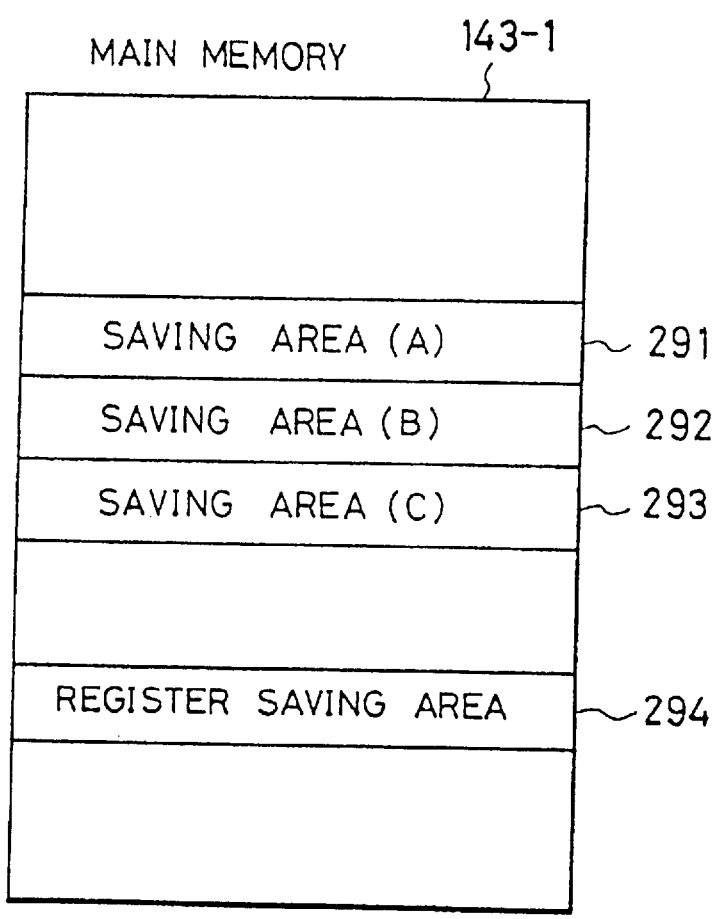
Figure 15:
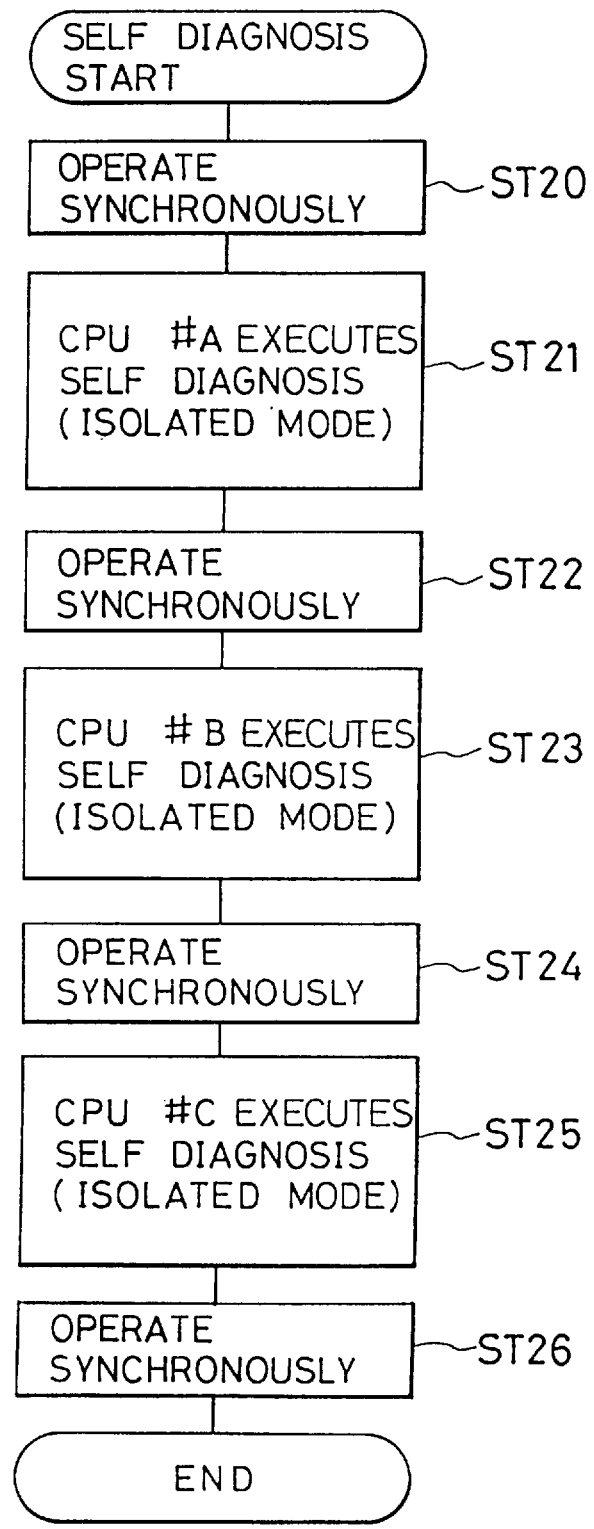
Figure 16A:
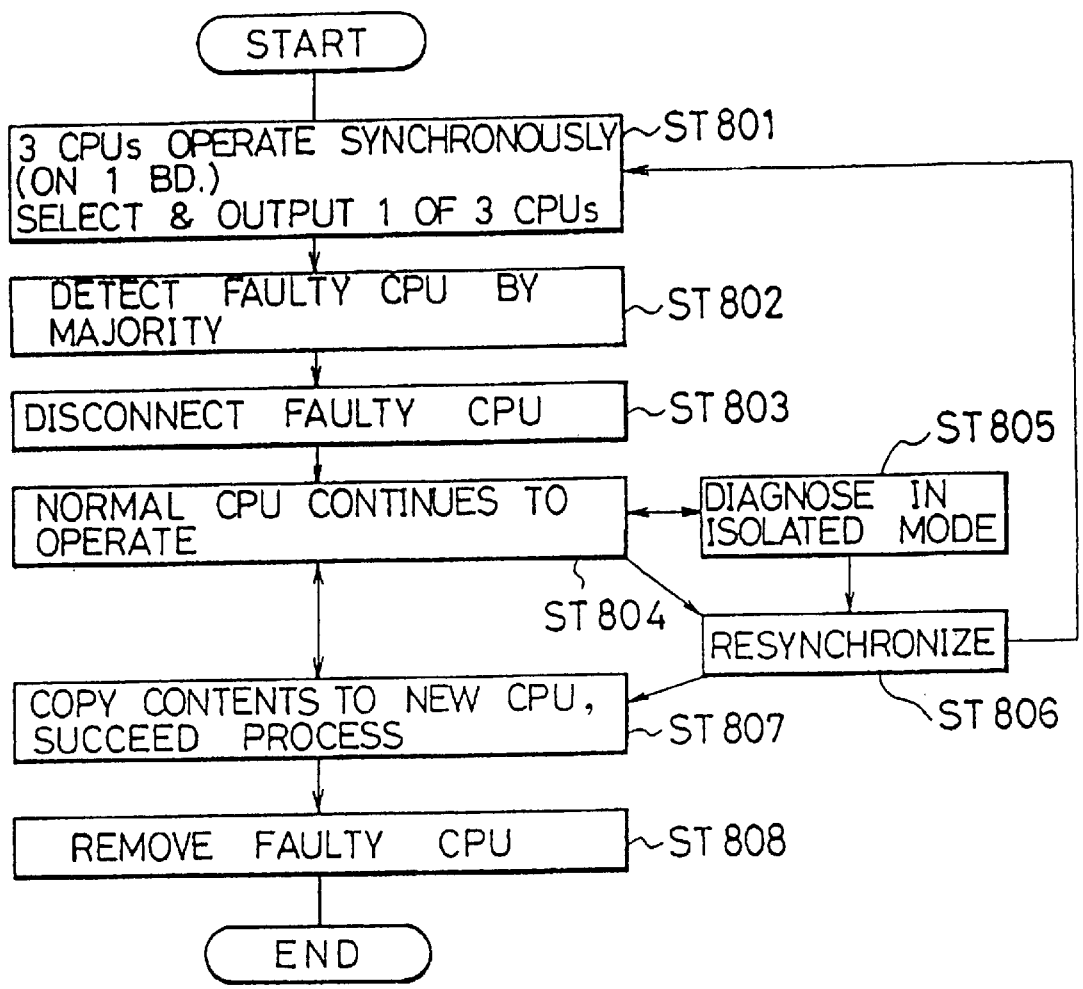
Figure 16B:
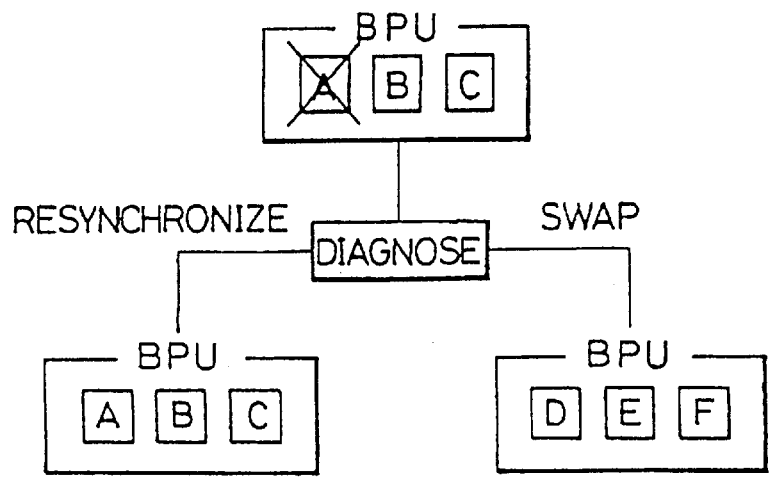
Figure 17:
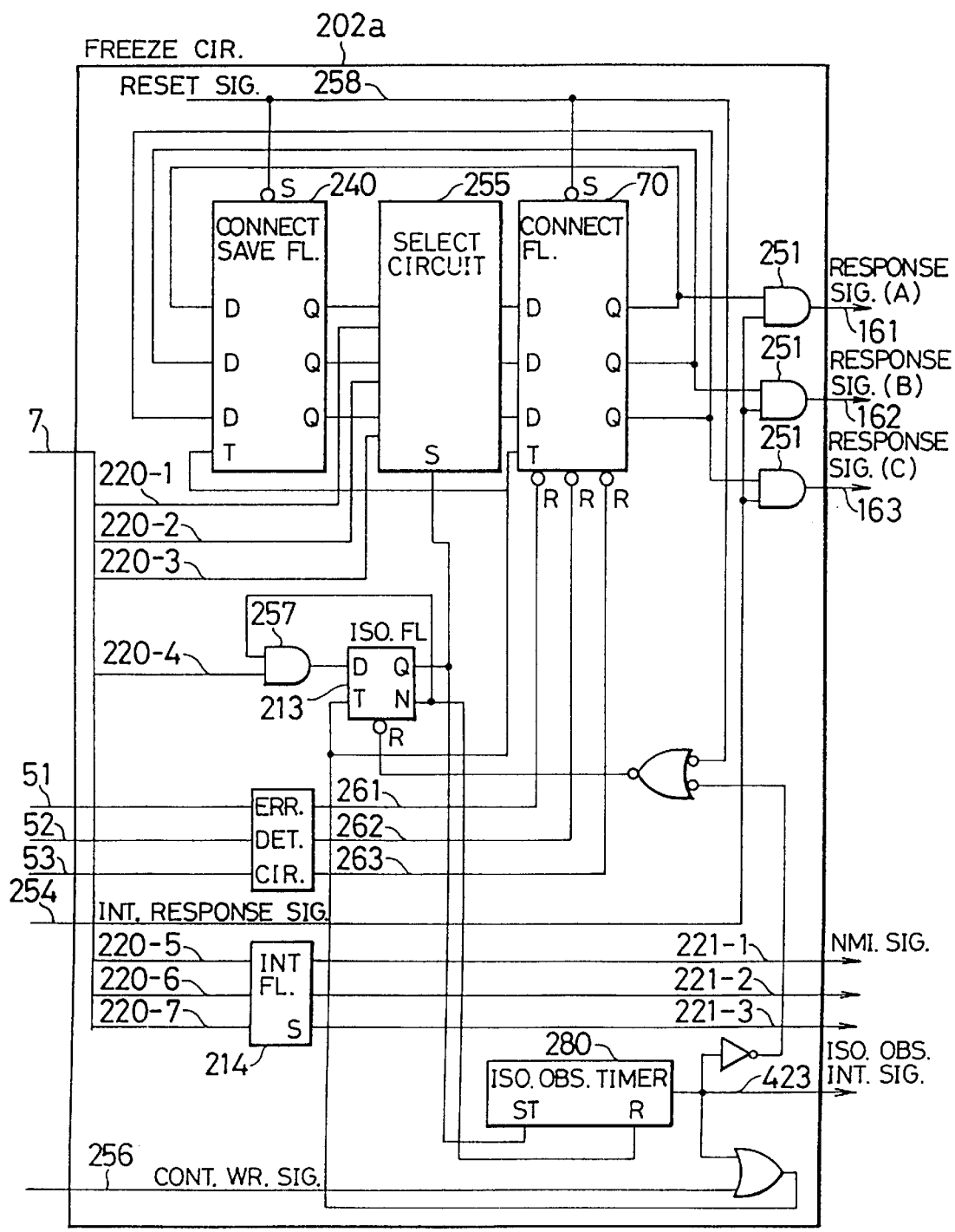
Figure 18:
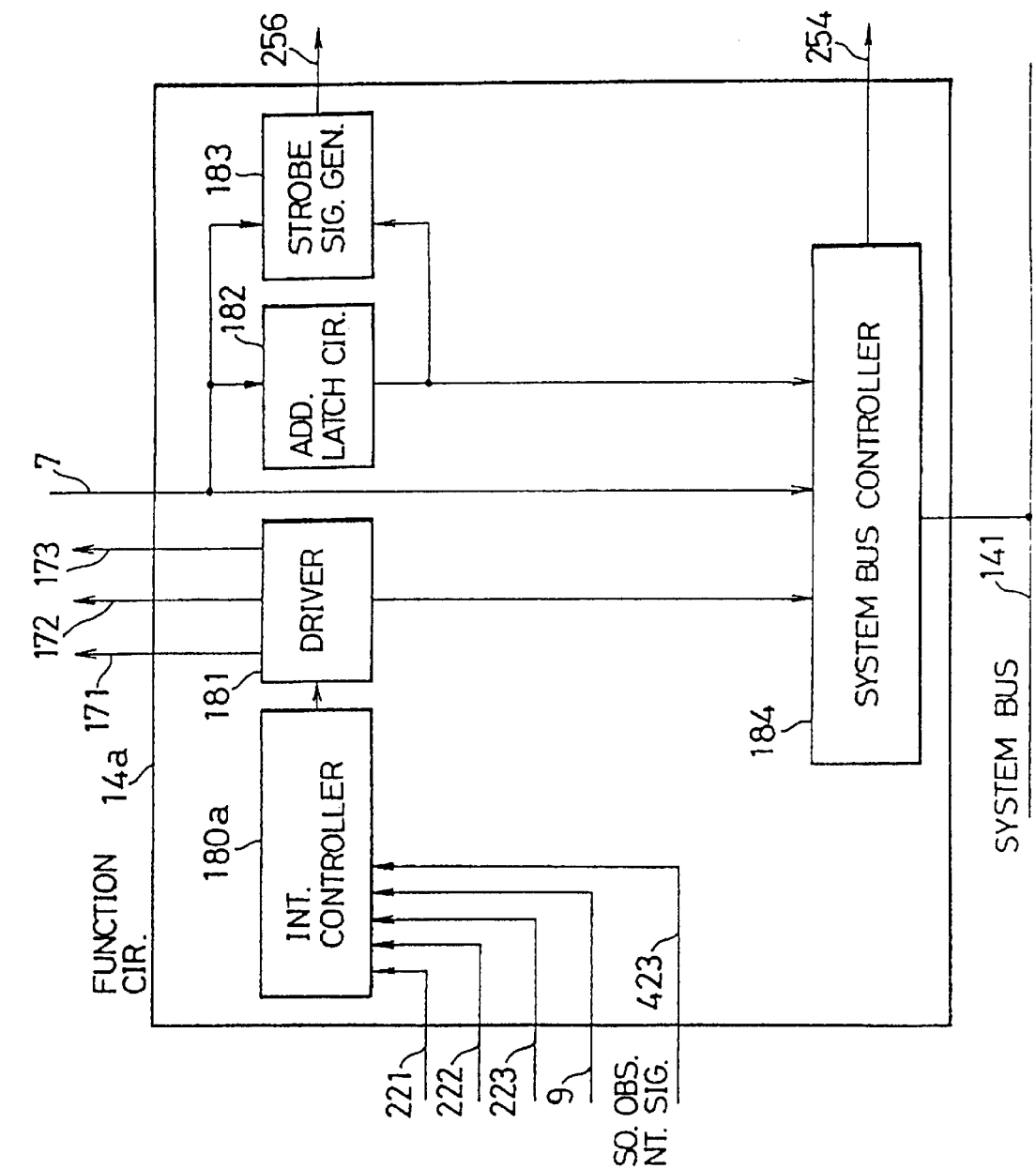
Figure 19:
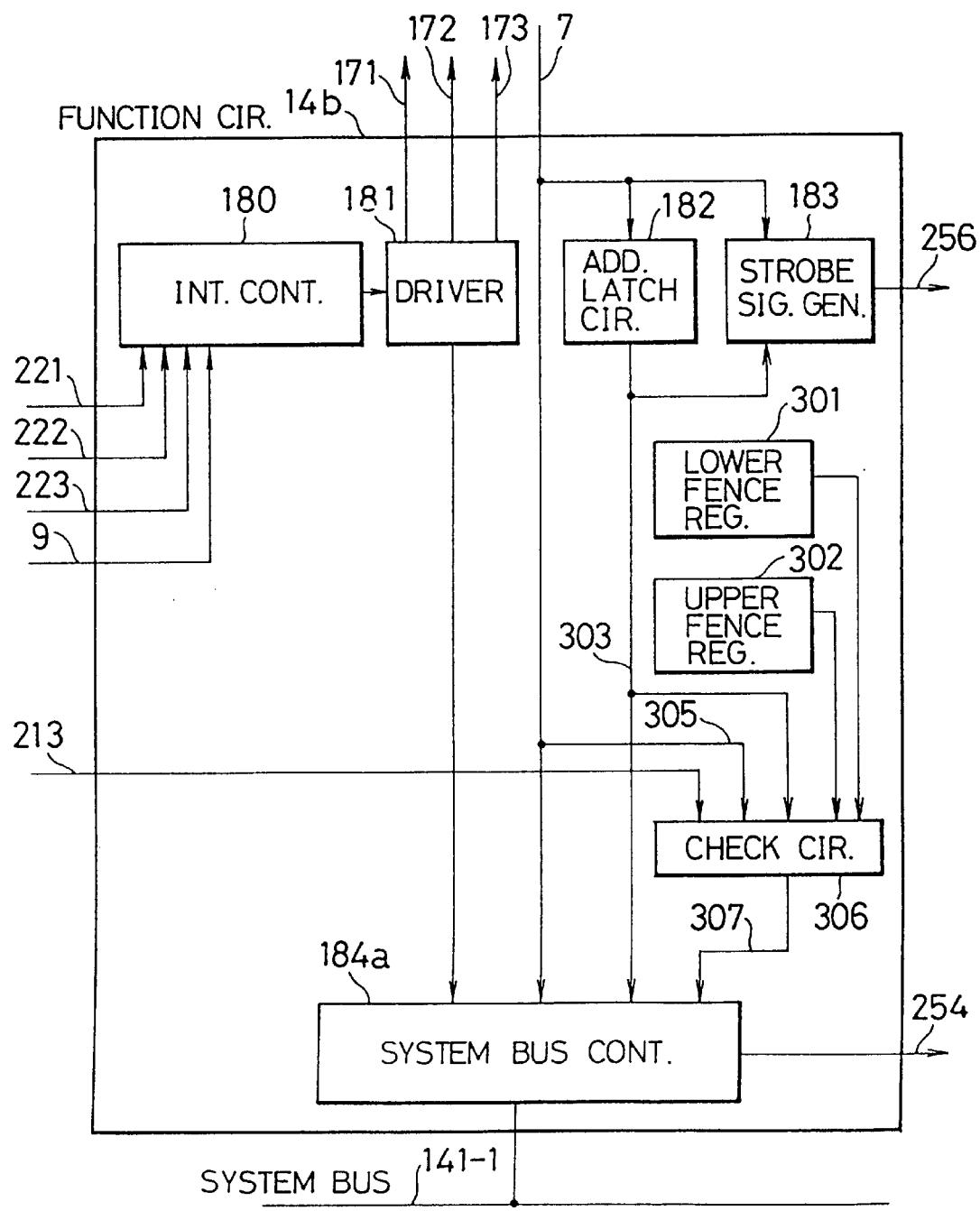
Figure 20:
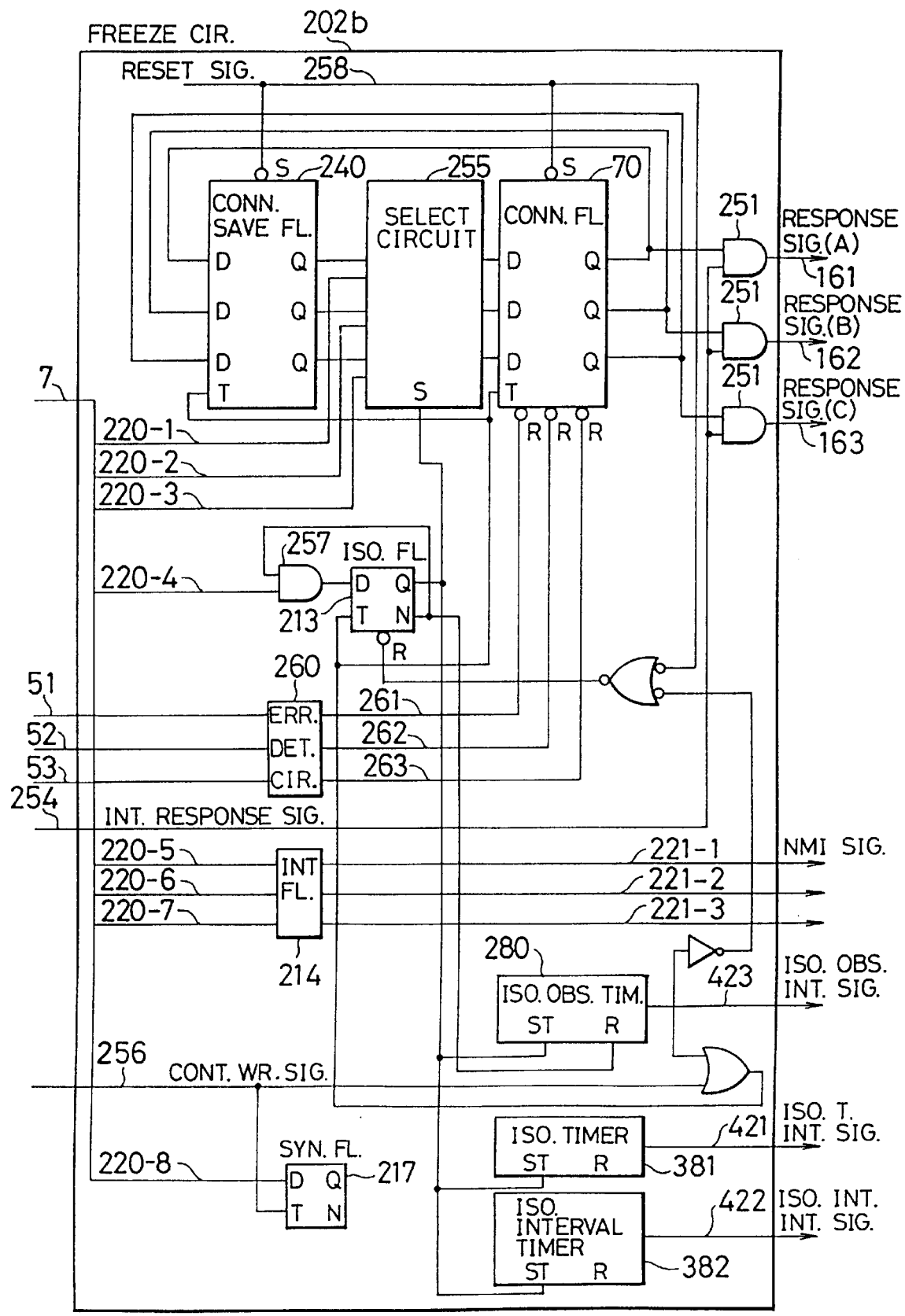
Figure 21:
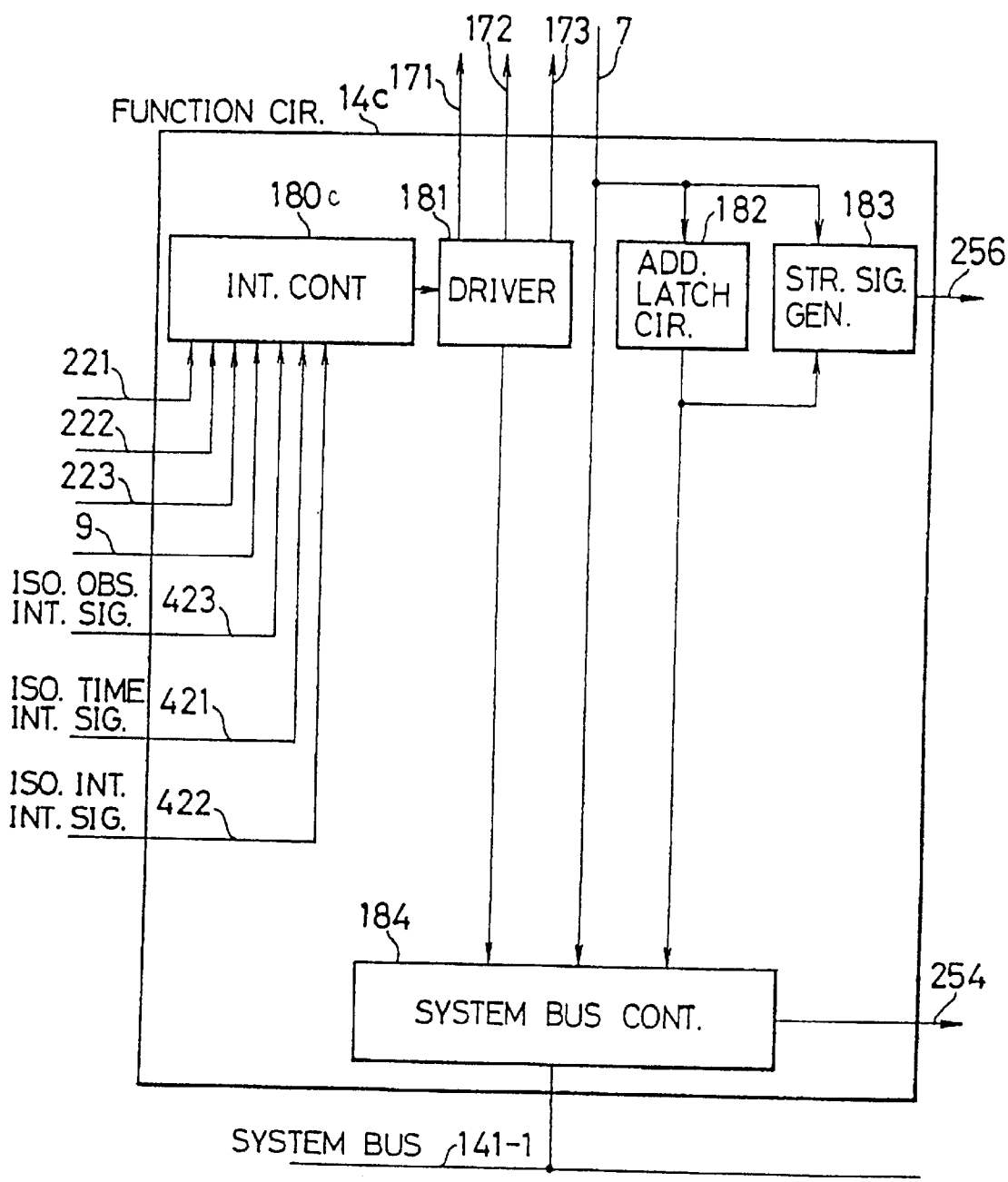
Figure 22A:
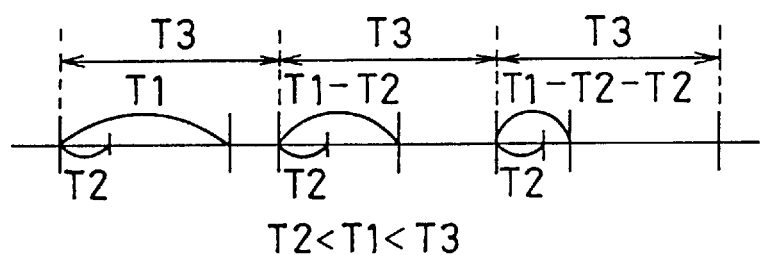
Figure 22B:
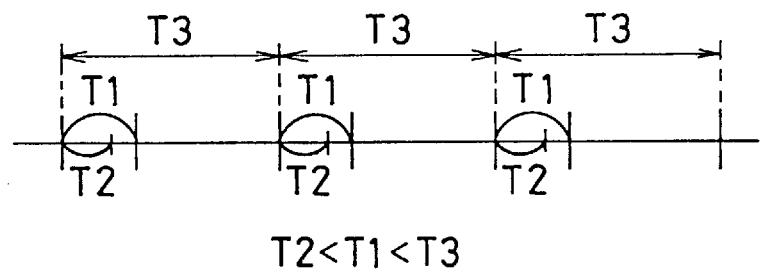
Figure 24:
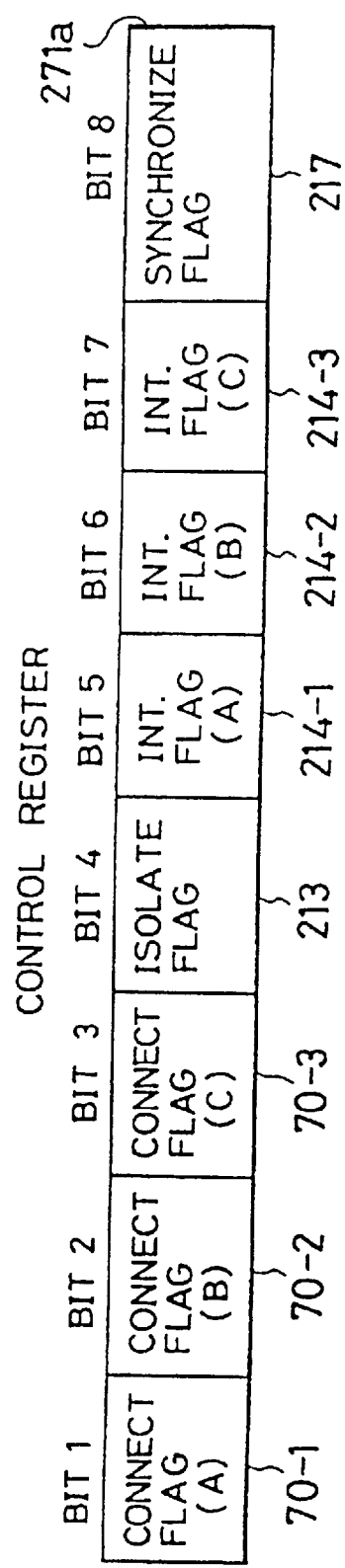
Figure 25:
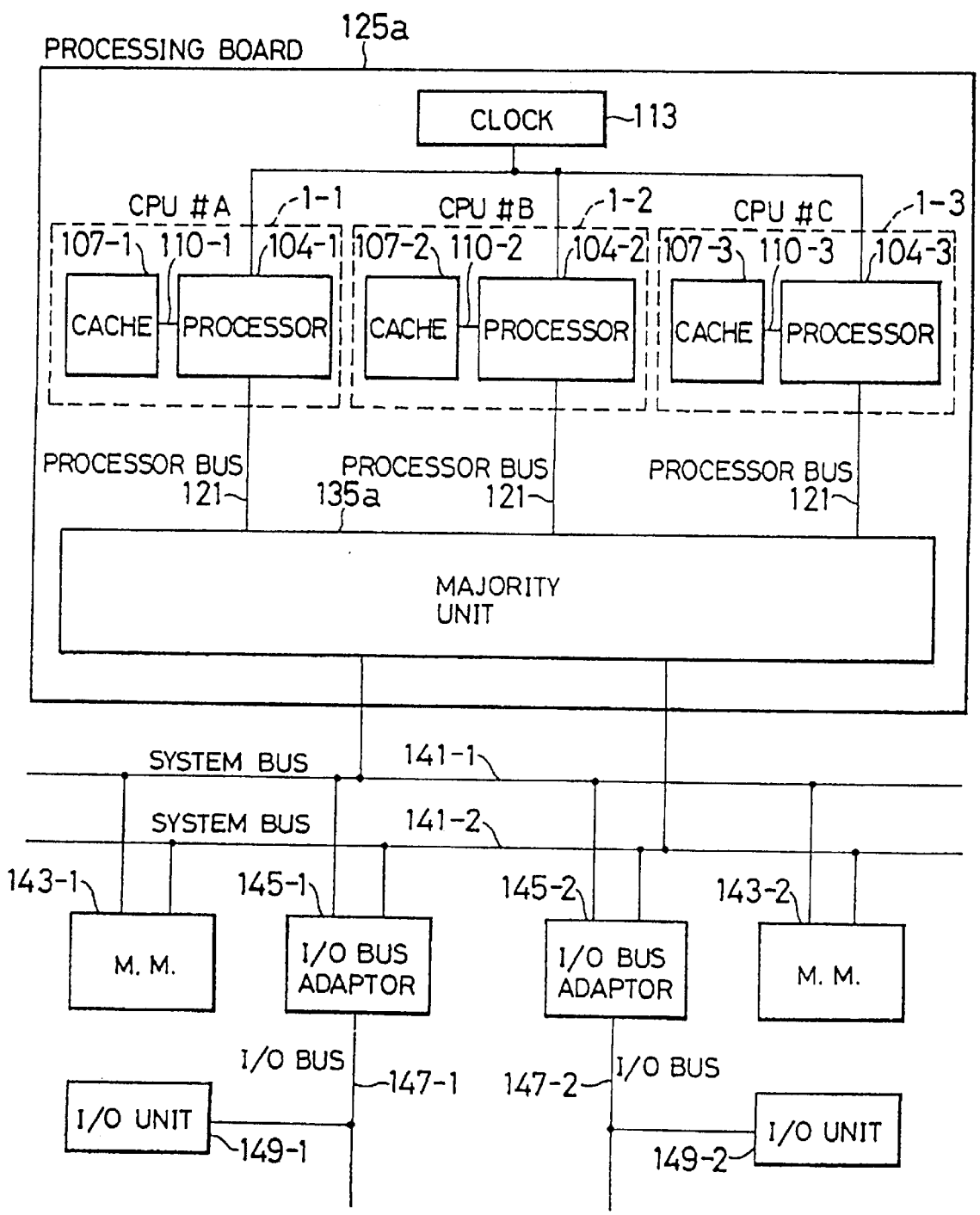
Figure 26:
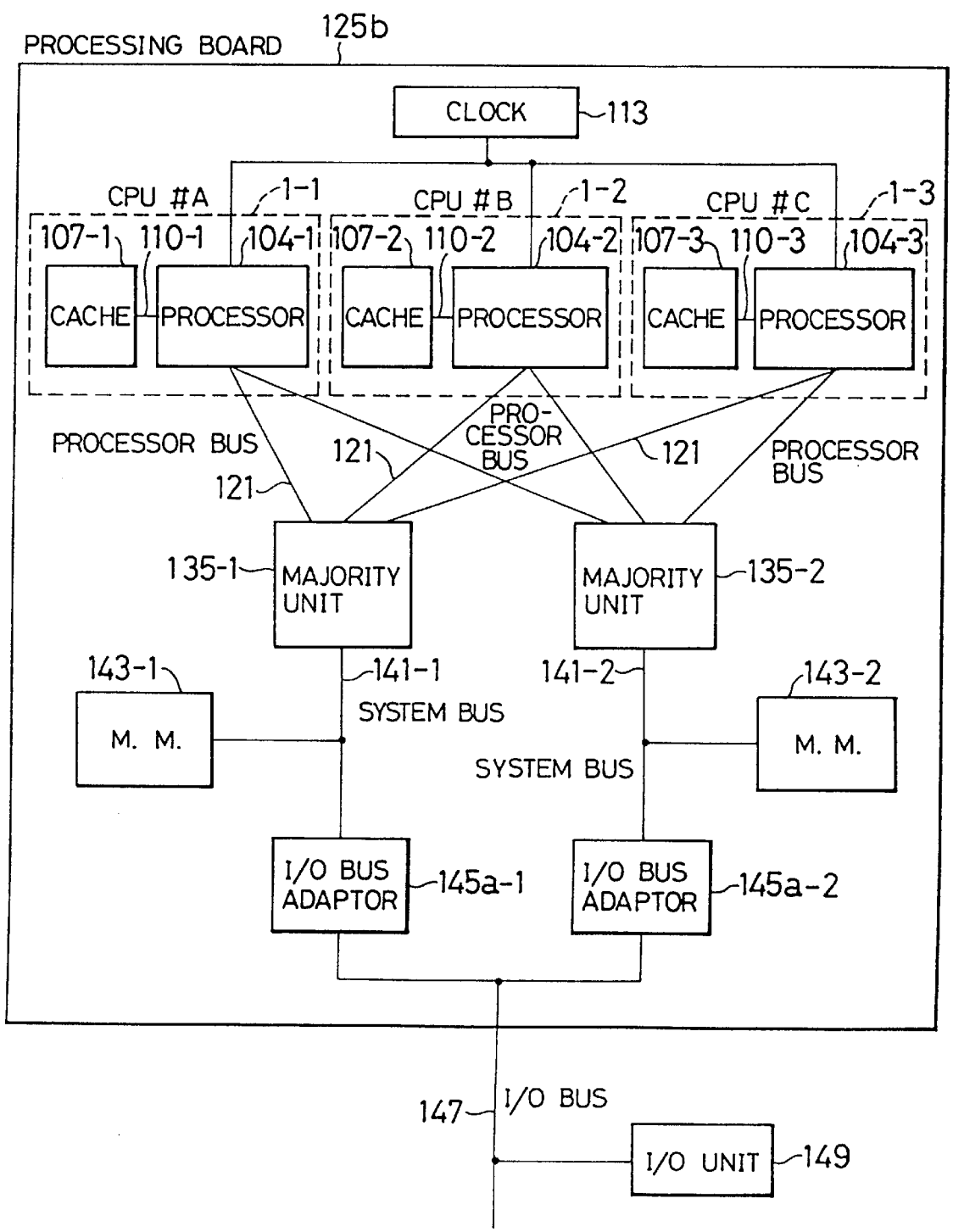
Figure 27:
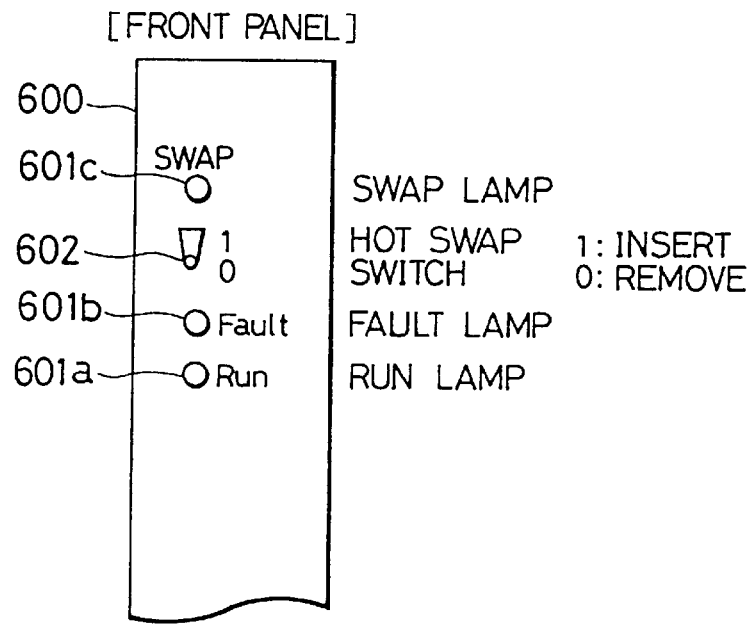
Figure 28:
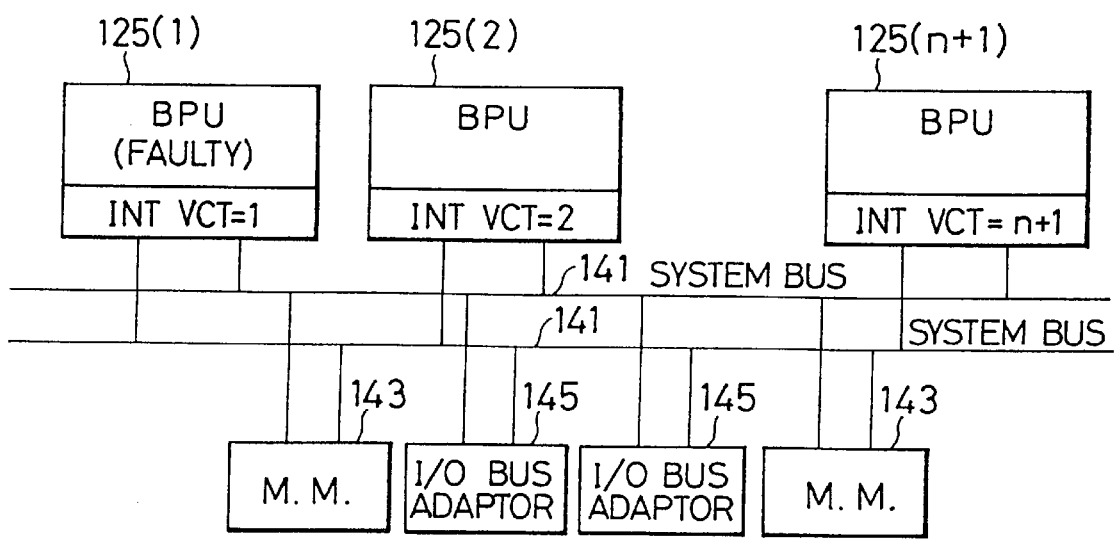
Figure 29:
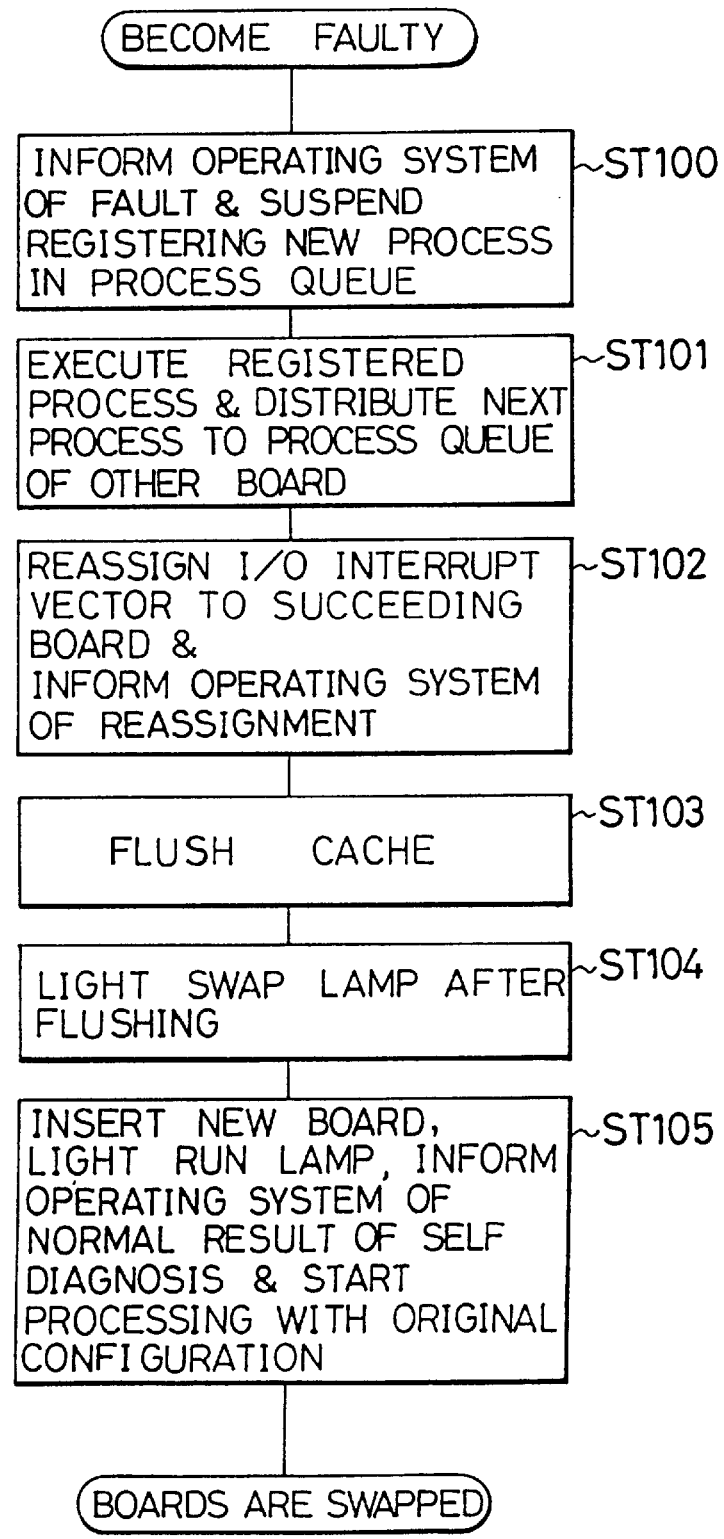
Figure 30:
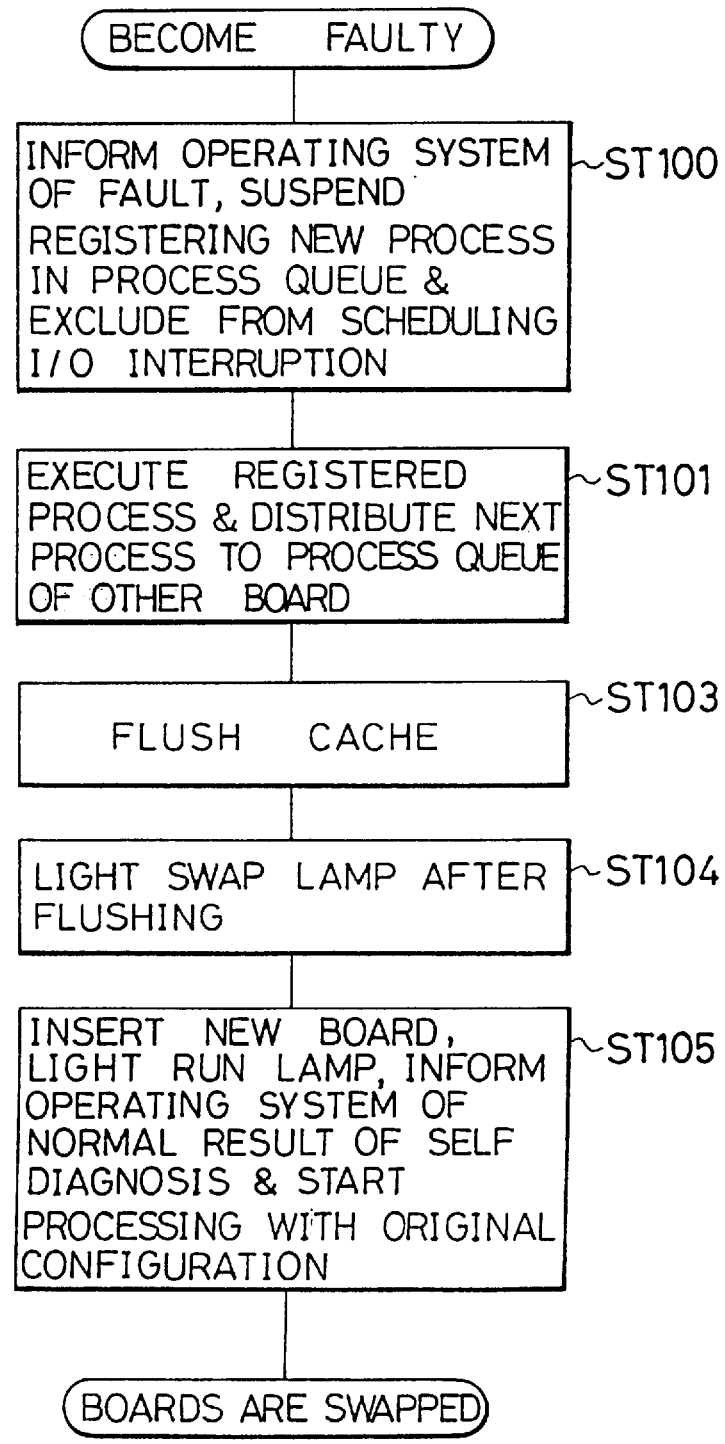
Figure 31:
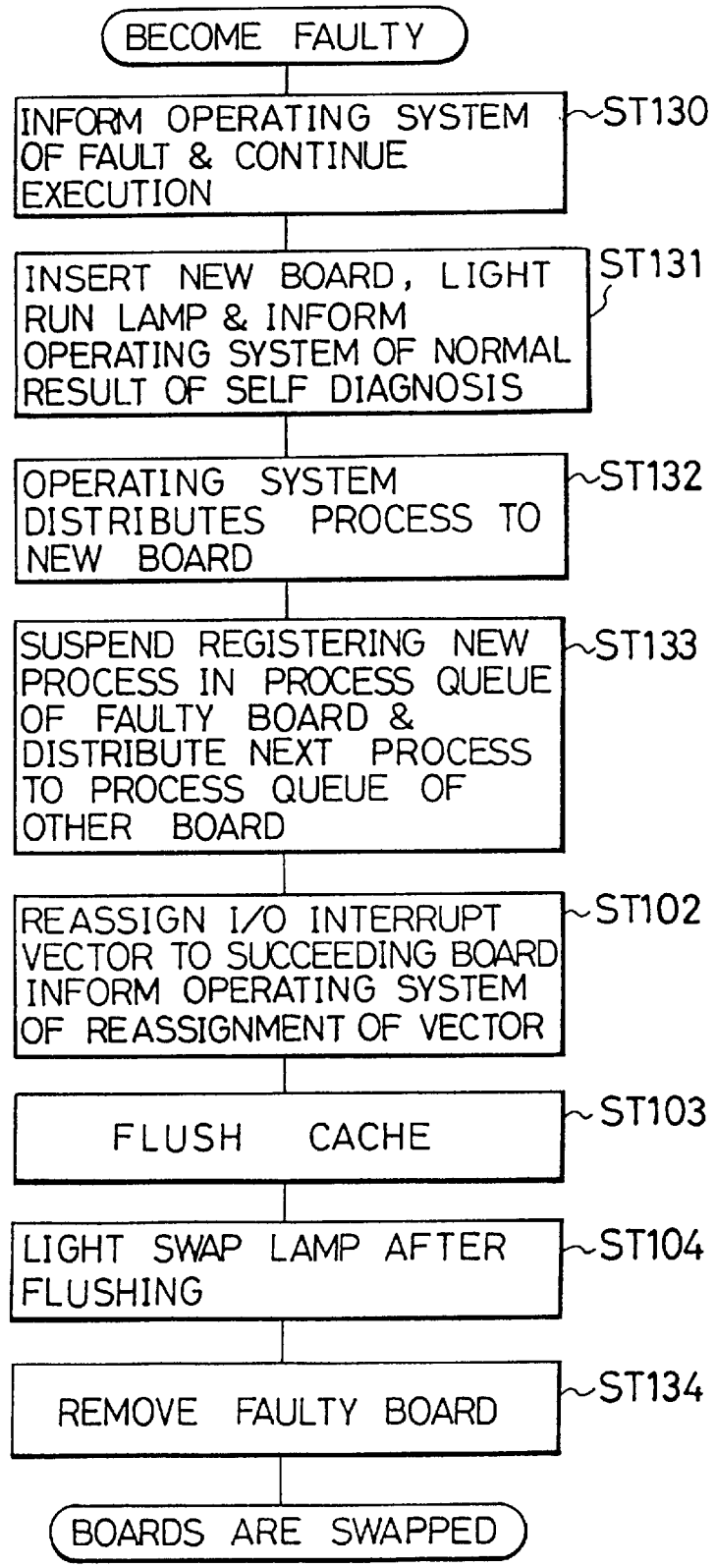
Figure 32:
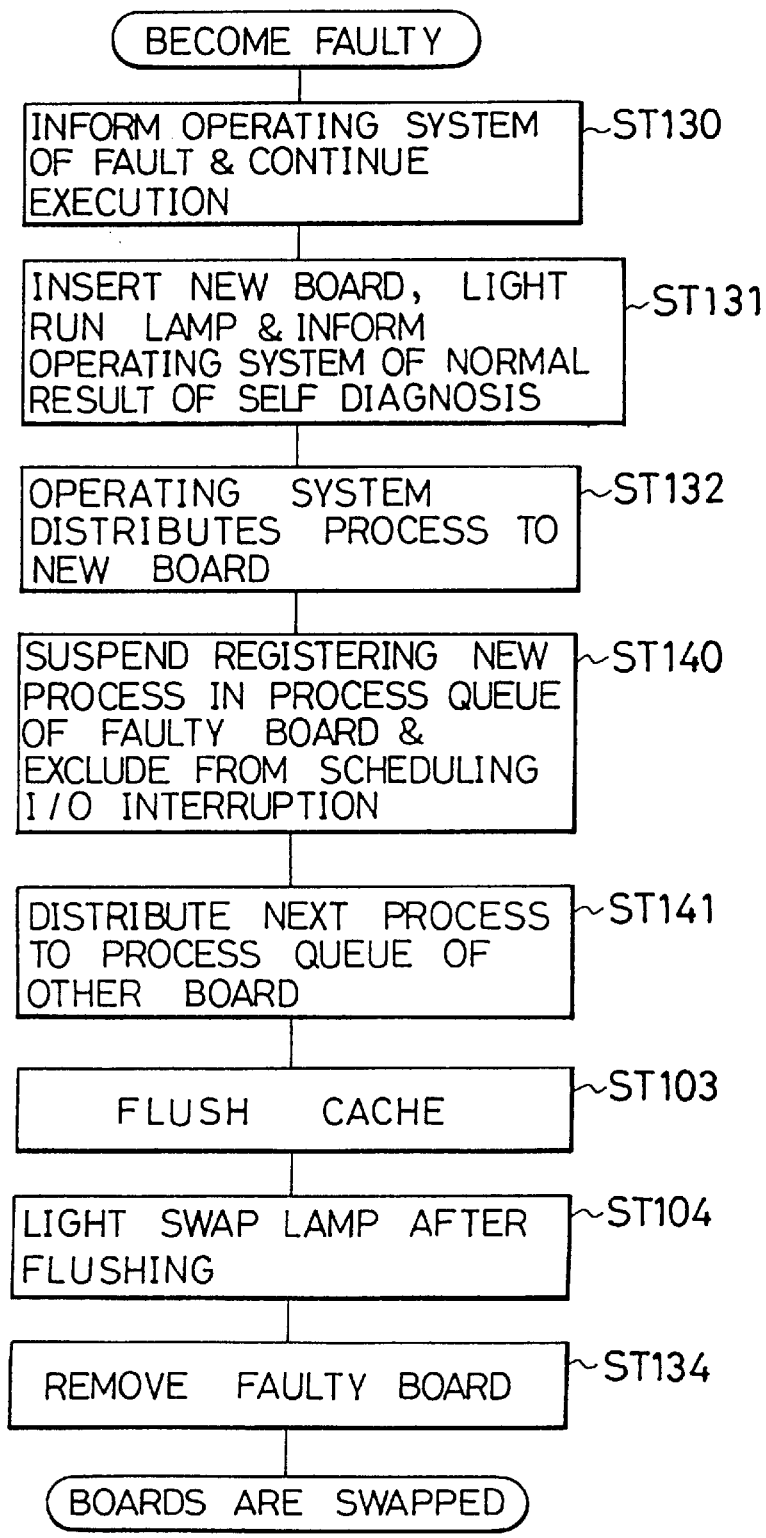
Figure 33:
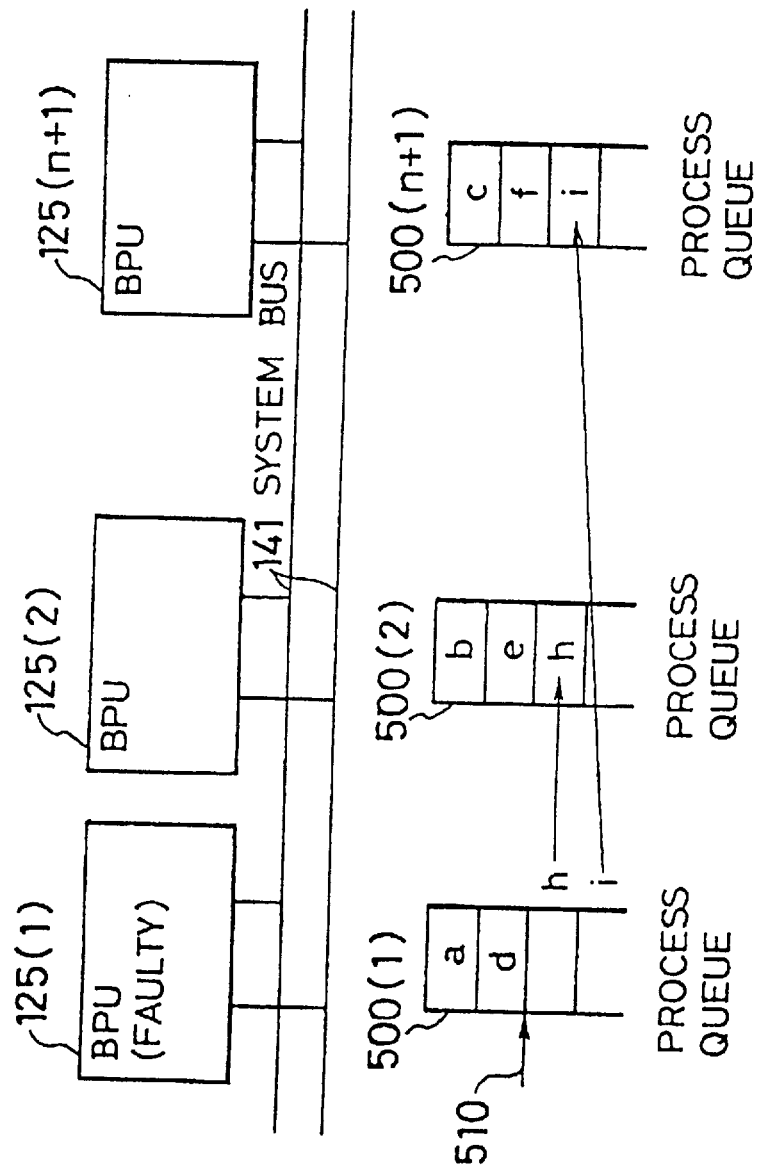
Figure 34:
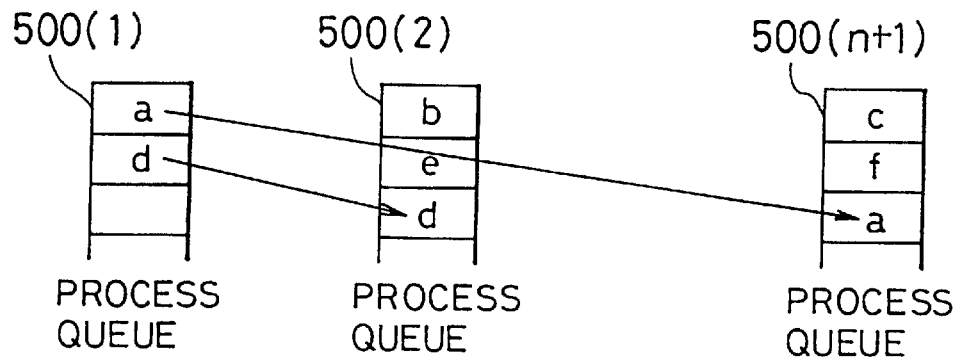
Figure 35:
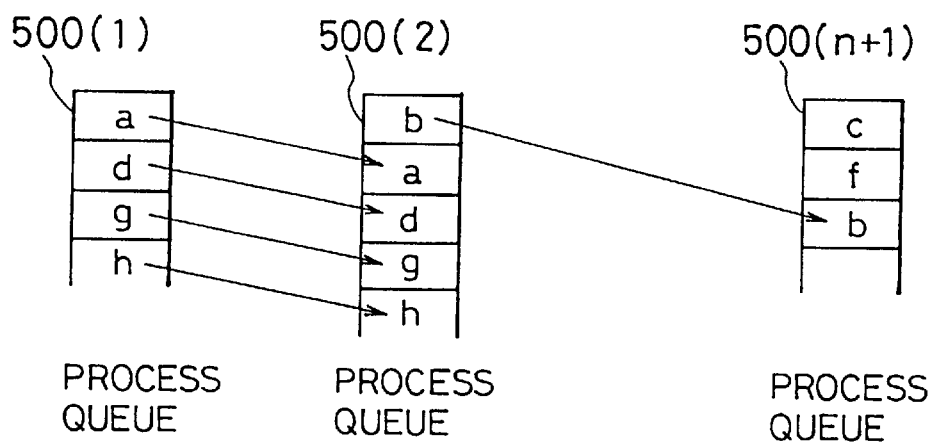
Figure 36:
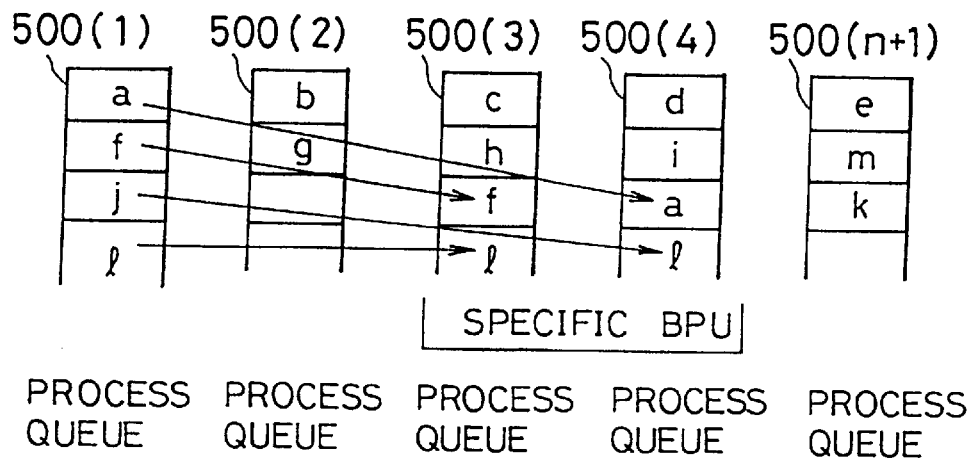
Figure 37:
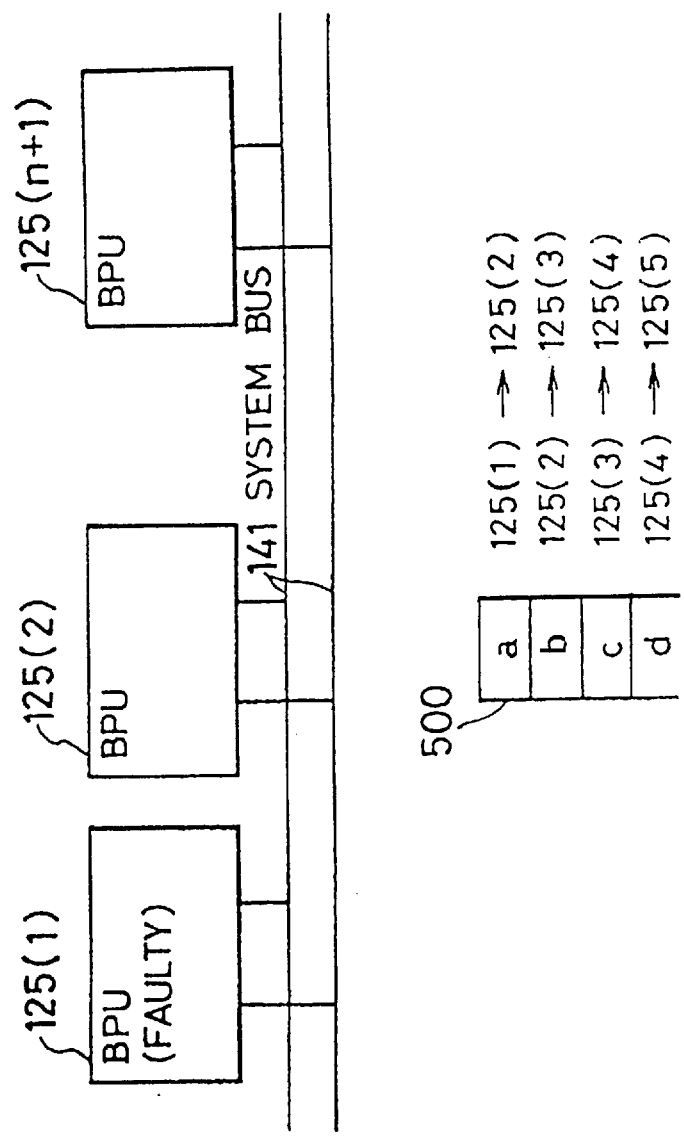
Figure 38:
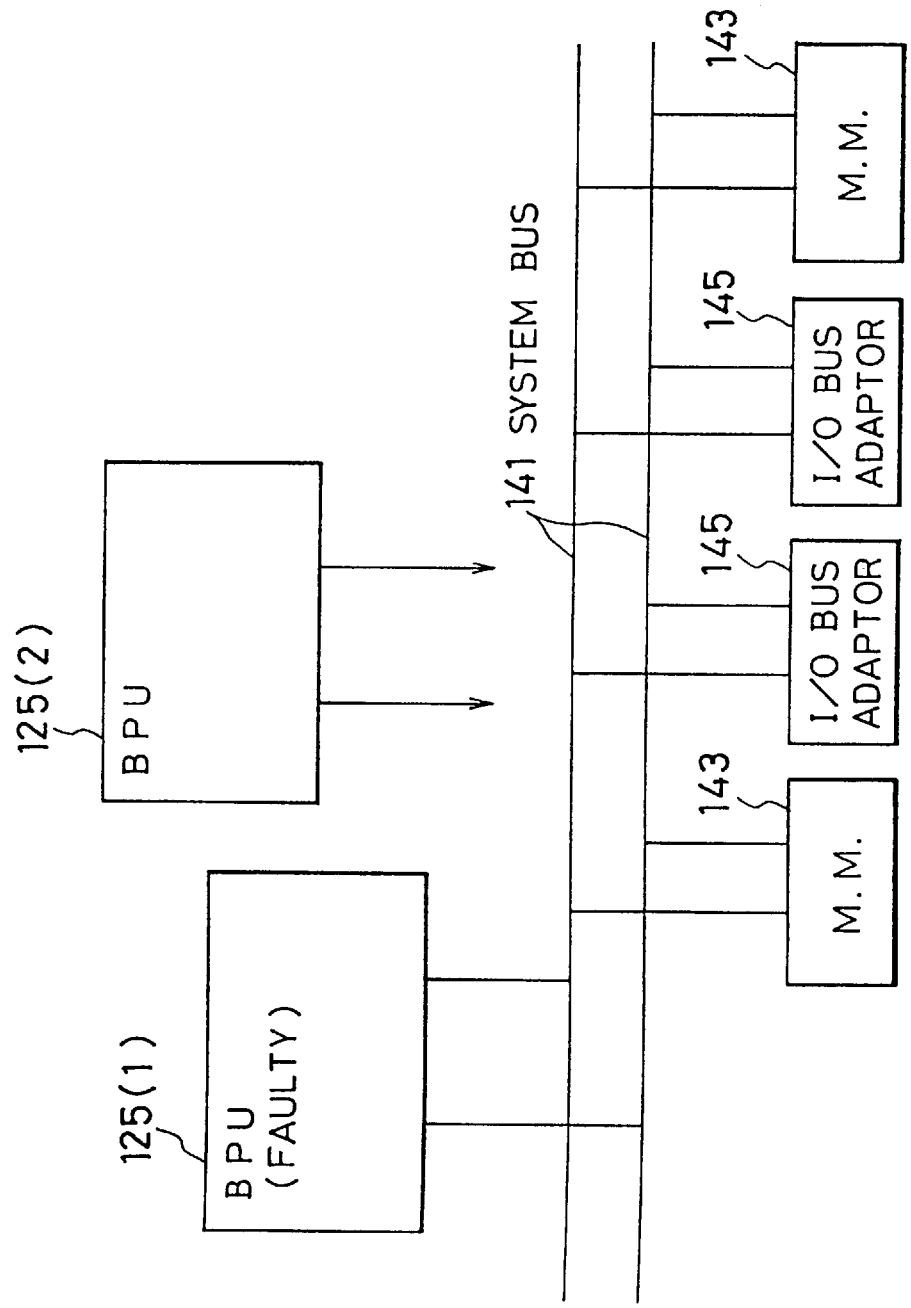
Figure 39:
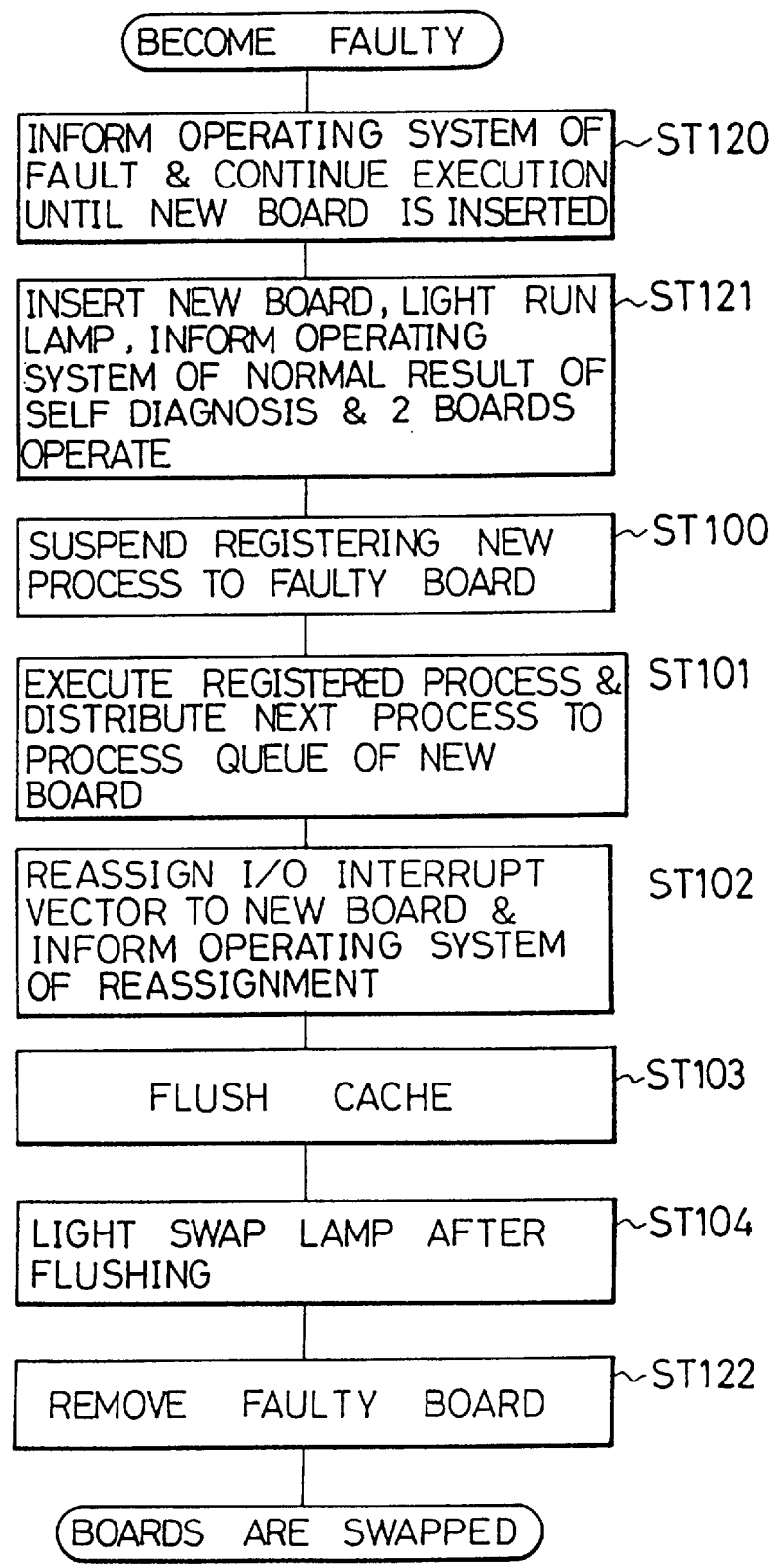
Figure 40:
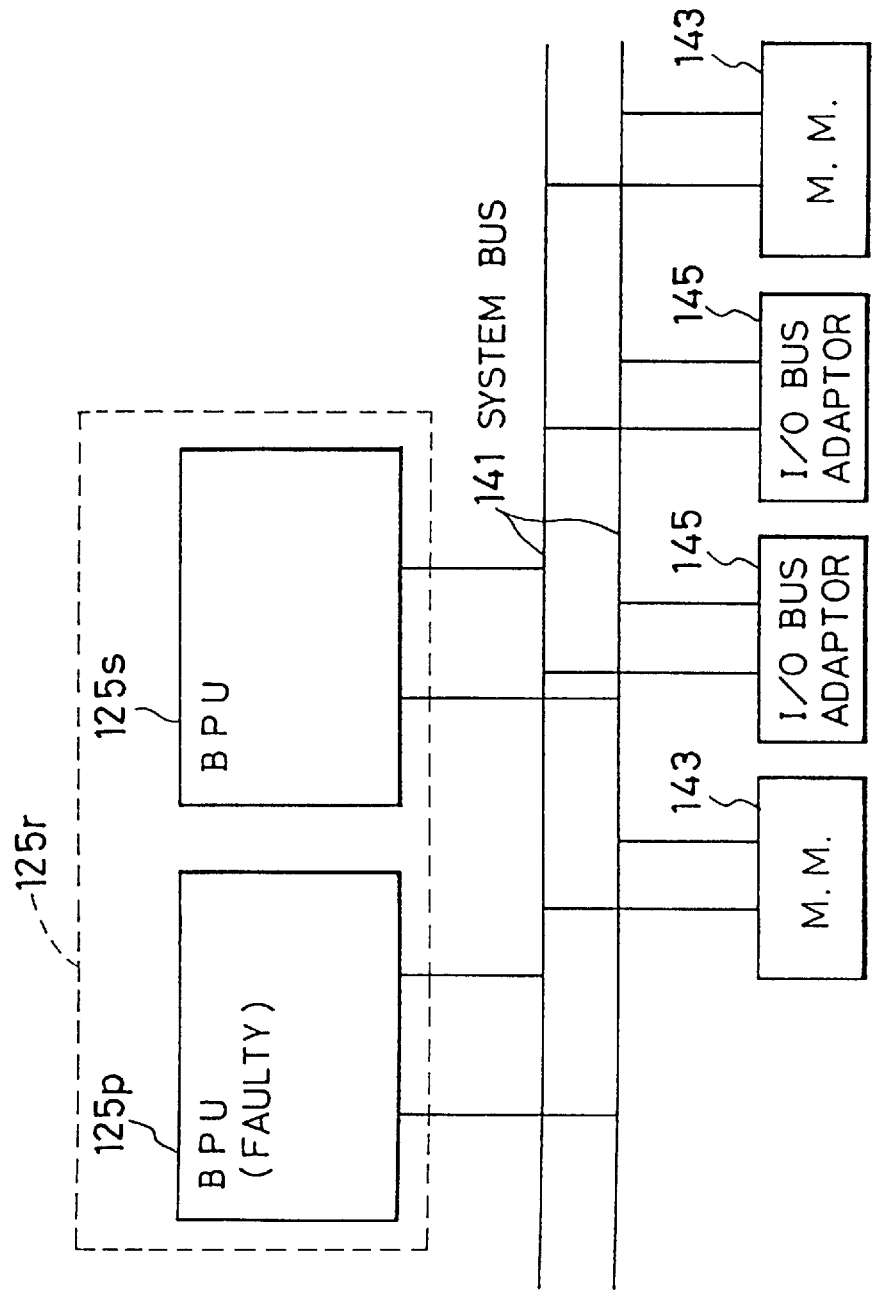
Figure 41:
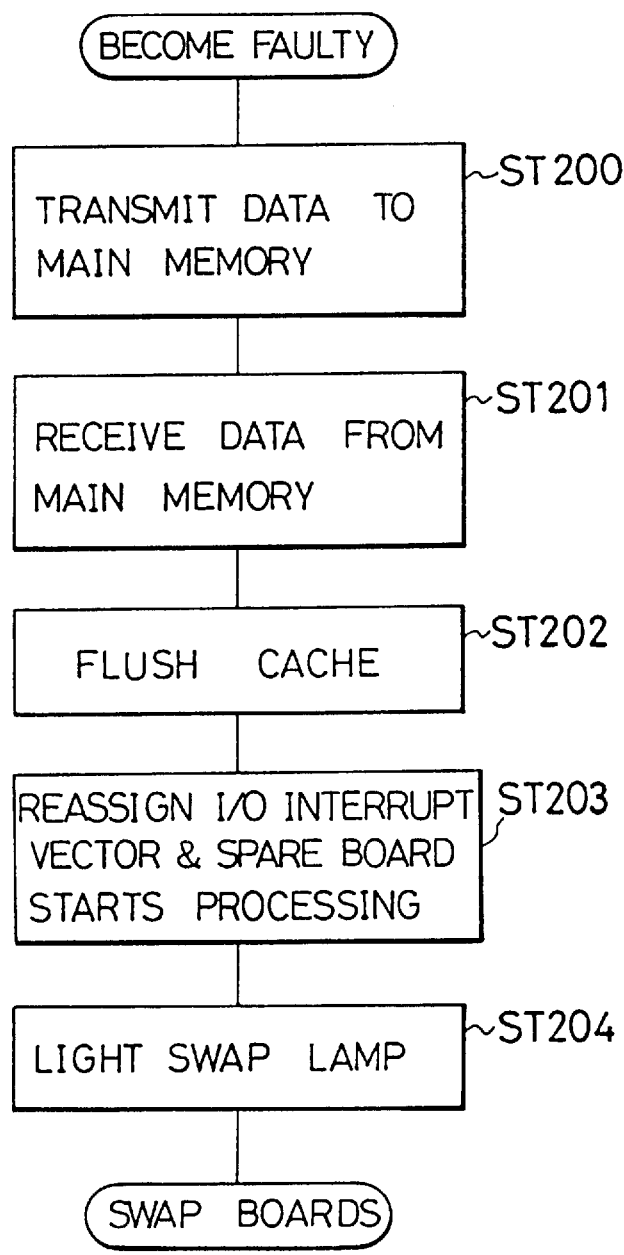

FIG. 11 shows bit-assign of a control register 271;

FIG. 12 is a flow chart showing a recovery procedure for the faulty processing unit according to Embodiment 1;

FIG. 13 is a timing chart showing a recovery procedure for the faulty processing unit according to Embodiment 1;

FIG. 14 shows saving area in a main memory 143-1;

FIG. 15 is a flow chart showing a sequence of self diagnosis at power-on time;

FIGS. 16(a) and 16(b) show a flow of the operation of Embodiment 1;

FIG. 17 is a block diagram showing a freeze circuit 202a in Embodiment 2;

FIG. 18 is a block diagram showing a function circuit 14a;

FIG. 19 is a block diagram showing a function circuit 14b in Embodiment 3;

FIG. 20 is a block diagram showing a freeze circuit 202b in Embodiment 4;

FIG. 21 is the block diagram showing a function circuit 14c;

FIGS. 22(a) and 22(b) show each length of time set by timers;

FIG. 23 shows operations (start/stop/process after the set time has passed) of the timers;

FIG. 24 shows a bit-assignment of a control register 271a;

FIG. 25 is a block diagram showing a general configuration according to Embodiment 5;

FIG. 26 is a block diagram showing a general configuration according to Embodiment 6;

FIG. 27 shows an example of indicating lamps of the processing board in Embodiment 7;

FIG. 28 shows a system configuration in case the embodiment applied to a multi-processor;

FIG. 29 shows a fault recovery procedure for an interrupt master processing board according to the embodiment;

FIG. 30 shows a fault recovery procedure for an interrupt slave processing board and an interrupt multi-cast processing board according to the embodiment;

FIG. 31 shows another fault recovery procedure for the interrupt master processing board;

FIG. 32 shows another fault recovery procedure for the interrupt slave processing board and the interrupt multi-cast processing board;

FIG. 33 shows example 1 of succession of the process of a multi-processor;

FIG. 34 shows example 2 of succession of the process of a multi-processor;

FIG. 35 shows example 3 of succession of the process of a multi-processor;

FIG. 36 shows example 4 of succession of the process of a multi-processor;

FIG. 37 shows another example of succession of the process of a multi-processor;

FIG. 38 shows a system configuration in case the embodiment applied to a single processor in Embodiment 8;

FIG. 39 shows a flow chart showing a fault recovery procedure for a single processor according to the embodiment;

FIG. 40 shows another system configuration in case the embodiment applied to the single processor in Embodiment 10;

FIG. 41 shows a flow chart showing a fault recovery procedure for a logic processing board according to the embodiment;

18

Figure 42:
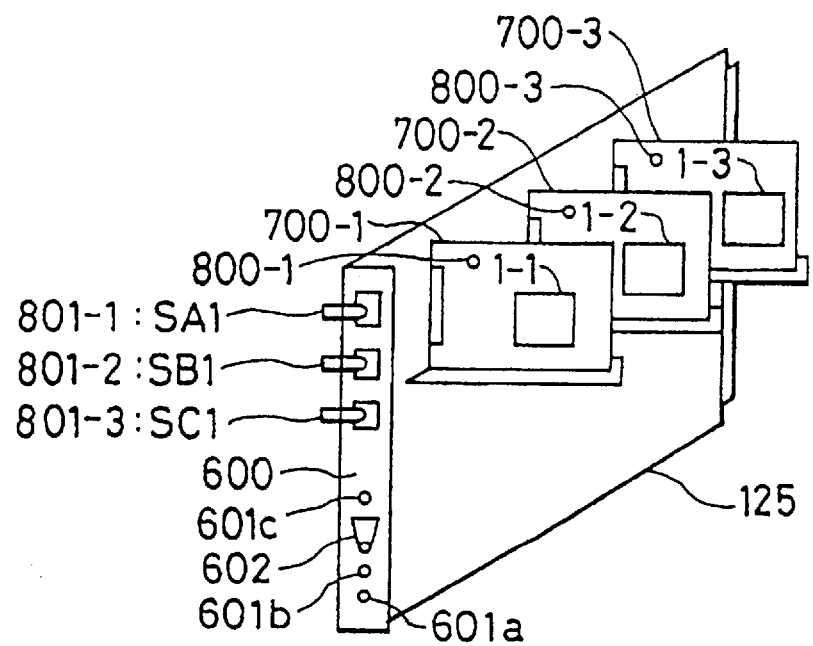
Figure 43:
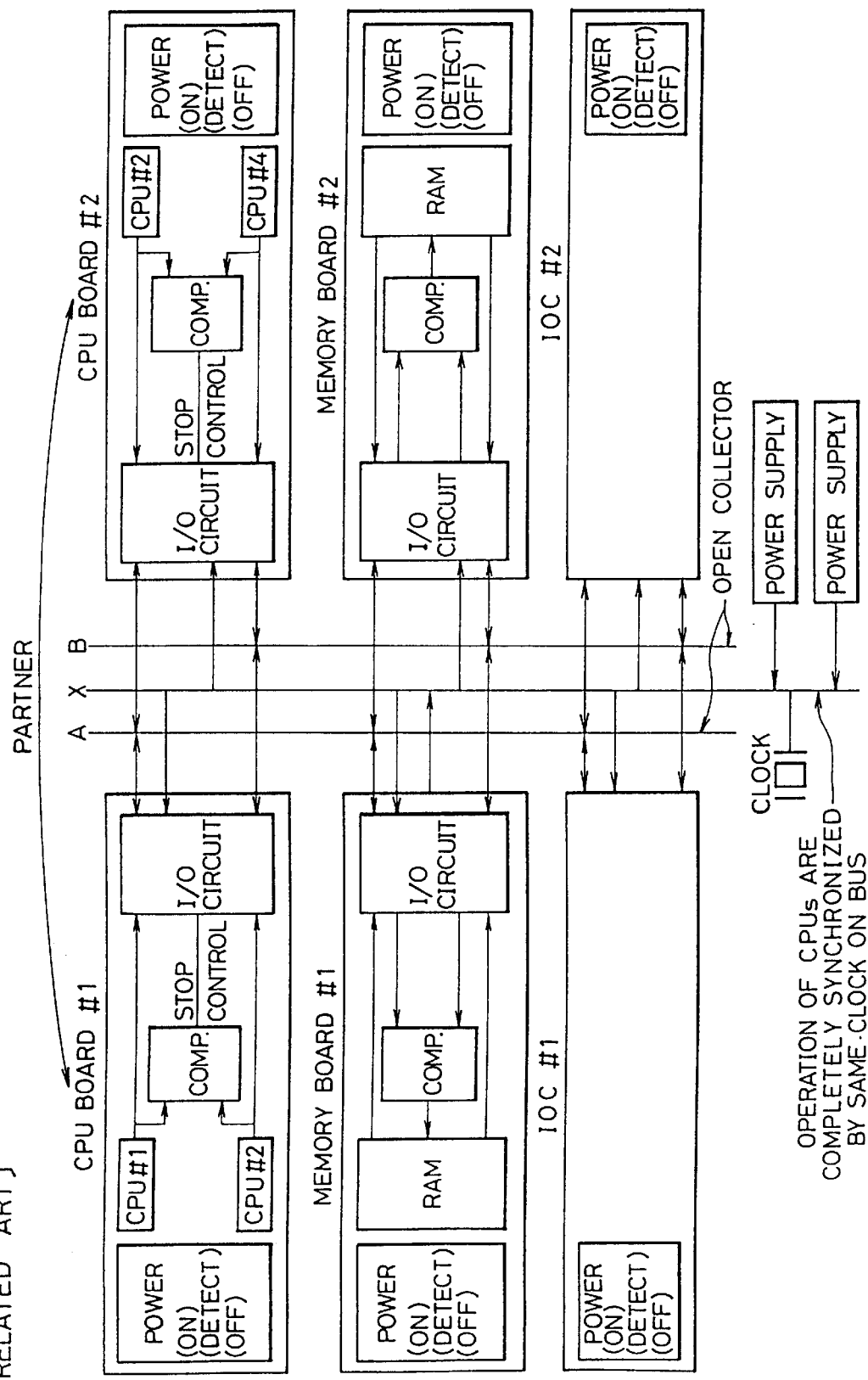
Figure 44:
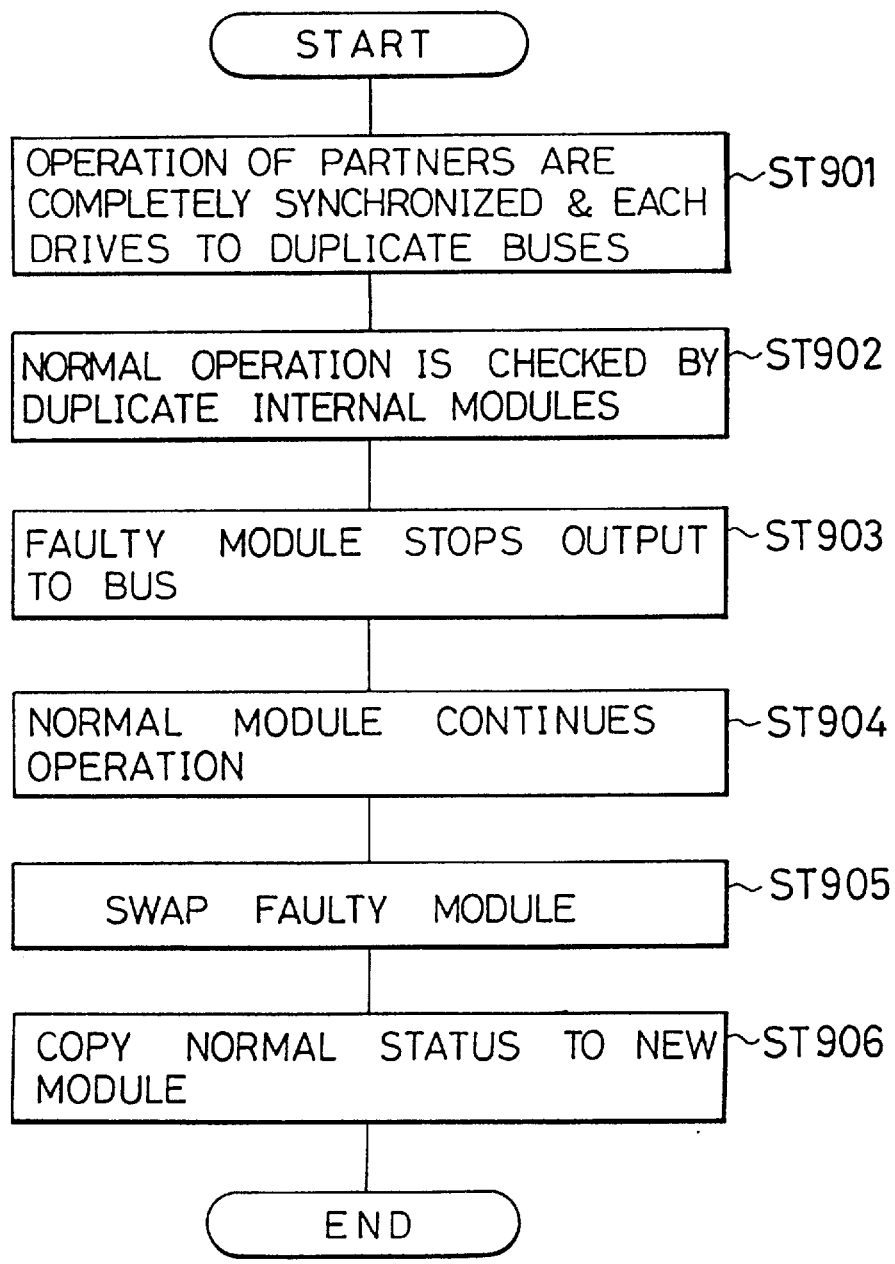
Figure 45:
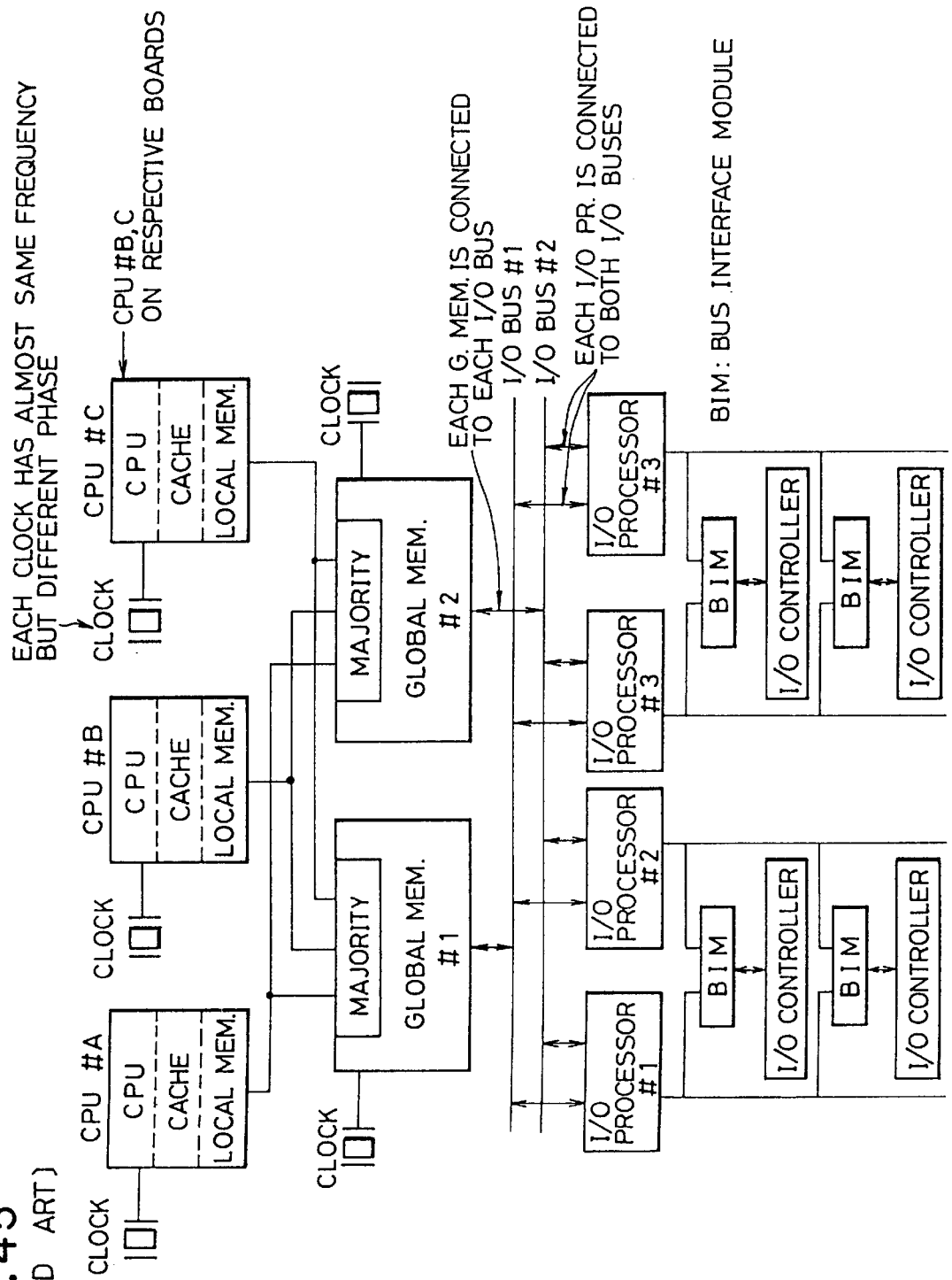
Figure 46:
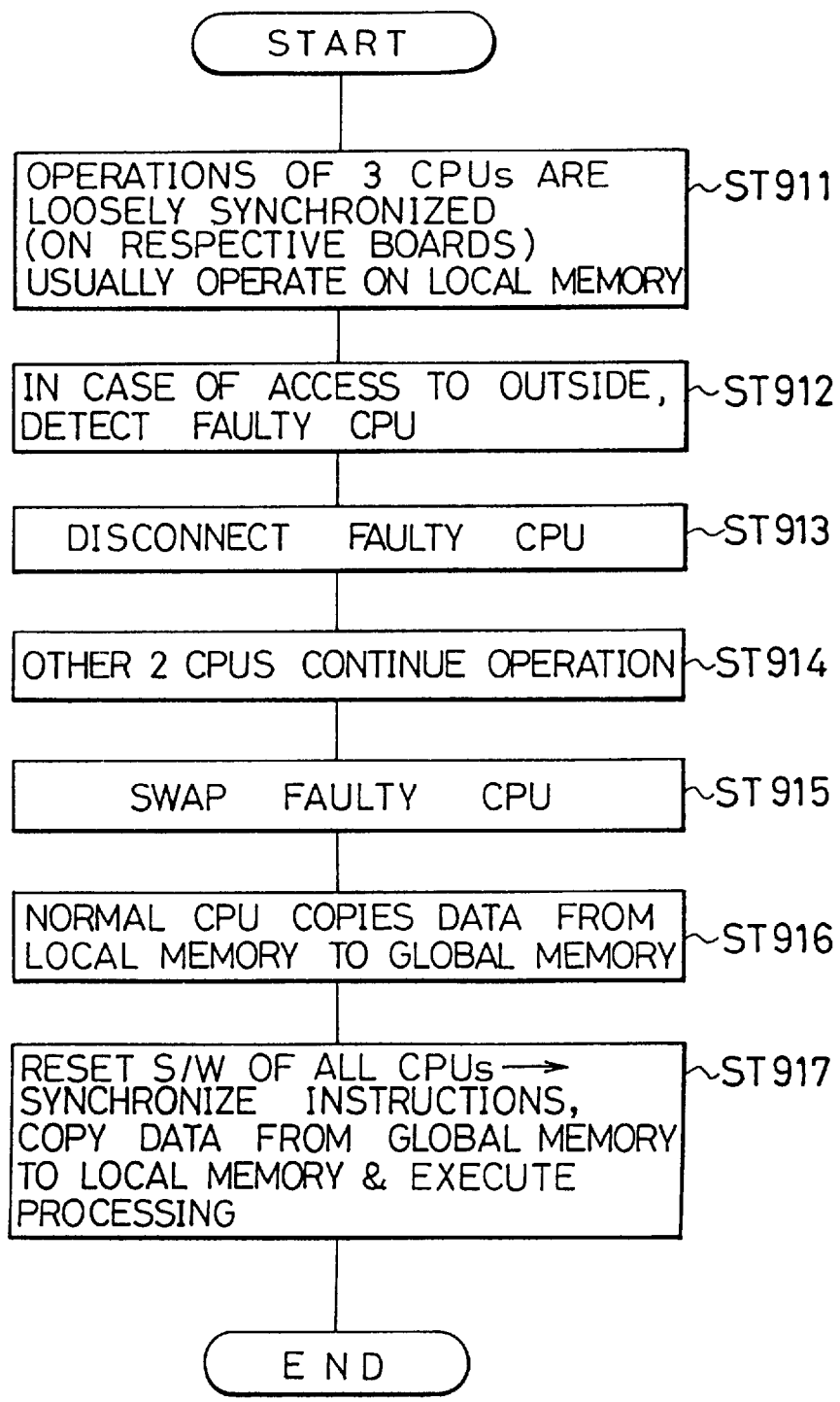
Figure 47:
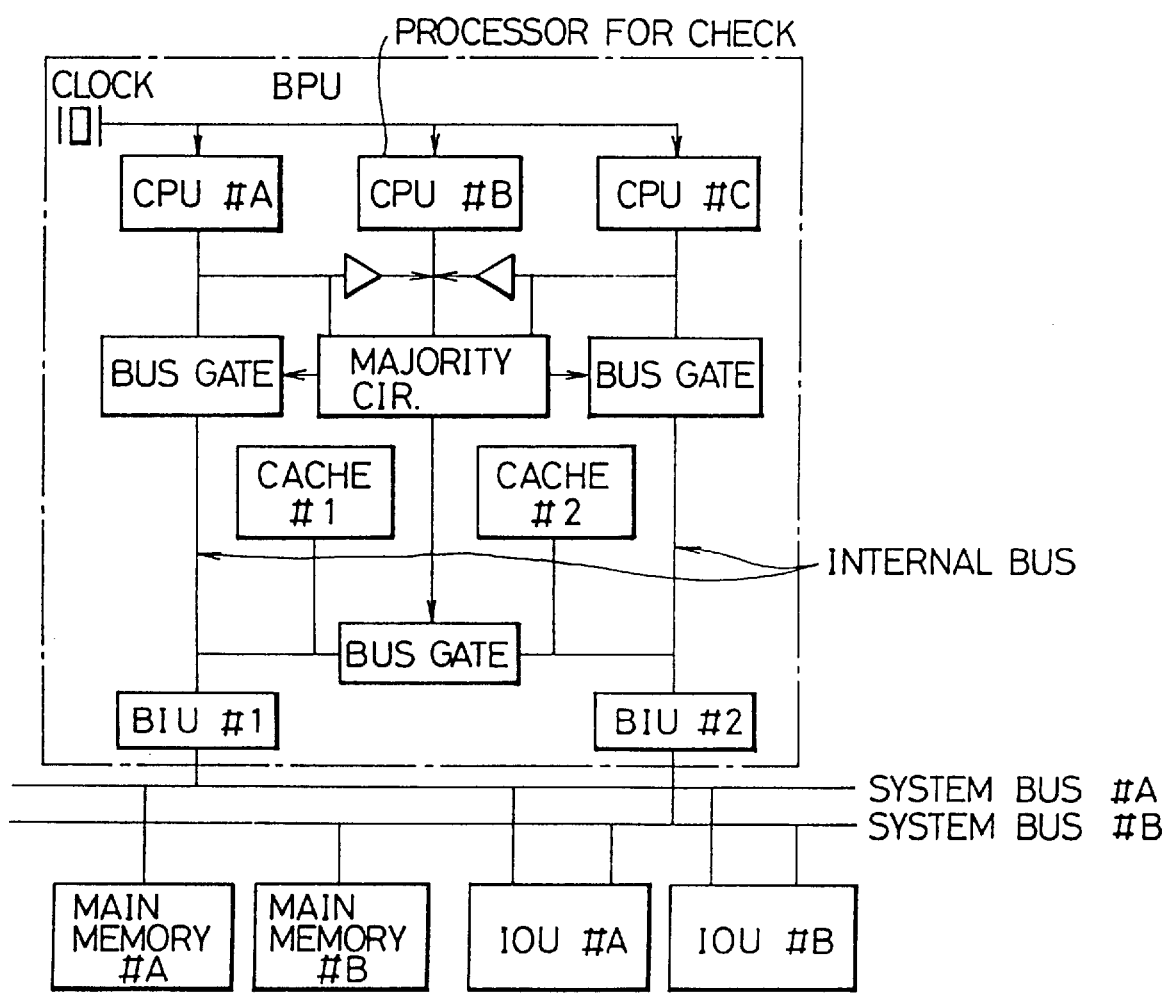
Figure 48:
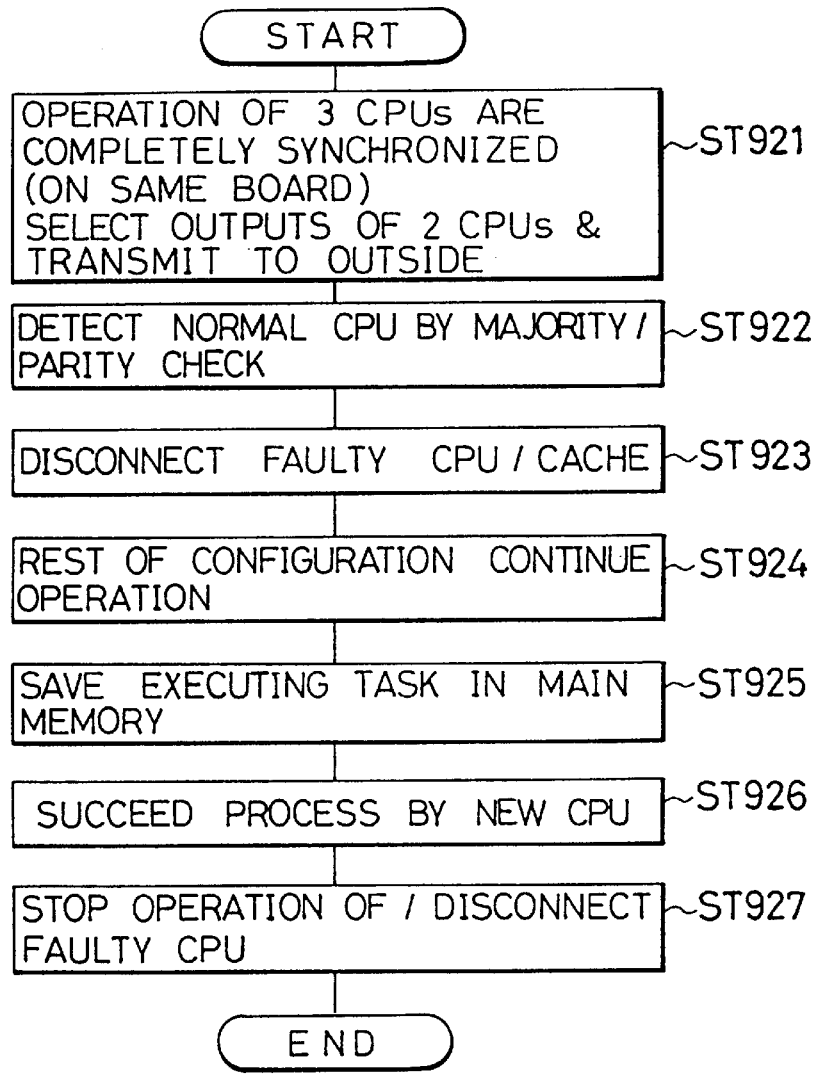
Figures 49A, 49B, 49C:
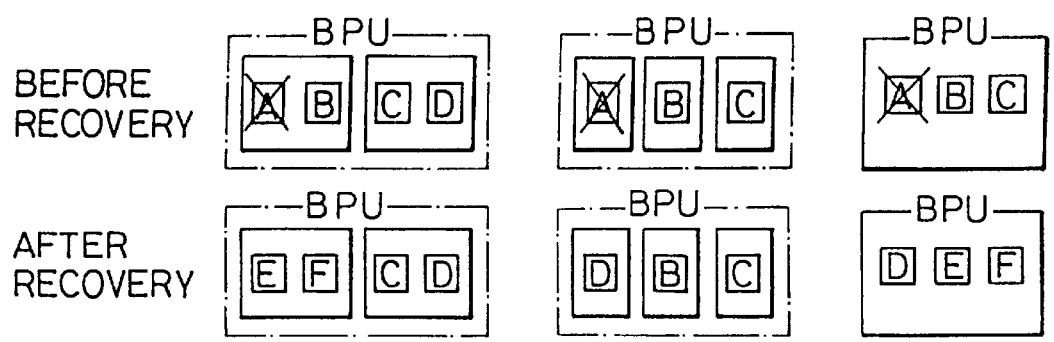
Figure 50:
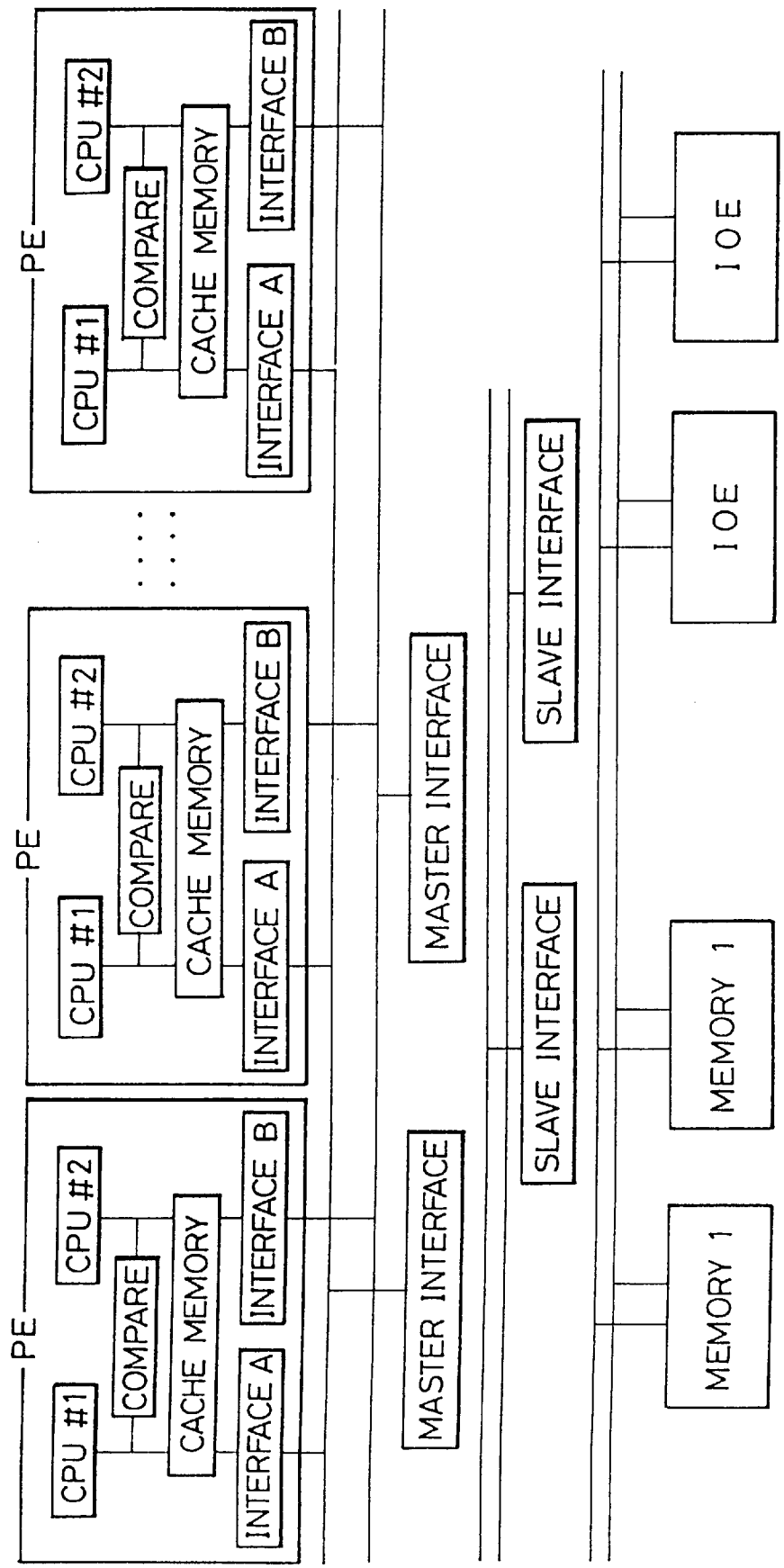

FIG. 42 illustrates a processing board having three daughter boards, each of which mounts a processing unit in Embodiment 12;

FIG. 43 is a block diagram showing a conventional digital data processor with high reliability;

FIG. 44 is a flow chart showing a conventional fault recovery system;

FIG. 45 is a block diagram showing a conventional fault tolerant computer;

FIG. 46 is a flow chart showing a conventional fault recovery procedure;

FIG. 47 is a block diagram showing a conventional computer system with high reliability;

FIG. 48 is a flow chart showing another conventional fault recovery procedure;

FIGS. 49(a), 49(b) and 49(c) show three examples of conventional fault recovery systems;

FIG. 50 is a block diagram showing a conventional memory backup system; and

FIG. 51 is a flow chart showing another conventional fault recovery procedure.

DETAILED DESCRIPTION OF THE PREFERRED EMBODIMENTS

The following is a detailed explanation of some embodiments according to this invention. The embodiments are divided under three headings as follows;

I. Basic Operation of a Processing Board

II. Recovery Method of a Processing Board

III. Recovery Method of a Processing Unit.

I. Basic Operation of a Processing Board

Embodiment 1.

[General Configuration]

Figure 1:
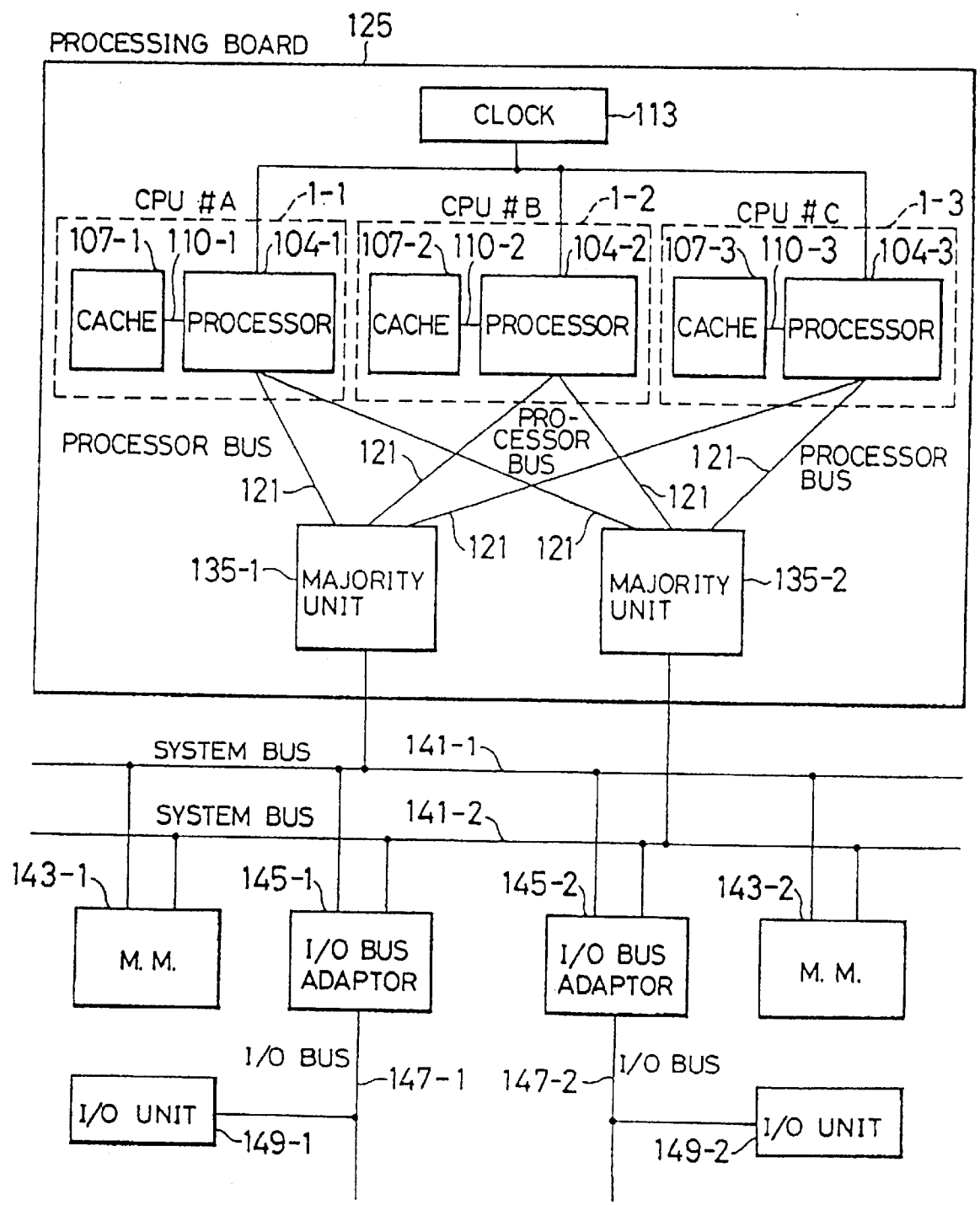
FIG. 1 is a block diagram showing a general configuration according to Embodiment 1 of the invention.

FIG. 1 is a block diagram showing a general configuration of a reliable computer according to Embodiment 1 of the invention.

In the figure, a processing board 125 mounts three processors 104-1, 104-2, 104-3. The operations of the three processors 104-1, 104-2, 104-3 are completely synchronized by a same clock 113.

The three processors 104-1, 104-2, 104-3 and three cache memories 107-1, 107-2, 107-3 are connected by buses 110-1, 110-2, 110-3, respectively. Each processing unit is configured by one of the processors 104-1, 104-2, 104-3, one of the cache memories 107-1, 107-2, 107-3 and one of the buses 110-1, 110-2, 110-3 as follows: a processing unit 1-1 (called CPU#A, or processing unit A), a processing unit 1-2 (called CPU#B, or processing unit B), and a processing unit 1-3 (called CPU#C, or processing unit C).

Each processing unit is connected to duplicate majority units 135-1, 135-2 through processor buses 121.

The majority unit 135-1 or 135-2 detects a majority out of the outputs of the processing units, including the cache memories 107-1, 107-2, 107-3. The majority unit controls an interface to duplicate system buses 141-1, 141-2, and controls response to the processing units.

Each of main memories 143-1, 143-2 and each of input/output bus adaptors 145-1, 145-2 are connected to each of two system buses 141-1, 141-2.

Each of I/O buses 147-1, 147-2 is connected to each of the two input/output bus adaptors 145-1, 145-2, and each of I/O units 149-1, 149-2 is connected to each of the I/O bus 147-1, 147-2.

The basic operation of the processing board is described below. When one of the processing units becomes temporally faulty, the faulty processing unit is disconnected, the other processing units continue to execute the same instructions, and the faulty processing unit is connected again to execute the process with the same configuration before becoming faulty.

In this way, the faulty processing unit can be connected and synchronized again and the faulty board does not need to be swapped when the processing unit becomes temporally faulty.

When the fault of the processing board is of a fixed type, the other part of the processing board continues to execute the process being executed, and a new process is immediately succeeded by one or a plurality of processing boards operating independently. Namely, in case of a primary fault of the processing board, the other part of the configuration can continue to execute the process, and a new process is immediately succeeded by another processing board, so that a system error caused by a secondary fault may be minimized and the availability of the system can be improved.

In the processing board, when one of the processing units becomes faulty and the fault is of a fixed type, the other processing units continue to execute the same instructions. The faulty processing unit is then swapped, and then normal processing may be continued.

In case of a fault of the processing board, in which the processing board is judged to be able to continue to operate, the process is continuously executed by the faulty processing board. In this way, the execution of the process is not suspended by the fault of the processing board. The temporally faulty processing board may continue to execute the process, because the processing board is configured as error free configuration having at least three processing units.

Even if the processing board becomes faulty, the process, that is, being executed or scheduled to be executed by the faulty processing board may continue to execute. The process of the faulty processing board can be distributed to other processing boards. This facilitates the succession of the process by another processing board.

The new process is distributed and succeeded by a process as a unit, so that the faulty processing board can be swapped at switching timing point of the processes.

The detailed operation will be described below.
[Writing Operation]

When writing to the main memory, the three processing units transmit a write address and write data to majority units 135-1 and 135-2, respectively, and the majority units compare them.

One processing unit is guaranteed to be normal and selected by the majority unit 135-1 from the processing units 1-1–1-3. The address and the data of the selected processing unit is output to a main memory 143-1 through a system bus 141-1.

In the same way, one processing unit is guaranteed to be normal and selected by the majority unit 135-2 from the processing units 1-1–1-3. The address and the data of the selected processing unit is output to a main memory 143-2 through a system bus 141-2. Namely, the same data as written in the memory 143-1 is written in the main memory 143-2.

Those skilled in the art will understand that the processing unit is guaranteed to be normal and selected by the majority unit, assuming that a so-called "single fault model" exists in the system.
[Reading Operation]

When reading from the main memory, the three processing units transmit a read address to the majority units 135-1 and 135-2. The received addresses are compared in the majority units 135-1 and 135-2 respectively.

One processing unit is guaranteed to be normal and selected by the majority unit 135-1 from the three processing units 1-1–1-3. The address of the selected processing unit is output to the main memory 143-1 through the system bus 141-1, and the corresponding data saved in the main memory is output back to the majority unit 135-1.

In the same way, one processing unit is guaranteed to be normal and selected by the majority unit 135-2 from three processing units 1-1–1-3. The address of the selected processing unit is output to the main memory 143-2 through the system bus 141-2, and the corresponding data saved in the main memory is output back to the majority unit 135-2.

In this case, which one of the majority units 135-1 and 135-2 outputs the data back to the processing units 1-1–1-3 is predetermined when the power is supplied, i.e., during initialization. When the selected majority unit becomes faulty, the other majority unit is selected and the process can be continued.

In this way, the main memories 143-1 and 143-2 output the same data to the majority units 135-1 and 135-2 through the system buses 141-1 and 141-2 respectively. The data from the selected majority unit is read by each of the processing units through each of the processor buses 121.
[Normal Operation]

Figure 2:
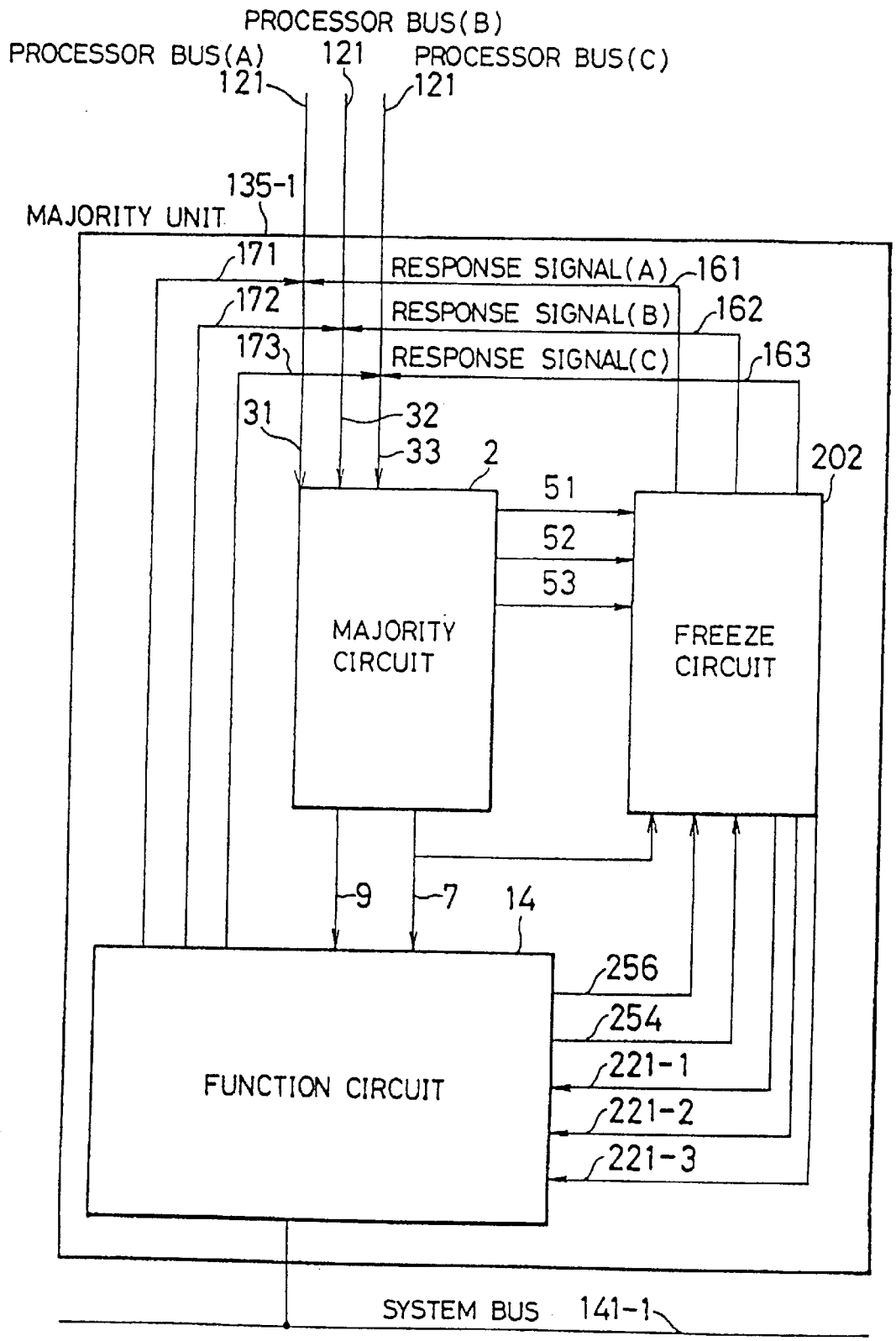
FIG. 2 is a block diagram showing a majority unit 135-1.

FIG. 2 shows an internal configuration of the majority unit 135-1 of the reliable computer according to Embodiment 1 of the invention.

The processor buses 121 transfer input signals 31 33, output signals 171–173, response signals 161–163, and so on. The input signals 31–33 are input to the majority unit 135-1 from the processing units. The input signals are configured as address signals, data signals, read/write signals, and so on. The output signals 171–173 are output to the processing units from the majority unit 135-1. The response signals 161–163 are transmitted to the processing units when the majority unit 135-1 finishes processing.

A majority circuit 2 compares the input signals 31–33 from the three processing units. One input signal is guaranteed to be normal by the majority circuit 2 and selected as a majority signal 7. The majority signal 7 is transmitted to a function circuit 14, which has an interface with the system bus 141-1.

The function circuit 14 interprets the contents of the process based on the majority signal 7, and reads from/writes to the main memory 143-1 or the I/O unit 149. The function circuit 14 transmits an internal response signal 254 to a freeze circuit 202 when the function circuit 14 becomes able to receive the next process from the processing units.

The freeze circuit 202 receives the internal response signal 254 and transmits the response signals 161–163 to the processing units 1-1–1-3. The processing units finish execution of one process by receiving the response signals 161–163.
[Majority Circuit]

Figure 3:
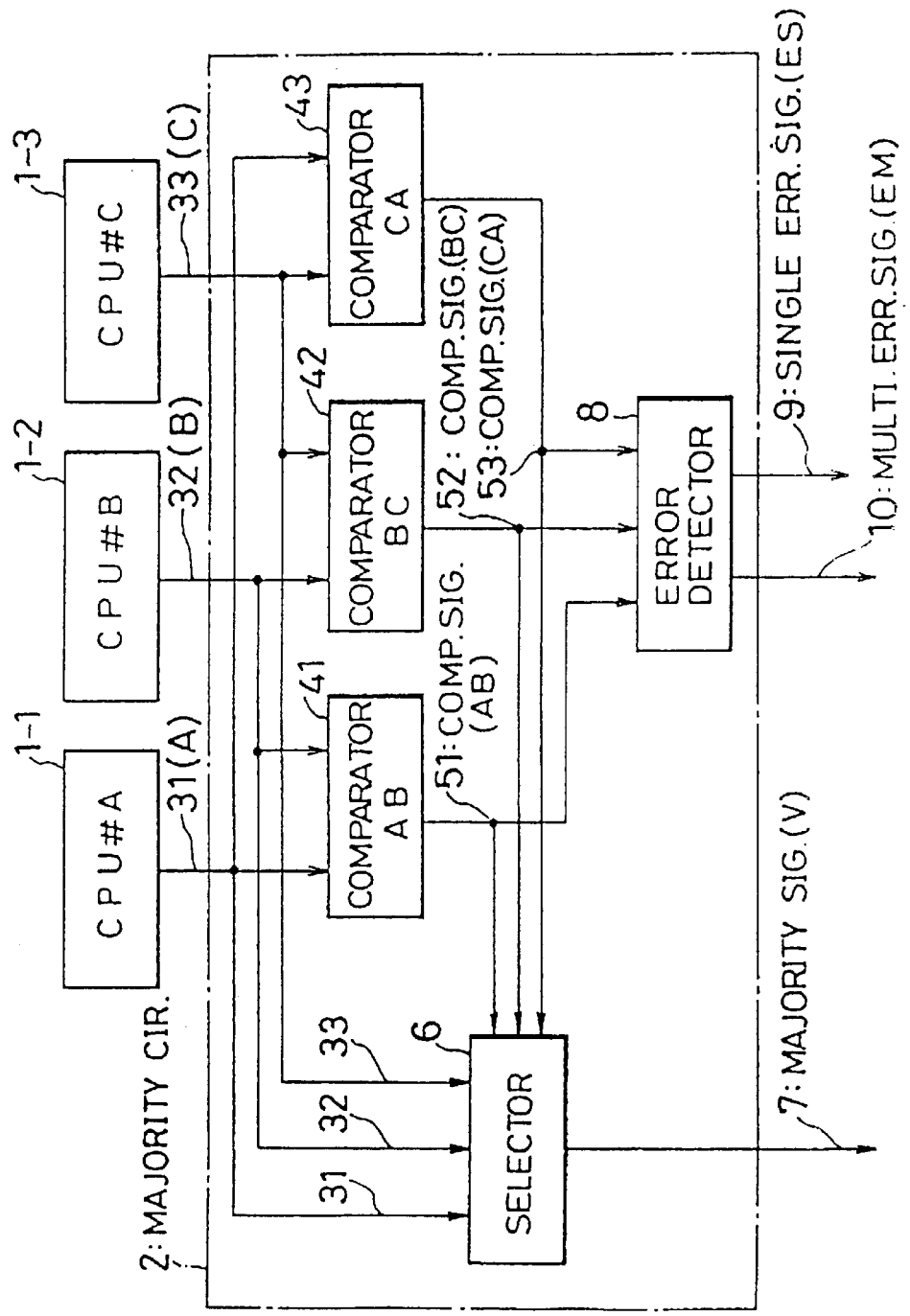
FIG. 3 shows a majority circuit 2.

FIG. 3 is a block diagram showing a general configuration of the majority circuit according to Embodiment 1 of the invention.

The input signals 31–33 from the processing units 1-1–1-3 are provided to comparators 41–43 and the selector 6. The selector 6 selects one of the input signals 31–33 as a majority signal 7 based on comparison signals 51–53 from the comparators 41–43. An error detector 8 detects an error by analyzing the comparison signals 51.

Figure 4:
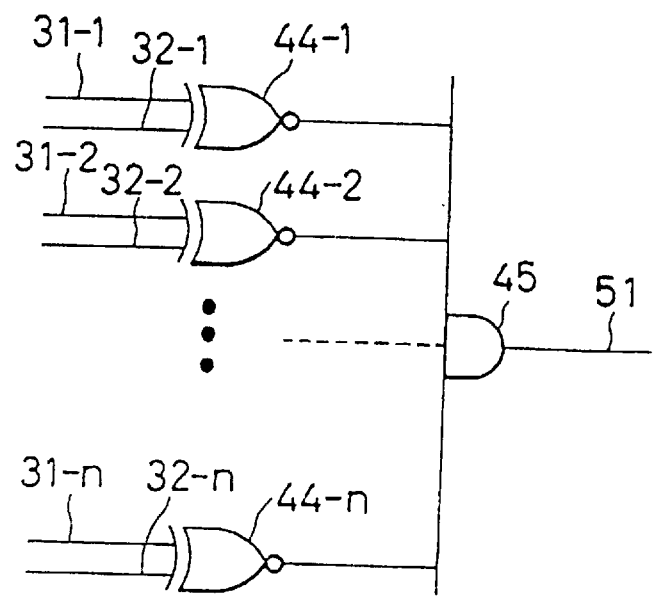
FIG. 4 shows a comparator 41 of the majority circuit 2.

FIG. 4 show a configuration of the comparator 41 in FIG. 3. Each of input signals 31-1–31-n shows each bit of the input signal 31 being input to the majority circuit 2 from the processing unit 1-1. In the same way, each of input signals 32-1–32-n shows each bit of the input signal 32 being input to the majority circuit 2 from the processing unit 1-2. Exclusive NOR circuits (EXNOR or equivalence gates) 44-1–44-n compare the input signals 31 and 32 bit-by-bit. The exclusive NOR circuit (EXNOR gate) outputs "1" when the input signals match. An AND gate 45 ANDs n bits. The AND gate outputs "1" as the comparison signal 51, when all of input signals of n bits are "1". In this way, the comparator 41 compares each of the n bits of the input signal 31 from the processing unit 1-1 and each of the n bits of the input signal 32 from the processing unit 1-2, and outputs the comparison signal 51.

In the same way, the comparator 42 compares the input signal 32 of the n bits from the processing unit 1-2 and the input signal 33 of n bits from the processing unit 1-3, and outputs the comparison signal 52. The comparator 43 compares the input signal 33 of the n bits from the processing unit 1-3 and the input signal 31 of the n bits from the processing unit 1-1, and outputs the comparison signal 53.

Figure 5:
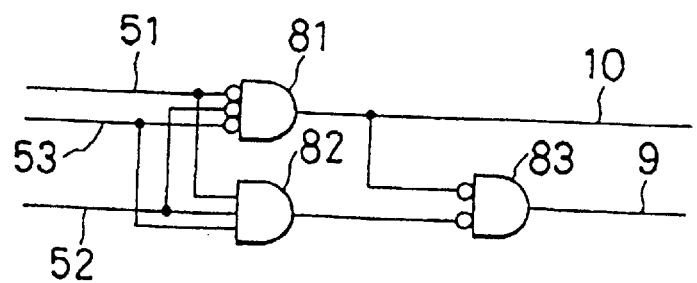
FIG. 5 shows an error detector 8 of the majority circuit 2.

FIG. 5 shows a configuration of the error detector 8 of FIG. 3. A 3-input NOR circuit (NOR gate) 81 outputs "1" as a multiple error signal 10, when all of the comparison signals 51–53 are "0". A 3-input AND circuit 82 outputs "0", when one of the comparison signals 51–53 is "0". A 2-input NOR gate 83 outputs "1" as a single error signal 9, when the multiple error signal 10 is "0" and the 3-input AND gate 82 outputs "0".

Figure 6:
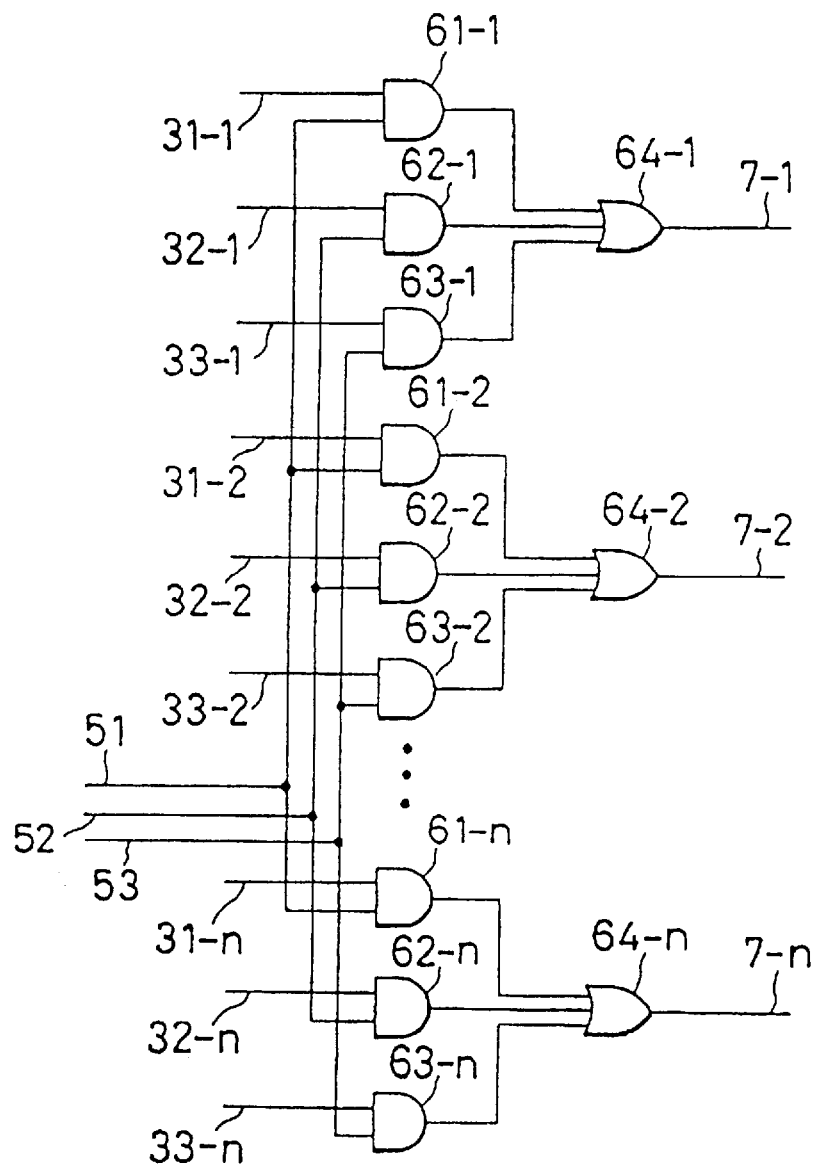
FIG. 6 shows a selector 6 of the majority circuit 2.

FIG. 6 shows one configuration of the selector 6 of FIG. 3. Each one of two inputs to the 2-input AND gates 61-1–61-n, 62-1–62-n, 63-1–63-n receives the output from three processing units, and the other input is each of the comparison signals 51–53. When the comparison signals 51–53 are "1", the output signals of the corresponding processing unit are output as majority signals 7-1–7-n via a 3-input OR gate 64.

FIG. 7 shows input signals, the comparison signals, and the output signals of the majority circuit of FIG. 3. To facilitate the explanation, the output signals of the processing units have two bits (n=2) in this figure. A–C indicates each of the signals 31–33 received by the majority circuit 2 from the processing units 1-1–1-3. Each AB, BC, and CA shows each of the comparison signals 51–53. V shows the majority signal 7. ES shows the single error signal 9. EM shows the multiple error signal 10.

The following is an explanation about an operation of the majority circuit configured as described above. An operation of the comparator 41, the selector 6, and the error detector 8 is mainly explained using FIGS. 4, 5, and 6 in reference with FIG. 7.

In FIG. 7, the first line and the second line show the cases in which all outputs of three processing units are equal. In these cases, all outputs of the 2-input EXNOR gates 44-1–44-n in the comparator 41 become "1". Thus, the comparison signal 51, which is an output signal from the AND gate 45, becomes "1". In the same way, the comparison signal 52 and the comparison signal 53 also become "1".

The comparison signals 51–53, which are "1", as described above, are received by the selector 6. Each of the 2-input AND gates 61-1–61-n, 62-1–62-n, and 63-1–63-n outputs a signal that is the same with each of the input signals 31-1–31-n, 32-1–32-n, and 33-1–33-n. These signals are also output as the majority signals 7-1–7-n via the 3-input OR gates 64-1–64-n.

The output signal of the 3-input NOR gate 81 (that is, the multiple error signal 10) becomes "0" in the error detector 8. And the 3-input AND gate 82 outputs "1". Thus, the 2-input NOR gate 83 outputs "0".

The third line of FIG. 7 shows a case in which only one of outputs of three processing units, i.e., the output of the processing unit 1-1, is different from the others. In this case, the comparison signal 51 of the comparator 41 and the comparison result signal 53 of the comparator 43 becomes "0". The comparison signal 52 of the comparator 42 becomes "1". The selector 6 outputs signals that are the same with the input signals 32-1–32-n received by the 2-input AND gates 62-1–62-n. The 2-input AND gates 61-1–61-n and 63-1–63-n output "0" in these cases. The input signals 32-1–32-n are used as output signals of the 3-input OR gates 64-1–64-n. Thus, the outputs of the processing unit 1-2 are selected as the majority signals 7-1–7-n.

The output signal of the 3-input NOR gate 81 (that is, the multiple error signal 10) becomes "0" in the error detector 8. The 3-input AND gate 82 outputs "0". Thus, the output signal of the 2-input NOR gate 83 (that is, the single error signal 9) becomes "1".

The sixth line of FIG. 7 shows a case in which only one of the outputs of three processing units is different. In this case, the outputs of the processing unit 1-1 are selected as the majority signals 7-1–7-n. The other operation is the same with the third line.

The fourth line, the fifth line, and the seventh line of FIG. 7 show the cases in which input signals 31–33 from the three processing units are all different. In this case, the comparison signals 51–53 of the comparators 41–43 become all "0". These comparison signals 51–53 are received by the selector 6. Because the comparison signals 51–53 are all "0", all of the 2-input AND gates 61-1–61-n, 62-1–62-n, and 63-1–63-n output "0", regardless of the contents of the input signals 31-1–31-n, 32-1–32-n, and 33-1–33-n. Thus, all of the 3-input OR gates 64-1–64-n output "0" as the majority signals 7-1–7-n.

The output of the 3-input NOR gate 81 (that is, the multiple error signal 10) becomes "1" in the error detector 8. The 3-input AND gate 82 outputs "0". Thus, the output signal of the 2-input NOR gate 83 (that is, the single error signal 9) becomes "0".

In this embodiment, the comparators compare each of two outputs from the three processing units, and the comparison signals are received by the selector and the error detector. The selector selects one output signal of the processing unit based on the comparison results. When all outputs of the processing units are different, the selector does not output any signals. The error detector analyzes the comparison signals and outputs the error status so that multiple errors of the processing unit can be detected.

Accordingly, an output of the normal processing unit is specified and is selected when an error occurs in one of the processing units. When the plural processing units produce errors, it is detected as a multiple error.

The multiple error signal 10 is not used in the example shown in FIG. 2. Thus the multiple error signal 10 is not included in the output signals from the majority circuit 2 in FIG. 2.

[Error Detection/Disconnection]

The execution of the process of the processing unit, which was judged as faulty by the majority circuit 2, is temporally frozen. While the execution of the process of the processing unit is frozen and the error does not influence to the whole process, the faulty processing unit executes self diagnosis to specify the cause of the fault. If the self diagnosis results in good and repairable status, the fault recovery procedure is performed and then the three processing units operate synchronously again.

In this way, even if one of the processing units becomes faulty, the processing board 125 operates normally as a system.

In FIG. 2, when one of the input signals differs from the other two input signals, the faulty processing unit is specified and disconnected from the majority circuit 2. The freeze circuit 202 freezes the operation of the faulty processing unit temporally by suspending the response signal to the faulty processing unit.

In this case, the majority circuit 2 informs the function circuit 14 of a single error by the single error signal 9.

Figure 8:
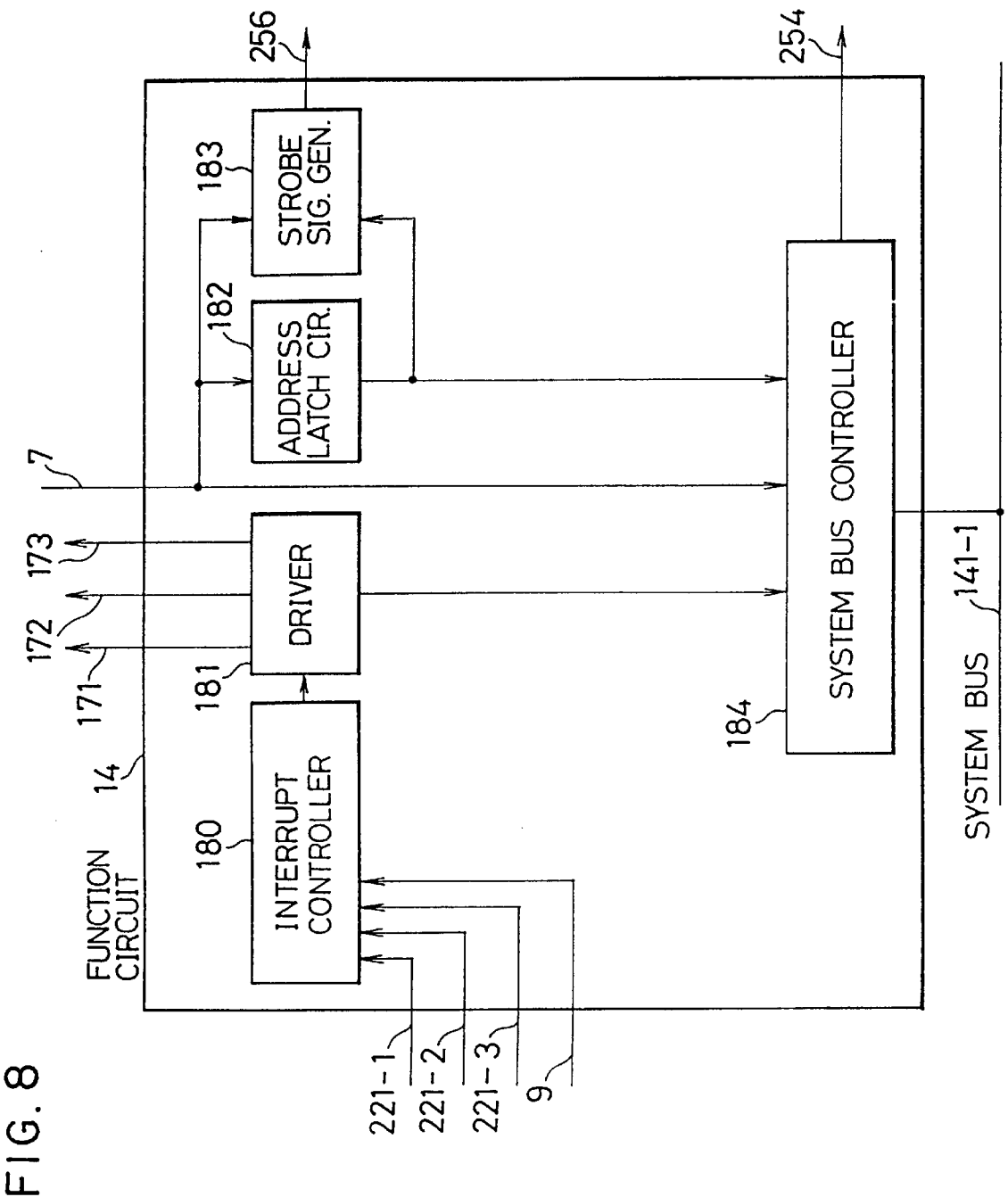
FIG. 8 shows an internal configuration of a function circuit 14.

FIG. 8 shows an internal configuration of the function circuit 14. The function circuit 14 includes an interrupt controller 180. The interrupt controller 180 informs the other normal processing units that the operation of the faulty processing unit is frozen by the freeze circuit 202.

The interrupt controller 180 outputs an interrupt information as the output signals 171–173 through a driver 181, and generates interruptions to the processing units. Thus, the other two normal processing units are informed that the faulty processing unit is disconnected and frozen.

The function circuit 14 also includes an address latch circuit 182 and a strobe signal generator 183. The address latch circuit 182 latches addresses included in the majority signal 7. The strobe signal generator 183 generates a control write signal 256 when there is a write request to the address assigned to the flags in the freeze circuit. Namely, the strobe signal generator 183 generates the strobe signal, which is the control write signal 256, to set the flag using the data included in the majority signal 7. The strobe signal is generated when the address latched by the address latch circuit 182 is matched to the address assigned to the flags in the freeze circuit 202, and also when the address is for a write request.

The function circuit 14 includes a system bus controller 184. The system bus controller 184 controls an interface with the system bus 141-1. The system bus controller indicates to the main memory 143-1, or one of the input/output bus adaptors 145 to execute input/output processes through the system bus 141-1. And the system bus controller recognizes that the process is finished by the main memory 143-1 or one of the input/output bus adaptors 145, and generates the internal response signal 254 and transmits it to the freeze circuit 202. The internal response signal 254 shows the ready status of the next process, and is transmitted to each of the processing units 1-1–1-3 by the freeze circuit 202.

[Disconnection/Isolated Operation]

Figure 9:
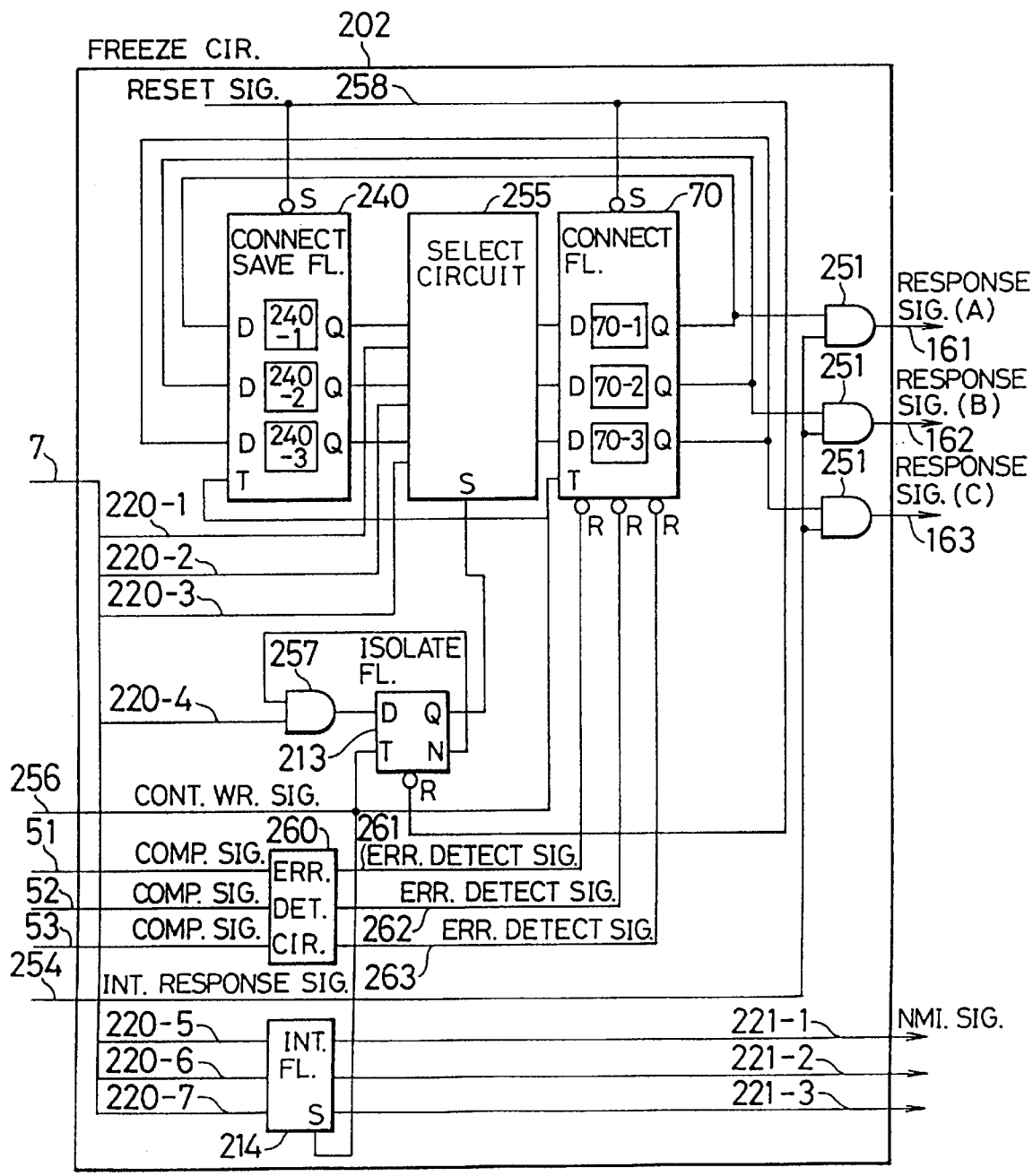
FIG. 9 shows a freeze circuit 202.

FIG. 9 shows an internal configuration of the freeze circuit 202.

In the freeze circuit 202, a connect flag 70 has three bits, each of which shows whether or not each of the processing units 1-1–1-3 is logically connected to the majority circuit 135.

Each of the connect flags 70-n (n=1–3) shows the connect flag corresponding to the processing unit 1-n (n =1–3).

A connect save flag 240 has three bits to save the previous status of the connect flag on each writing data in the connect flag.

The connect save flag 240-n (n=1–3) shows the connect save flag corresponding to the processing unit 1-n (n=1–3).

An isolate flag 213 has one bit, which shows whether the operating mode is the mode in which a plurality of processing units operate synchronously (synchronous mode) or the mode in which one processing unit operates isolatedly (isolated mode).

Each of AND gates 251 ANDs the internal response signal 254 and each of the outputs of the connect flag 70. The internal response signal 254 shows the ready status of the next process and is output from the system bus controller 184, which controls the interface with the system bus, as shown in FIG. 8. The AND gates 251 output the three response signals 161–163 to the processor bus 121. Each of the response signals 161–163 is transmitted to each of the processing units A, B, and C.

A data signal 220-n (n=1–7)shows a data signal 220 which is included in the majority signal 7 from the majority circuit 2 and used for transferring the data bit-by-bit.

A select circuit 255 selects one of the outputs of the connect save flag 240-n (n=1–3) and the data signals 220-n (n=1–3) based on the output of the isolate flag 213.

An AND gate 257 ANDs the output of the isolate flag 213 and the data signal 220-4 from the processing unit.

The control write signal 256 is the strobe signal generated by decoding the address information of the output from the address latch circuit 182 in FIG. 8. The control write signal requests to write to the connect flag 70, the connect save flag 240, and the isolate flag 213.

A reset signal 258 is output when the system needs to be reset at power-on time, etc.

An interrupt flag 214 generates non-maskable interruption, which is unable to be masked, to each of the processing units 1-1–1-3. The interrupt flags 214 has interrupt flags 214-1, 214-2, 214-3 which are not shown in FIG. 9. The interrupt flag 214 outputs unmaskable interrupt signals 221-n (n=1–3) for generating non-maskable interruptions to the processing units through the function circuit 14.

The non-maskable interrupt signal 221-n (n=1–3) shows corresponding non-maskable interrupt signal for generating an interruption to the processing unit 1-n (n=1–3).

An error detect circuit 260 receives the comparison signals 51–53, which are the outputs from the majority circuit 2 in FIG. 3, and outputs an error detect signal 261 (EA*:effective at low level) to the processing unit A, an error detect signal 262 (EB*:effective at low level) to the processing unit B, and an error detect signal 263 (EC*:effective at low level) to the processing unit C. FIG. 10 shows a truth-table based on the error detect circuit 260.

For example, in the sixth line, only the comparison result of the inputs from the processing units B and C matches, so that the processing unit A is considered to be faulty.

Thus, only the error detect signal 261 to the processing unit A (EA*) becomes "0" (effective at low level), and both the error detect signal 262 to the processing unit B (EB*) and the error detect signal 263 to the processing unit C (EC*) become "1" (effective at low level) and are output.

In the following explanation, the connect flag 70, the isolate flag 213, and the interrupt flag 214 are united to form called a control register 271. The control register 271 has the predetermined addresses.

FIG. 11 shows assignment of 7 bits of the control register 271 for the freeze circuit 202.

Each of bits 1–3 corresponds to each of three bits of the connect flag 70, and is set to "1" by each of the processing units 1–3, when the processing unit is logically connected.

A bit 4 corresponds to one bit of the isolate flag 213, and is set to "1" by one of the processing units, when the processing unit operates isolatedly.

Each of bits 5–7 corresponds to each of three bits of the interrupt flag 214, and is set to "1" by one of the processing units correspondingly, when a non-maskable interruption is required to be generated to the processing units 1-1–1-3.

The processing unit set the bits of the control register 271 by generating a write instruction to the predetermined address assigned to the control register 271.

An address and a write instruction of read/write signal, which are output from the processing unit, are judged as a writing instruction to the control register 271 by the address latch circuit 182 and the strobe signal generator 183 shown in FIG. 8. The strobe signal generator 183 generates the control write signal 256 as the strobe signal. The connect flag 70, the isolate flag 213, and the interrupt flag 214 set data output from the processing unit in the control register 271 based on the strobe signal.

When the data is written in the control register 271 while the isolate flag is set to "1", the connect flag 70 is set based on the contents of the connect save flag 240, and the isolate flag is reset to "0".

FIG. 12 is a flow chart showing the recovery procedure for the faulty processing unit included in the reliable computer according to Embodiment 1 of the invention.

FIG. 13 is a timing chart also showing the recovery procedure for the faulty processing unit.

In the following explanation, one of three processing units (for example, the processing unit A) is supposed to be faulty.

The initial values or the values during the normal synchronous operation of both the connect flag 70 and the connect save flag 240 are "111", and the isolate flag 213 is "0" based on the reset signal 258 (ST1, ST2).

The following is an explanation about an error detecting step 100.

The faulty processing unit A is detected by the majority circuit 2, and the corresponding error detect signal 261 is output.

Thus, the values of the connect flag 70 become "011", and the majority circuit 2 suspends the response signal 161 to the processing unit A. The processing unit A becomes frozen.

The single error signal 9 informs the interrupt controller 180 that one of the processing units has become faulty as shown in FIG. 8. The interrupt controller 180 generates interruptions to the normal processing units B and C. Thus, the processing units B and C recognize that the processing unit A is faulty ST7).

The following is an explanation about an error diagnosing step 200.

The processing unit B and C make the processing unit A operate isolatedly using the control register. Namely, the processing units B and C write "1001100" into the control register to freeze themselves (ST8 in FIGS. 12, 13), and the processing unit A is released from the frozen status and starts operating in the isolated mode.

When the processing units B and C write "1001100" into the control register, the previous values of the connect flag 70 "011" are saved in the connect save flag 240.

At the same time, the processing units B and C set the interrupt flag (bit 5) corresponding to the processing unit A. The highest level of the interruption is generated to the processing unit A, so that the processing unit A executes a special processing routine for error analyzing and self diagnosis (ST 2 in FIG. 12).

The processing unit A writes the error information and the self diagnostic result into a saving area (A) 291, which is one of predetermined saving area corresponding to the processing units A, B, and C in the main memory 143-1 as shown in FIG. 14 (a saving area (B) 292 corresponds to the processing unit B, and a saving area (C) 293 corresponds to the processing unit C).

The faulty processing unit A purges the cache memory 107-1 before setting the control register 271.

After writing to the main memory by the faulty processing unit A, the bits of the control register 271 are written (ST 3 in FIG. 12).

As described above, while the isolate flag 213 is set to "1", when the control register 271 is written by any kind of writing data, the connect flag 70 are set by the contents of the connect save flag 240. In this case, the connect flag 70 is set to "011", which were saved in the connect save flag 240, so that the processing units B and C start operating again.

The following is an explanation about a synchronizing step 300.

The contents of all registers of the processing units B and C, when the processing units B and C start operating again, are saved in the predetermined register saving area 294 in the main memory 143-1 (ST 9 in FIG. 12).

The processing units B and C analyze the contents of the saving area 291 written by the faulty processing unit A in the main memory 143-1, and judge if the processing unit A is repairable or not based on the self diagnostic result of the processing unit A (ST 10 in FIG. 12).

If the self diagnostic result is good, which means the fault is temporary one, the processing units B and C flush the cache memories 107-2, 107-3 (ST 11 in FIG. 12), and set the bits of the control register 271 to "1110000" (ST 12 in FIGS. 12 and 13).

The processing units A, B, and C restore the contents of all registers of the processing units, which were saved in the saving area 294 at step ST 9. In this way, contents of the registers of the processing unit A, which starts operating again, become the same with the contents of the registers of the processing units B and C STs 4, 13 in FIG. 12).

Thus, the processing unit A, B, and C finish the special processing routine for error recovery (STs 5, 14 in FIG. 12).

The writing instructions at steps ST3 and ST12, the restoring instructions at steps ST4 and ST13, and the returning instructions at steps ST5 and ST14 are stored in the same address in the main memory 143. The writing instructions at steps ST3 and ST12 are executed by the faulty processing unit A and by the normal processing units B and C respectively at different timing points.

The faulty processing unit A is made frozen immediately after step ST 3. When the normal processing units B and C execute the instruction at step ST 12, the frozen processing unit A is released from frozen status. Then, three processing units A, B, and C execute the same instruction lines synchronously at the same timing points.

If the self diagnosis results in bad, that is, the faulty processing unit A is judged to be unrepairable (ST 10), the contents of the control register 271 are not set, the processing flow jumps to step ST 13, and the execution of the process is continued with the faulty processing unit A disconnected.

[Self Diagnosis at Power on Time]

FIG. 15 is a flow chart showing sequence of the self diagnosis at power-on time.

At power-on time, three processing units start operating synchronously. And the processing unit A, for example, is made to operate in the isolated mode and to execute self diagnosis.

After the processing unit A finishes the self diagnosis, three processing units operate synchronously again.

Then, the processing unit B is made to operate in the isolated mode to execute self diagnosis. In this way, self diagnosis is executed sequentially one-by-one.

When all the self diagnoses have finished, three self diagnostic results are judged. If one of the processing units becomes faulty, the processing unit is disconnected by setting the corresponding bit of the connect flag 70 to "0".

After finishing the above process, three processing units start executing normal process synchronously.

FIGS. 16(a), 16(b) show a flow of the fault recovery procedure according to this embodiment.

At step ST 801, the operations of the three CPUs are completely synchronized, and the majority circuit selects one of the outputs of the CPUs and outputs it to the outside. At step ST 802, the faulty CPU is detected by the majority circuit.

At step ST 803, the faulty CPU is disconnected temporally. At step ST 804, the normal CPUs continue executing the process. At step ST 805, the faulty CPU operates isolatedly to execute self diagnosis. At step ST 806, when the faulty CPU is judged to be repairable based on the diagnostic result by the normal CPU, the operation of the faulty CPU is resynchronized. After resynchronizing, the faulty CPU operates again, and the process is returned to the step ST 801 where the operations of three CPUs are completely synchronized. If the faulty processing unit is not resynchronized at step ST 806, a new processing unit is added, the contents of the other normal processing units are copied to the new processing unit to operate synchronously with the other normal processing units, and the process of the faulty processing unit is succeeded by the new processing unit. Then, at step ST 808, the faulty processing unit is removed.

The followings are specific features of the configuration according to this embodiment.

(1) TMR method

Three processing units, each of which includes a CPU and a cache memory, are mounted on one processing board. One output is selected from the normal processing units by the majority.

(2) Bus configuration

The system bus and the I/O bus are connected by the input/output bus adaptor. The duplicate system buses are provided for connecting the processing units, the main memory, and the input/output bus adaptor.

(3) Automatic recovery from temporary fault

Temporary fault of the processing unit including the cache memory can be repaired without exchanging H/W. An error in the main memory may be also repaired.

(4) Succession of the process from the faulty processing unit

The process of the faulty processing unit is succeeded by H/W and or firmware ("F/W") without any impact to S/W.

The following advantages may be achieved by this configuration:

(1) The performance can be easily improved because the cache memory is directly connected with the processing unit.

(2) The reliability can be improved because the majority is taken including the cache memory.

(3) The conventional IOC can be used for this configuration.

As described above, in this embodiment, the following are provided for a fault recovery system of a computer: a plurality of the processors mounted on the same processing board; the cache memories connected with each of the processors (a processor and a cache memory are coupled and called "a processing unit"); the majority circuit for performing majority selection from the outputs of the processing units; the system buses connected to the majority units; the main memories and the input/output bus adaptors connected to the system buses; the I/O buses connected to the input/output bus adaptors; and the I/O units connected to the I/O buses.

In this embodiment, a plurality of the processing units are mounted on one processing board for operating at a high frequency. That is, if separate boards were used for each processing unit, the operating frequency will likely need to be lower. The processing results including the cache memory can be compared by the majority, which improves the reliability of the computer. An overhead for switching buses to the cache memory can be eliminated, and a high frequency operation can be performed by providing a cache memory for every plurality of the processing units. In addition, synchronous operation can be done by the same clock, without passing the clock among the boards.

In this embodiment, the response signal is provided for disconnecting and excluding the faulty processing unit from next majority, and for freezing the operation of the faulty processing unit when the above majority unit detects a mismatch based on the majority result.

The duplicate majority units are provided for achieving a high reliability of the processing board.

The isolated mode is provided for identifying the cause of the fault, specifying the element to be repaired based on the self diagnostic result, and judging whether or not the faulty processing unit is repairable for resynchronizing.

The connect save flag is provided for automatically saving the previous contents of the connect flag, so that the faulty processing unit can normally operate again after finishing the recovery process.

The faulty processing unit is connected for resynchronizing with the other normal processing units, and starts executing the same instruction sequence again at the last step of the resynchronizing process.

A plurality of the processing units are mounted on the same processing board according to this embodiment, so that the clock does not need to pass among the boards and the clock frequency is improved.

A plurality of the processing units operate synchronously by the same clock phase, so that the processing units do not need to synchronize each other for accessing to each memory; logic is thus simplified, and overhead for accessing memories is avoided.

The cache memory is provided in each of a plurality of the processing units, so that the comparison based on the majority of the processing results including the cache memory can be done, and the reliability of the computer is improved.

The cache memory is provided in each of a plurality of the processing units, and the outputs of the cache memories are compared, so that there is no overhead caused by switching the buses to the cache memories based on the comparison result, and a high speed operation can be achieved.

The processing board with a high reliability may be achieved by duplicating the majority unit.

The operation of the faulty processing unit is frozen by suspending the response signal, so that a second fault, such as destroying the contents of the processing board or the internal registers of the computer by an abnormal operation of the faulty processing unit, can be avoided.

The operation of the faulty processing unit is frozen by suspending the response signal, so that the status of the faulty processing unit is retained and analysis of the cause of the fault can be facilitated.

The faulty processing unit is made to operate in the isolated mode based on the judge of the normal processing units, so that the cause of the fault of the faulty processing unit can be determined, so that the element to be repaired can be specified, and so that it can be determined whether or not the faulty processing unit is repairable for resynchronizing operation.

The faulty processing unit cannot write into the connect flag, but the contents of the connect flags are automatically returned to the previous contents saved in the connect save flags only by a write operation into the connect flags. Thus, the faulty processing unit can return to the normal operation after finishing the recovery process.

The control register is set by the normal processing units to connect the faulty processing unit with the normal processing units. The control register is set at the last step of the resynchronizing process of the faulty processing unit. Then, all of the processing units execute the same instruction sequence, so that the faulty processing unit can be resynchronized with other normal processing units.

EMBODIMENT 2

FIG. 17 shows a freeze circuit 202a having an isolation observing timer 280 provided in the freeze circuit 202 shown in FIG. 9 of Embodiment 1. In this embodiment, the processing unit A, which is supposed to be faulty, can operate only during the time period set by the normal processing units B and C. Thus, the normal processing units B and C are prevented from remaining locked in the frozen status.

FIG. 18 shows a function circuit 14a having an isolation observe interrupt signal 423 provided to the interrupt controller of the function circuit shown in FIG. 8 of Embodiment 1.

In case of the isolated mode operation of the faulty processing unit A, the process being executed by the processing unit A is forced into a suspended state by a non-maskable interrupt signal 221-1, and the error analyzing routine starts executing. In this way, the operation becomes isolated from the error status to some degree, but according to the faulty status, there is still a possibility of being unable to set the control register 271 by the faulty processing unit A for releasing the normal processing unit B and C from the frozen status to return to the normal status.

To prevent this possibility, the isolation observing timer 280 automatically starts to count a predetermined time period (T1) when the operation enters in the isolated mode (the isolate flag turns to "1"). The isolation observing timer 280 sets the isolation observe interrupt signal 423, which is an output of the isolation observing timer, to "1" when the predetermined time period (T1) has passed. When the isolation observe interrupt signal 423 is generated, the freeze circuit sets the connect flag to the contents saved in the connect save flag 240, and resets the isolated mode. The faulty processing unit A returns to the frozen status, and the frozen normal processing units B and C start operating again.

The normal processing units B and C recognize that the output of the isolation observing timer becomes "1" by the interruption generated by an interrupt controller 180a shown in FIG. 18. The normal processing units B and C judge that the fault of the processing unit A is of a fixed type and that it is impossible to release the faulty processing unit A from the frozen status. The faulty processing unit A is excluded from the operation afterwards (the processing unit A is disconnected completely).

As described above, in this embodiment, the isolation observing timer is provided for preventing the whole systems of the computer from being locked.

The isolation observing timer may be also used for preventing the computer from hanging up at power-on time. If the self diagnosis is not executed normally at power-on time, the operation of the computer can return to the normal operating status by the above isolation observing timer.

By this embodiment, even if the faulty processing unit does not finish the operation while the normal processing units are frozen, the normal processing units can be released from the frozen status automatically by the isolation observing timer, so that the whole system of the computer can be prevented from remaining locked.

In addition, if the self diagnosis is not executed normally at power-on time, the operation of the computer can return to the normal operating status by the isolation observing timer, so that the computer does not hang up at the power on time.

EMBODIMENT 3

In Embodiment 2, when the faulty processing unit operates in the isolated mode, the operation of the computer can return to the normal operating status automatically by a time out function. But there is a possibility of destroying the contents of the main memory or the register of the outside controller, which are to be accessed by the normal processing units, by malfunction of the faulty processing unit.

FIG. 19 shows a function circuit 14b, which is the function circuit shown in FIG. 18 and in which the following is provided: a lower fence register 301 stores the top address of a writable address space; an upper fence register 302 stores the end address of the writable address space; and a check circuit 306 receives the contents of the lower fence register 301, the upper fence register 302, the isolation flag 213, an address signal 303, and a read/write signal 305 and outputs an enable signal 307, which allows access to the memory address space of the main memory and the I/O address space of the I/O unit.

The check circuit 306 generates the enable signal 307, which limits the hardware to access only to the address space defined by the lower fence register 301 and the upper fence register 302 in case of writing into the memory address space of the main memory and the I/O address space (when the read/write signal 305 indicates "write") while the isolation flag 213 outputs "1".

The check circuit 306 does not prevent the control register 271 (regardless of the data value) from accessing to bring the operation back to the frozen status from the isolated mode.

Writable address space is set in a range where the normal processing units B and C will not use for the normal operation.

In case of reading, all space is allowed to be accessed.

As described above, in this embodiment, the lower fence register and the upper fence register define the address space accessable by the faulty processing unit operating in the isolated mode. The lower fence register and the upper fence register are provided for preventing the contents of the main memory and the I/O controllers from being destroyed by malfunction of the faulty processing unit. The lower fence register and the upper fence register can be accessed by the normal processing units.

By this embodiment, the computer resources used by the normal processing unit are prevented from being destroyed. The address space that can be accessed by the faulty processing unit in the isolated mode is set by the normal processing units previously.

EMBODIMENT 4

In Embodiment 2, when the faulty processing unit A takes a long time for writing the error information and the self diagnostic result, the normal processing units B and C stop executing the program while the faulty processing unit A executes the fault recovery procedure.

Thus, the normal processing units B and C and the faulty processing unit A are desirably operated alternately so that the suspended time of executing the process can be limited within a predetermined time period and the recovery procedure can be also executed.

FIG. 20 shows a freeze circuit 202b, which is a revision of the freeze circuit 202a shown in FIG. 17 and in which the following is provided: an isolating timer 381 (timer set value=T2) for setting an operating time in isolated mode; an isolating interval timer 382 (timer set value=T3) for setting an interval between operations in isolated mode; and a synchronous flag 217 with one bit for indicating that the processing unit A has finished writing into the main memory 143.

FIG. 21 shows a function circuit 14c, which is a revision of the function circuit 14a shown in FIG. 18 in Embodiment 2 and in which an isolating time interrupt signal 421 and an isolating interval interrupt signal 422 are included in inputs of the interrupt controller.

When the time periods set in the timers have passed, an isolating timer 381 and an isolating interval timer 382 output the isolating time interrupt signal 421 and the isolating interval interrupt signal 422 respectively.

The isolation observing timer 280 is the same as the isolation observing timer shown in FIG. 17 and its set value is T1.

In addition, the processing unit set the timer set values T1, T2, and T3 to be T2<T1<T3 as shown in FIGS. 22(a) and 22(b).

In this embodiment, the isolated mode is executed every T3, the set value set in the isolating interval timer 382, as shown in FIG. 22(a). The isolated mode is executed during T2, the set value set in the isolating timer 381.

If the faulty processing unit can operate normally, the isolated mode is executed during only this set value T2, and then the normal processing units start operating. In this way, the faulty processing unit operates in isolated mode during T2 every T3.

If the fault of the processing unit is of a fixed type, the normal processing units cannot start operating until the time T2 passes. In this case, T1 set by the isolation observing timer 280 passes and this causes the isolated mode to finish forcedly. Then the normal processing units B and C can operate again.

FIG. 23 shows operations (start/stop/process after the set time passes) of the timers.

The synchronous flag 217 with one bit indicates that the faulty processing unit A finishes writing to the main memory 143. The synchronous flag 217 is set by the processing unit via a data signal 220-8 and the processing unit can write in the synchronous flag 217 even if the isolation flag 213 is "1" (isolated mode).

FIG. 24 shows a bit-assignment of a control register 271a including the synchronous flag 217 as an eighth bit.

The operation is explained below.

The faulty processing unit A starts operating in the isolated mode by the isolation flag 213 set by the normal processing units B and C. In this case, the isolation observing timer 280, the isolating timer 381, and the isolating interval timer 382 start counting.

During the processing, the processing unit A writes the error information to the main memory 143-1 normally, and T2 set in the isolating timer 381 passes. Thus, the isolation flag 213 is reset (the isolation observing timer 280 stops), and the normal processing units B and C start operating again.

If the faulty processing unit A has not finished writing all error information on the main memory 143, the processing unit does not set the synchronous flag 217.

The normal processing units B and C know that the faulty processing unit A has not finished the recovery procedure and execute the process normally.

When T3 set in the isolating interval timer 382 passes, an interruption is generated to the normal processing units B and C.

The normal processing units B and C set the isolation flag 213 again and write into the control register 271. The normal processing units B and C become frozen and the faulty processing unit A writes the remaining error information in the main memory 143-1. At the same time, the isolation observing timer 280 starts again.

These operations are repeated until the faulty processing unit A finishes writing the error information in the main memory.

When the faulty processing unit A finishes writing the error information, the synchronous flag 217 in the control register 271 is set to "1".

The normal processing units B and C know that the faulty processing unit A has finished writing the error information in the main memory 143-1 and has saved all contents of the registers in the main memory 143-1.

The operation afterwards is the same as the operation shown in Fig.

The isolation observing timer 280 continues counting up to T1 on every operation as shown in FIG. 22(a), but the isolation observing timer can operate in another way in which the isolation observing timer is reset on every operation of the faulty processing unit A and counts to T1 as shown in FIG. 22(b). In this case, T1 is reset repeatedly in the isolation observing timer on every starting time of the counting operation. Accordingly, it is desired that T1 should be a little longer than T2.

As has been described, in this embodiment, suspension of the operations of the normal processing units is limited within a predetermined time by providing the isolating interval timer and the isolating timer for limiting every operating time of the faulty processing unit.

In this embodiment, the faulty processing unit can operate during only the time set in the isolating timer at the interval set in the isolating interval timer. Thus, the suspension of the operations of the normal processing units caused by the operation of the faulty processing unit can be limited within a predetermined time period.

EMBODIMENT 5

FIG. 25 shows the case having a single majority unit 135a which detects the majority signal. Thus the reliability is improved at a low cost by simplifying the majority unit.

EMBODIMENT 6

FIG. 26 shows a processing board 125b, which is a revision of the processing board shown in FIG. 1 and wherein an I/O bus 145a is provided for connecting two input/output bus adaptors with the single I/O bus 147, thus precluding both I/O bus adaptors from accessing the I/O bus simultaneously.

A conventional computer can easily become fault-tolerant by connecting one processing board 125b shown in FIG. 26 with an I/O bus of the computer directly.

As described above, in this embodiment, the single processing board is provided for inserting to the single I/O bus of the conventional computer. The single processing board duplicates the various units except the I/O unit. Namely, the single processing board has the processing units, the majority unit for selecting one of the processing units, the processor bus for connecting all the processing units with the majority unit, the duplicate system buses connected to the majority unit, the main memory connected with each system bus, and the duplicate input/output bus adaptors connected with each system bus for controlling the interface input/output from/to the outsid.

The processing board itself can have enough reliability by the above configuration. The various units except the I/O unit in the conventional computer system can be duplicated by inserting the processing board directly in the conventional I/O bus.

II. Recovery system of processing board

Though the processing board 125 can continue the operation even if some element becomes faulty (this case is called "primary fault" hereinafter), it is desirable to remove the fault from the system as soon as possible. The following is a recovery method, by which another processing board succeeds the process of the faulty processing board immediately after the primary fault occurs, and the system can start operating normally again by swapping the faulty processing board to minimize the further system error caused by a secondary fault. In the following embodiments, a faulty processing board means a processing board having a faulty processing unit or a processing board having a faulty independent system.

EMBODIMENT 7

The processing board has, for example as shown in FIG. 27, a front panel 600, indicating lamps 601*a*, 601*b*, and 601*c*, and a hot swap switch 602 as prescribed by "Futurebus+" of IEEEstd 896-1991. The front panel 600 belongs to each processing board. The hot swap switch 602 is a switch for inserting or removing the processing board into or from the hot-line.

Operations of the indicating lamps are explained below.

The indicating lamps 601*a*, 601*b*, and 601*c* shown in FIG. 27 indicate the operating status of the processing board, that is, normal running, faulty running, and swappable status of the processing board can be known. A run lamp 601*a* turns on immediately after supplying power and remains lit during the normal running status without any faulty processing board. The run lamp also turns on when the processing board is inserted correctly to hotline. A fault lamp 601*b* turns on when an internal fault of the processing board occurs and the operation is continued by the rest of the configuration except the faulty element. The run lamp 601*a* remains lit even when the fault lamp 601*b* is on.

A swap lamp 601*c* turns on when the faulty processing board becomes ready to swap after the succession of the process of the faulty processing board by another processing board (the procedure is described later). When the swap lamp 601*c* turns on, the other indicating lamps 601*a* and 601*b* turn off. In case that the fault of the processing board is detected to be of a fixed type and the processing board cannot continue operating, only the fault lamp 601*b* turns on and the succession of the process is not executed.

The hot swap switch 602 is used when the processing board needs to be swapped, for example, in case of maintenance inspection during normal running, or upgrading the processing board. In case of removing the processing board, the hot swap switch 602 should be turned to "0" manually to inform the operating system of the removal request. The operating system starts succession of the process of the faulty processing board. The processing board is actually removed after the succession, and the processing board turns the swap lamp 601*c* on. Whether or not the faulty processing board is set to be swappable status is previously set in the operating system when the operating system does not execute the succession or when the fault of the processing board is fixed and the processing board cannot continue operating.

The processing board starts self diagnosis by turning the hot swap switch 602 to "1" manually after the processing board is inserted. If the self diagnosis results in normal, insertion of the board is informed to the operating system. The system configuration process of the operating system starts by inserting the processing board, and the system can run normally again. If the self diagnosis does not produce a good result, the fault lamp 601*b* turns on to indicate that the inserted processing board has a fault. In this case, the processing board is removed again and swapped for another new processing board.

It is also possible for the system to know the insertion of the processing board automatically by means of software, etc. instead of turning the hot swap switch 602 to "1" manually after the processing board is inserted.

[Recovery method of multi-processor]

The following is a recovery method of a multi-processor having a shared memory. FIG. 28 shows a system configuration of this embodiment. In the configuration, the processing boards 125, the main memories 143, and input/output bus adaptors 145 are connected with the system buses 141. A plurality of the processing boards 125 are provided and each of (1), (2), . . . (n+1) shows each number of the processing board.

An interrupt vector is distributed to each of processing boards 125. For example, interrupt vector=1 is assigned to the processing board 125(1); interrupt vector=2 is assigned to the processing board 125(2); and interrupt vector=n+1 is assigned to the processing board 125(n+1). These interrupt vectors are identifiers showing which processing board receives I/O interruption generated by the input/output adaptors 145, etc. The interrupt vector is appended to the I/O interruption generated by the input/output adaptors 145 to the system buses 141. The processing board has an assigned interrupt vector and receives the I/O interruption having the same interrupt vector.

In this embodiment, the system includes N+1 processing boards 125, that is, an extra processing board is added to N (N>=1) processing boards needed for some amount of processes. Each processing board is mounted in a slot provided in each chassis.

The following is the succession of the process assigned for the faulty processing board.

For example, one of three processing units is faulty in the processing board 125(1). Operation is continued by the rest of the configuration except the faulty element. In the processing board 125(1), during this operating status, the run lamp 601*a* and the fault lamp 601*b* remain on. The fault of the processing board 125(1) is informed to the operating system and the faulty status is checked there. If the fault is judged to be of a fixed type, the succeeding procedure starts.

The operating system controls the process of each of processing boards 125. Generally, the operating system distributes processes to the processing boards 125 by a management unit of the process (this is called "process" hereinafter). Each of the processing boards 125 usually has some reserved processes besides the process which is being executed currently. These reserved processes are registered in a process queue corresponding to each processing board. The processing board executes the process based on the procedure registered in the process queue.

The operating system suspends registering a new process in the process queue of the faulty processing board immediately after the fault occurs. The operating system distributes the process, which is to be registered in the process queue and executed by the faulty processing board, to a process queue of other processing board to succeed the process.

Succession of the process actually starts at a switching timing point of the processes as soon as possible by the operating system which is informed of the fault. The operating system suspends distributing a new process to the faulty processing board, and the reserved process, which is to be executed by the faulty processing board 125(1), is shifted to and succeeded by a plurality of processing boards such as the normal processing board 125(2). The operating system for executing the succeeding procedure works on the processing board, which is an interrupt master processing board (described later).

By the above succession of the process, the plurality of normal processing boards 125(2)–125(n+1) succeed the process of the faulty processing board 125(1). Until the faulty processing board is swapped, processing ability may degrade because a lot of the load may temporally focus to these plurality of processing boards. However, in this embodiment, N+1 processing boards 125 execute the process of processing amount for N processing boards as described above. Thus, N processing boards execute the process after the succession, namely, succeeding the process can be executed with N load dispersion, which is previously expected.

If there is no processing board to succeed, succeeding the process is not executed, the faulty processing board continues processing without repairing the faulty element, and the faulty processing board executes "recovery method for a single processor" as described below.

The operation after the succession is explained below. When the succession is finished, the faulty processing board 125(1) immediately becomes ready to be swapped. The faulty processing board turns the swap lamp 601c on. The run lamp 601a and the fault lamp 601b are turned off. Then, the faulty processing board 125(1) is swapped for a normal processing board. The processing board 125(1) can be swapped under hot-line status, which doesn't influence to the operation of the system. The fault should be completely disconnected from the system, so that the faulty processing board 125(1) is desired to be swapped as soon as possible. Thus, the system is back to the original configuration by the operating system after swapping the processing board.

After inserting the new processing board, the processing board turns the run lamp 601a on. And after finishing self diagnosis, the processing board informs the operating system of the normal completion of the self diagnosis by the interruption. The operating system starts to schedule processes to the new processing board according to system configuration process. In this way, the system can be back to the normal operating status.

FIGS. 29 and 30 show a flow of the procedure from succeeding the process to swapping the boards. The procedure of succeeding the process of the faulty processing board differs according to how the interruption is received from the I/O units in the multi-processor configuration. As shown in FIG. 28, the interrupt vector is assigned to each of the processing boards 125 for distinguishing each I/O interruption. For example, the I/O interruption transmitted through the system bus 141, and one of a plurality of processing boards is set to an interrupt master processing board. Other processing boards are set to interrupt slave processing boards. The interrupt master processing board, first, receives all I/O interruptions with interrupt vector assigned to the interrupt master processing board. The interrupt slave processing board receives the interruption which was first received by the interrupt master processing board and which was distributed to each interrupt slave processing board with an interrupt vector assigned to the interrupt slave processing board by the interrupt master processing board. The fault recovery method of the interrupt master processing board and the interrupt slave processing board will be explained below.

FIG. 29 shows a flow of fault recovery procedure of the interrupt master processing board. When the operating system is informed of a fault, the operating system suspends registering processes in the process queue of the faulty processing board (ST100). The faulty processing board executes only the process already registered, and the other processes queued to the faulty processing board are registered, i.e., re-queued in one or a plurality of the other processing boards, which operate simultaneously (ST101).

After executing the process already registered, the interrupt vector of the faulty processing board is reassigned to other processing board based on the predetermined priority (ST102). In FIG. 28, for example, the processing board 125(1), which is the interrupt master processing board, is assumed to become faulty. Priority of the processing board for re-assigning the interrupt vector is determined previously. In this case, the priority of the processing boards is as follows: the interrupt vector is to be reassigned to the processing board whose number is one more than the number of the faulty processing board, and if the processing board with the first priority cannot accept the reassignment of the interrupt vector, the interrupt vector is reassigned to the processing board whose number is two more than the number of the faulty processing board. That is, if the processing board 125(1) becomes faulty, the processing board 125(2) has a first priority for succeeding the interrupt vector of the processing board 125(1). Thus, the interrupt vector =1 of the processing board 125(1) becomes the interrupt vector of the processing board 125(2). The new interrupt vector =1 is overwritten on the original interrupt vector =2 of the processing board 125(2).

Reassigning the interrupt vector should be done atomically. Accordingly, all I/O interruptions are masked to prevent any I/O adaptors 145 from generating interruption. The interrupt vector is reassigned during this masking period.

As soon as finished, the reassignment of the interrupt vector of the faulty processing board is informed to the operating system. A new interrupt master processing board succeeds the interrupt vector of the faulty processing board and receives a new interruption.

In case of the above example, the processing board 125(2) becomes a new interrupt master processing board. The interrupt vector =1 is reassigned to the new interrupt master processing board 125(2), so that the processing board 125(2) receives the I/O interruptions transmitted through the system bus 141.

The operating system is informed of the reassignment of the interrupt vector. Then, the operating system flushes the cache memory of the faulty processing board (ST103). By flushing the cache memory, the data stored in the cache memory is copied back to the main memory, thus a coherency of the cache memory in the system is guaranteed. After flushing the cache memories, the swap lamp is turned on (ST104). The processing board is swapped after recognizing the light of the swap lamp.

When the new processing board is set normally into the slot after inserting the processing board, the processing board turns the run lamp 601a on and does the self diagnosis. If the self diagnosis results in normal, the result is informed to the operating system. The operating system starts distributing a new process to the new processing board. Thus, the execution of the process starts by the configuration which is the same with the original status (ST105).

FIG. 30 shows a flow of fault recovery procedure of the interrupt slave processing board.

The operating system is informed of a fault and suspends registering a new process in the process queue of the faulty processing board similarly to the case of the interrupt master processing board (ST100).

The operating system excludes the process queue of the faulty processing board from scheduling the I/O interruptions (ST100). The operating system has an interruption scheduler for distributing the I/O interruptions, which are received by the interrupt master processing board, to the empty process queue of the interrupt slave processing board. The scheduler excludes the faulty interrupt slave processing board from distributing the I/O interruptions.

The faulty processing board executes the process already registered in the process queue. The operating system registers further processes, which are to be executed by the faulty processing board, to the process queue of one or a plurality of other processing boards which operate simultaneously (ST101).

Then, the faulty processing board flushes its own cache memory (ST103). After flushing, the swap lamp is turned on (ST104). The operator swaps the processing boards by recognizing the light of the swap lamp. The new processing board turns the run lamp 601a on, which indicates normal setting of the processing board to the slot, executes self diagnosis, and informs of the self diagnostic result to the operating system. The operating system starts distributing a new process to the new processing board. In this way, the system starts the execution of the process by the original configuration again.

The fault recovery procedure of the interrupt slave processing board differs from the fault recovery procedure of the interrupt master processing board, described above, in the following manner. In case of the interrupt slave processing board, the interrupt vector does not need to be reassigned as the case of the interrupt master processing board. Concerning the hardware of the processing board, the interrupt master processing board includes the function of the interrupt slave processing board, so that the interrupt master processing board can be used for all processing boards of the system. In other words, an interrupt master processing board can be used as an interrupt slave processing board.

FIGS. 31 and 32 show flows of fault recovery procedure of the above interrupt master processing board and the interrupt slave processing board respectively.

In these cases, it is assumed that N processing boards are operating originally in the system. FIG. 31 shows a flow of the fault recovery procedure of the interrupt master processing board. The processing boards are swapped at the last step in the above described case as shown in FIG. 29. In FIG. 31, a new processing board is inserted in an earlier step (ST131), a new process is distributed to the new processing board, and then the process of the faulty processing board is succeeded by the normal processing boards (ST133–ST104). At the last step, the faulty processing board is removed (ST134).

FIG. 32 shows a flow of the fault recovery procedure of the interrupt slave processing board.

The procedure shown in FIG. 32 has an aspect similar to the procedure shown in FIG. 31. When a fault occurs, a new processing board is inserted at the earlier step (ST131), a new process is distributed to the new processing board (ST132), and then the process scheduled to the faulty processing board is succeeded by the other processing boards (ST140–ST104). At the last step, the faulty processing board is removed (ST134).

As shown in FIGS. 31 and 32, the system originally operated with N processing boards becomes operated with N+1 processing boards, so that the load can be dispersed. In this way, the processing boards can be swapped without lowering the system throughput because the faulty processing board is removed while the load is dispersed.

In the above example, the interrupt master processing board and the interrupt slave processing board exist in the system to receive the I/O interruptions in the multi-processor configuration. But, for another example, there is a system in which all processing boards can receive I/O interruptions commonly without having master-slave relation. The case, in which all the I/O interruptions are received by the processing boards commonly in the multi-processor configuration, is explained below. In this case, the interrupt vector is used for identifying the I/O interruption and one of the processing boards receives the I/O interruption by recognizing the interrupt vector.

This type of the processing board is called "interrupt multicast processing board" and is explained below. The interrupt multicast processing board Identifies the interrupt vector placed in the I/O interruption and judges whether or not the I/O interruption is to the own processing board. If the I/O interruption is to the own processing board, the processing board executes the process of the I/O interruption. If the I/O interruption is not to the own processing board, the I/O interruption is ignored by the processing board. The fault recovery procedure is essentially the same with the above interrupt slave processing board. Namely, the flow of the fault recovery procedure of the interrupt slave processing board shown in FIG. 30 can be used for the fault recovery procedure of the interrupt multicast processing board.

In the same way, another example of the fault recovery procedure of the interrupt slave processing board shown in FIG. 32 can be also used for the fault recovery procedure of the interrupt multicast processing board.

The recovery procedures shown in FIGS. 30 and 32 have been described above and are not explained here.

FIGS. 33–36 show the operation of the process queue. The following are some examples of the fault recovery procedure, in which the process of the faulty processing board is succeeded by other processing board.

The following succession of the process is applied to both of the above interrupt master processing board and the interrupt slave processing board. Thus, in the examples described below, the explanation is not divided into cases based on the types of the processing boards. In each figure, a process queues 500 is used and the number in parentheses "( )" shows the number of the process queue.

FIG. 33 shows a typical example 1 of succession of the process.

The process scheduler of the operating system executes succession of the process. A new process is suspended registering in the faulty processing board, and the process, which has not registered in the process queue yet, but is to be scheduled to the faulty processing board, is re-scheduled to other processing boards. The faulty processing board executes all the registered processes of the process queue 500(1) (the process up to that indicated by an arrow 510). In this example, the faulty processing board 125(1) executes "process a" and "process d" which are already registered in the process queue 500(1) and the process scheduler distributes "process h" and "process i", which are to be executed by the faulty processing board afterwards, to the process queues 500(2) . . . 500(n+1) of other processing boards.

FIG. 34 shows another example 2 of succession.

In this example, the operating system suspends registering a new process to the process queue of the faulty processing board and schedules the processes already registered in the process queue 500(1) of the faulty processing board to the process queue of other processing boards. As shown in the figure, the faulty processing board distributes "process a" and "process d", which are already registered in the process queue 500(1), to the process queues 500(2) . . . 500(n+1) of other processing boards.

As described above, in this example 2, the processes, which are already registered in the faulty processing board, are scheduled to other processing boards, but the process currently under execution by the faulty processing board is not scheduled to other processing boards. That is, the faulty processing board continues to execute the process being currently executed by the processing board to complete it. The registered processes are distributed to other processing boards in this example, so that the faulty processing board can stop the operation earlier than the faulty processing board in the above example 1.

FIG. 35 shows another example 3 of the succession.

In this example, the operating system suspends registering a new process in the faulty processing board, and the process, which is already registered in the faulty processing board 125(1), is distributed to a specific processing board. The process, which is already registered in the succeeding specific processing board, is also distributed to another processing board.

Succession with multiple steps as described above can be executed by presetting the succeeding condition in the operating system. For example, the operating system may be preset so that the process registered in the process queue 500(1) is succeeded by the process queue 500(2) and the process registered in the process queue 500(2) is succeeded by the process queue 500(n+1). As shown in FIG. 35, "process a", "process d", "process g" and "process h" already registered in the process queue 500(1) are succeeded by the process queue 500(2) and "process b" registered in the process queue 500(2) is succeeded to the process queue 500(n+1). As a result, the processes registered in the process queue 500(1) are succeeded by the process queue 500(2).

This succession with multiple steps is effective when the processes, which are already distributed to the faulty processing board, are not desired to be executed by a plurality of processing boards. For example, when a plurality of the processes are desired to be executed by one processing board sequentially for getting a more definite real-time response, the succession of this example is effective.

FIG. 36 shows another example 4 of the succession.

In this example, the operating system distributes the processes registered in the faulty processing board 125(1) to a plurality of specific processing boards. As a different aspect from the above example 3, only the processes of the faulty processing board are succeeded by specific processing boards, but the processes registered in the succeeding specific processing boards are not succeeded by other process queues of the processing boards.

This succession can also be done by presetting succeeding condition in the operating system. A processing board, by which the process of the faulty processing board is succeeded, is specified in the operating system. This example of succession of the process is effective when the processing board, by which the process is succeeded, is desired to be defined.

In the above examples 3 and 4, the processes registered in the faulty processing board are succeeded by other processing boards. But, the registered process of the faulty processing board can be executed by the faulty processing board, and the processes, which are to be registered and executed afterwards by the faulty processing board, can be succeeded by other processing boards as well as the example 1.

As described above, the faulty processing board executes the succession cooperated with the operating system. The faulty processing board and the operating system do not suspend to continue the execution of the process and make the process succeeded by other processing boards without any influence of the other executions of the processes in the normal processing boards. The faulty processing board is swapped for a new processing board afterwards.

FIG. 37 shows another example of succession of the process using a process queue of different type.

In the above examples 1–4, each processing board has each process queue. But, in this example, a system has only one process queue 500 in common.

The process queue 500 controls processes executed by each processing board. The process to be executed by each processing board is decided and distributed by the process queue sequentially as soon as the process of the processing board is completed. This process queue is configured as FIFO, so that the process registered first is executed first.

By this configuration, there does not exist the process already registered in the process queue of the faulty processing board, and the process to be executed by the faulty processing board (for example, "process a" and "process d" in FIG. 33). Thus, as shown in FIG. 37, the processes are taken from the process queue and executed sequentially by the processing board which becomes ready.

The faulty processing board informs the operating system of the fault. The operating system suspends scheduling a new process to the faulty processing board from the process queue and the new process is scheduled to another processing board. For example, under the condition that the processes are finished in turn and new process is distributed from the processing boards 125(1) - 125(2) - 125(3) - 125(4) to 125(5) in order, it is assumed that "process a" is executed by the processing board 125(1), "process b" is executed by the processing board 125(2), "process c" is executed by the processing board 125(3), and "process d" is executed by the processing board 125(4). When the processing board 125(1) becomes faulty, "process a" is executed by the processing board 125(2), "process b" is executed by the processing board 125(3), "process c" is executed by the processing board 125(4) and "process d" is executed by the processing board 125(5).

In this example, only one process queue exists for a plurality of the processing boards and the processing board does not have the process already registered, so that succession of the process is not needed for fault recovery process of the processing board.

In this example, there exists only one process queue, so that the process queue is easy to control. Succession of the process is not needed even if the processing board becomes faulty. The load is not increased in the faulty processing board and the operating system.

As has been described, in this example, in a reliable computer, which includes the system bus, the main memory connected with the system bus, and a plurality of the processing boards connected with the system bus, the processing board has at least n (n>=3) processing units having cache memory and executing the same instructions. If one of the processing units becomes faulty, the other processing units continue to execute the same instructions, and then the processes of the processing board having the faulty processing unit are succeeded by the plurality of other processing boards operating simultaneously.

The operating system is informed of the fault. Thus, the operating system suspends distributing a new process to the faulty processing board at the management timing point. After all the registered processes are executed and finished, the faulty processing board stops operation.

Then, the faulty processing unit is swapped, and the configuration returns to the original status.

In this embodiment, the faulty processing board generates the interruption for informing of the fault. The processing board changes its interrupt vector for receiving the I/O interruption, so that the interrupt vector is reassigned to the other processing board according to the predetermined priority.

The above processing board has the run lamp, the fault lamp, and the swap lamp, so that the operating status is informed to the operator. In case of a fault, the fault is informed to the operator. The processes of the faulty processing board are succeeded by other processing boards, and the swappable status of the processing board is informed to the operator after reassigning the Interrupt vector for receiving the I/O interruption.

As has been described, in this embodiment, the faulty processing board continues to execute the process already being executed, and the processes, which are to be distributed to the faulty processing board, are succeeded in other processing boards, so that system fault caused by the primary fault and the secondary fault can be minimized. The reliability of the system is thus improved.

The process is succeeded by other processing board automatically without suspending the executions of the process of the processing boards, so that a special check mechanism working at a check point is not needed. The process is succeeded by a process unit, the process already being executed by the faulty processing board does not need to re-execute from the beginning of the process.

In this embodiment, in a reliable computer, which includes the system bus, the main memory connected with the system bus, and a plurality of processing boards, connected with the system bus, having n (n>=3) processing units for executing the same instructions, one processing board is added and N+1 processing boards usually execute the process for N processing boards. When one of the processing boards becomes faulty, the rest of the configuration, except the faulty processing board, continues execution of the process, and then the process is succeeded by the other N processing boards.

In this way, N+1 processing boards usually execute the process for N processing boards as a system, and succeeding the process is done with the load dispersion of N processing boards because N processing boards can succeed the process.

[Recovery method for a single processor]

EMBODIMENT 8

FIG. 38 shows a system configuration in case of a single processor (N=1). The processing board 125(1), the main memory 143, and the input/output bus adaptor 145 are connected with the system bus 141 similarly to the case shown in FIG. 28, and the number of the processing board is one. In this system, one processing board 125(1) usually executes the process. The processing board is installed in the slot of the chassis.

One processing board means N=1 in the above case of the multi-processor configuration, and the function of the processing board is the same with the above multi-processor configuration. The only aspects different from the case of the multi-processor will be described below.

The following is succeeding the process of the processing board in case of becoming faulty.

In the single processor, there is no processing board which succeeds the process. It is desired that a new processing board is inserted as soon as possible, the process of the faulty processing board is succeeded by the new processing board and the faulty processing board is removed.

FIG. 39 shows a flow of the succeeding procedure for a single processor.

For example, the processing board 125(1) becomes faulty. During the fault, the run lamp 601a and the fault lamp 601b remain on.

After being informed of the fault by the faulty processing board, the operating system judges the faulty status. In case of fixed fault, the faulty processing board continues the execution of the process until a new processing board is inserted (ST120).

Then, a new processing board 125(2) is inserted. After inserted, the processing board 125(2) turns the run lamp 601a for indicating the normal set of the processing board to the slot, does self diagnosis and informs the operating system of the self diagnostic result. The operating system starts distributing a new process to the new processing board 125(2) (ST121). Then, the operating system suspends registering a new process in the faulty processing board (ST100). The faulty processing board executes the process already registered in the process queue, and a new process is registered in the process queue of the new processing board by the operating system (ST101).

Then, the interrupt vector is reassigned to the new processing board (ST102).

After reassigning the interrupt vector, the faulty processing board informs of the reassignment to the operating system.

The new processing board succeeds the interrupt vector and starts to receive a new interruption.

The operating system flushes the cache memory of the faulty processing board (ST103). After flushing the cache memory, the faulty processing board turns the swap lamp on (ST104). The faulty processing board is removed after recognizing the light of the swap lamp (ST122). In this way, the faulty processing board 125(1) is swapped for the new processing board 125(2).

In the above embodiment, the fault recovery method is explained in case that a single processor (N=1) becomes faulty and a new processing board is added.

EMBODIMENT 9

Adding a new processing board can be applied to the fault recovery method of a multi-processor (N>=2) as well as a single processor (N=1). In the fault recovery method of the multi-processor, the procedure of adding a new processing board and swapping the faulty board for the new one is the same with the case of the single processor.

As described above, in Embodiments 8 and 9, N processing boards usually execute the process. When one of the processing boards becomes faulty, the rest of the configuration of the faulty processing board, except the faulty element, continues the execution of the process. Then, a new processing board is added and N+1 processing boards execute the process and the process registered in the faulty processing board are succeeded by the other N processing boards.

EMBODIMENT 10

FIG. 40 shows another system configuration for faulty recovery method of the single processor (N=1).

In the processing board, two processing boards are coupled as a pair. Normally, one of the processing boards executes the process. When the processing board executing the process becomes faulty, the configuration, except the faulty element, executes the process, and then a new process is immediately succeeded by the other one of the pair of processing boards.

Two processing boards $125p$, $125s$, the main memories 143, and the input/output bus adaptors 145 are connected with the system buses 141. Two processing boards make a pair and configure one logic processing board $125r$. Usually, one processing board $125p$ executes the process. The other processing board $125s$ executes the self diagnosis every certain period and keeps hot-stand-by status as a spare. During this status, any of indicating lamps $601a$, $601b$ and $601c$ of the spare processing board $125s$ is not lit.

The following is the succeeding procedure of the process of the faulty processing board $125r$.

In FIG. 40, one processing board $125p$ of the logic processing board $125r$ is faulty and the rest of the configuration of the processing board, except the faulty element, continues operating. During this status, the faulty processing board $125p$ lights the run lamp $601a$ and the fault lamp $601b$.

The fault of the processing board $125p$ is informed to the operating system. If the operating system judges the faulty status as a fixed one, succeeding procedure is started.

The succeeding procedure starts at the timing of switching the processes. The processes, which are to be distributed to the faulty processing board, are succeeded by the spare normal processing board $125s$.

After succeeding the processes, the spare processing board $125s$ starts executing the processes which were registered in the faulty processing board $125p$. The spare processing board turns the run lamp on by this succession. A series of these operations can be executed without suspending the operation of the system or lowering the system throughput.

As soon as the succeeding procedure has finished, the faulty processing board $125p$ attains swappable status and turns the swap lamp $601c$ on. Then, the faulty processing board is swapped, and the configuration returns to the normal status. The processing board $125p$ can be swapped under the hot-line status, so that the swapping operation does not influence the system operation.

FIG. 41 shows a flow of the procedure from succeeding the process until swapping the board.

First, the operating system transmits the data stored in the faulty processing board $125p$ to the main memory at a timing point such as switching the processes (ST200). The spare processing board $125s$ sequentially receives the data from the main memory (ST201). Then, the faulty processing board flushes the cache memory (ST202). After flushing the cache memory, the I/O interrupt vector is reassigned to the spare processing board $125s$ (ST203). The spare processing board $125s$ succeeds the interrupt vector and starts executing the process. The faulty processing board turns the swap lamp $601c$ on (ST204). Then, the operator swaps the processing boards by recognizing the light of the swap lamp $601c$.

As has been described, in the above embodiment, in a reliable computer, which includes the system bus, the main memory connected with the system bus, two processing boards, each of which has a plurality of processing units, make a pair as a logic processing board. One of the processing boards usually executes the process. When the processing board becomes faulty, the rest of the configuration of the processing board, except the faulty element, continues executing the process, and then, the process is succeeded by the other processing board.

The processing board transmits/receives the succeeding data, flushes the cache memory and exchanges/moves the I/O interrupt vector to the other processing board.

The run lamp, the fault lamp, and the swap lamp are provided for informing the operator of the operating status of the processing board. When the processing board becomes faulty, the fault is informed to the operator.

Then, the process is succeeded by the other processing board. After the I/O interrupt vector is reassigned, swappable status of the processing board is informed to the operator.

EMBODIMENT 11

In the following case, multiplexed system is configured by a plurality of majority units on one processing board.

In this embodiment, one processing board includes n (n>=3) processing units and a plurality of majority circuits for receiving the results of the processing units. A plurality of independent systems can exist in one processing board and execute processes respectively and independently based on each majority circuit. For example, when one of three processing units becomes faulty, the other processing units continue executing the process and each of the plurality of independent systems configured by majority units continue executing the processes respectively and independently. And when the process of the faulty processing board having a plurality of independent systems is succeeded by another processing board having a plurality of independent systems, the processes of the plurality of independent systems are succeeded by corresponding independent systems of another processing boards.

Another case can be considered that the fault of the majority circuit causes the fault of one independent system in one processing board. In this case, the other independent systems continue executing the process, and then, the process is succeeded by other plurality of the processing boards. When one of the independent systems becomes faulty in the processing board, the faulty independent system is disconnected in the processing board, and the other systems continue executing the process. Then, the faulty system is connected again so that the configuration returns to the status before becoming faulty.

As described above, in this embodiment, a processing board includes a plurality of independent systems having n (n>=3) processing units for executing the same instructions, the majority unit for selecting one of the processing units, the processor bus for connecting the majority unit to all processing units, and the buses for controlling input/output interface to/from the outside connected to the majority unit. When one of the processing units becomes faulty, the other processing units continue executing the process and then the process is succeeded by other plurality of processing boards.

A plurality of the independent systems in one processing board usually execute the processes simultaneously and independently. When one of the independent systems becomes faulty, the other independent systems continue executing the process, and then, the process is succeeded to other plurality of the processing boards.

When one of the independent systems becomes faulty in one processing board, the system is disconnected, and the other independent systems continue executing the process. Then, the faulty system is connected again so that the configuration returns to the status before becoming faulty.

As explained above, the fault recovery procedure is essentially the same with the above embodiment and can be applied to the case in which a plurality of the independent systems exist in one processing board and execute the processes independently.

As has been explained, in case of both multi-processor system and single processor system, the process of the faulty processing board is succeeded in cooperation with the operating system. The process of the faulty processing board can be succeeded by a new processing board or a spare processing board and the faulty processing board can be removed and a new spare processing board is inserted without suspending executing the process.

III. Fault recovery method of a processing unit

EMBODIMENT 12

The following is another recovery method of a faulty processing unit.

This method enables the swapping of not only the processing boards, but also the processing units mounted on the processing board. In this way, the method reduces repair cost by swapping the processing units as a unit as well as swapping the processing boards.

A processing board 125 mounts three processing units. When one of the processing units of the processing board 125 becomes faulty, only the faulty processing unit is swapped, and the process is not succeeded by other processing boards. In case of the fault of the processing unit, a swap lamp is not lit, but a daughter board swap lamp is lit on. The other operation is the same with the above embodiment.

FIG. 42 shows the above processing board having three processing units 1-1, 1-2 and 1-3.

Each of daughter boards 700-1, 700-2 and 700-3 has each of processing units 1-1, 1-2 and 1-3. Daughter board swap lamps 800-1, 800-2 and 800-3 indicate swappable status of each daughter board. Daughter board insert/remove hot swap switches 801-1, 801-2 and 801-3 are provided for each of the daughter boards. The functions of switches are the same with the insert/remove hot swap switch 602 except that they are for the daughter boards. The daughter boards 700-1, 700-2 and 700-3 are connected with the processing board by connecters. When one of the processing units 1-1, 1-2 and 1-3 becomes faulty, the daughter board including the faulty processing unit is swapped.

The following is swapping operation of the daughter boards.

In case of the fault, the daughter boards 700-1, 700-2 and 700-3 can be swapped under hot-line status during the daughter boards (processing units) except the faulty daughter board operate. The daughter board to be swapped is indicated by one of the daughter board swap lamps 800-1, 800-2 and 800-3. After recognizing the lamp as being lit, the faulty daughter board, i.e., one of 700-1, 700-2 and 700-3, is swapped.

The operation after inserting the new daughter board is the same with the operation of recovery procedure of the faulty processing unit described in Embodiment 1 of "I. Basic operation of the processing board". The recovery procedure is executed based on the instructions of the operating system. When the daughter board is inserted, an interruption is generated to inform the operating system of inserting the daughter board. If the interruption is judged as the information of inserting the daughter board by the operating system, the above recovery procedure is executed. That is, the operating system makes the daughter board execute self diagnosis in isolated mode. After the self diagnosis results in normal, the processing unit of the inserted daughter board is synchronized with the other normal processing units by the same clock.

The daughter boards can be swapped by the daughter board insert/remove hot swap switches for maintenance purpose, etc. The removing request from the daughter board insert/remove hot swap switches 801-1, 801-2 and 801-3 are informed to the operating system. Thus, the operating system disconnects the processing unit and lights the daughter board swap lamps 800-1, 800-2 and 800-3.

In this way, the faulty processing unit can be swapped by the faulty recovery operation of the operating system without suspending the execution of the process.

As described above, in this embodiment, in the processing board having n (n>=3) removable processing units for executing the same instructions, even if one of the processing units becomes faulty, the other processing units continue executing the same instructions.

The daughter board swap lamp is provided with the processing board. The faulty processing unit informs the operator of the swappable status of the daughter board by the daughter board swap lamp, and the faulty processing unit is swapped as a repair unit.

An inform mechanism for informing of removing request of the processing unit and a detect mechanism for detecting the removing request are provided. When the removing request is detected, the faulty processing unit is removed from the other processing units. After removing, the swappable status of the processing unit is informed to the operator. The unit is swapped for a new processing unit, and the normal status is informed to the operator. When the processing unit has finished the self diagnosis, the result is informed to the operating system, and the configuration returns to the normal status, i.e., the status before it became faulty, by the operating system.

The process, which is to be executed by the faulty processing board, is succeeded to another processing board executing another process, and then, the processing board having the faulty processing unit is removed. The processing board is inserted again after the faulty processing unit is swapped, and the configuration returns to the status it had before becoming faulty.

By this embodiment, a faulty unit can be swapped as well as a faulty processing board, and thus, it costs less to swap a faulty unit than the case of swapping faulty board.

As described above, according to these embodiments, in case of transient fault of a processing unit, the faulty unit can be resynchronized with the other normal processing units. The processing board including the faulty processing unit does not need to be swapped and the configuration can return to the original status immediately. In case of a fixed fault, this invention provides easier and faster fault recovery because the process succeeded by a process unit after continuing the execution of the process.

The faulty processing unit is disconnected and made to execute self diagnostics. If the self diagnostic result shows the fault is transient, the faulty processing unit can be connected to operate normally again.

If the fault of the processing board is permanent, the process, which is being executed by the faulty processing board, can continue the execution to the end of the process, and then a new process is succeeded by another processing board.

After succeeding the process scheduled to the faulty processing board by another processing board, the faulty processing board is removed, the faulty processing unit is swapped, and the processing board is inserted again. It costs less to swap only the fault processing unit, so that this can reduce the cost for the fault recovery.

The faulty processing unit is swapped while the faulty processing board executes the process. The processing board can continue to execute the process even while the fault recovery procedure is executed, so that the system throughput is not reduced. And fault recovery will cost less because the faulty element can be swapped and the fault recovery can be done by exchanging a processing unit.

Even if the processing unit becomes faulty, continuous processing can be done because of multiplexed majority circuits. Then, the process scheduled to the faulty processing board is succeeded by another processing board. In the processing board having a plurality of independent systems, even if one of the processing units becomes faulty, the process being executed can continue execution, and the unexecuted process can be succeeded by another normal processing unit.

When one of the independent systems becomes faulty, the process is executed by the normal independent systems, and then the process scheduled to the faulty system is succeeded by another processing board. Therefore, in the processing board having a plurality of independent systems, even if one of the independent systems becomes faulty, the process being executed can continue execution by other independent system and the new process can be succeeded by another normal independent system.

Further, two processing boards make a pair, so that the process can be succeeded even when one of the processing boards becomes faulty, and the system performance is not reduced.

Further, the faulty processing board stops the operation of the faulty processing board after executing the scheduled process. The scheduled process does not need to be distributed to another processing board, so that the load of the operating system can be reduced.

Further, a new process is scheduled to another normal processing board. Succession of the process can be done in a simple way by suspending the distribution of a new process to the faulty processing board.

Further, the faulty processing board stops the operation after finishing the process being executed. The recovery procedure of the faulty processing board is simplified, so that the reliability of the system can be improved.

Further, the process already scheduled to the faulty processing board is rescheduled to another processing board, so that the faulty processing board can stop its operation soon.

Further, in case of the above rescheduling the process, the process is rescheduled to a specific processing board, and the succession of the process can have a priority.

Further, the process already distributed to the above specific processing board can also be distributed to another processing board, so that inclination of scheduling the process to the specific processing board can be prevented.

Further, an improper removal of the processing board can be prevented because the removable status of the processing board is informed to the operator.

Further, an improper swap of the processing unit can be prevented because the swappable status of the processing unit is informed to the operator.

Further, a newly swapped processing unit can start operating after being confirmed to be normal based on the self diagnostic result.

Further, the processing board has an identifier for identifying the faulty processing board from the other normal processing boards, and the process can be succeeded only by changing the identifier.

Further, the identifier is an interrupt vector for receiving I/O interruption, and the interrupt vector of the faulty processing board is reassigned to another normal processing board, so that the process can be succeeded without changing the I/O interruption.

Further, two processing boards are coupled as a pair of logic processing boards. The data of the faulty processing board is succeeded through the main memory, and the interrupt vector of the faulty processing board is reassigned to the other one of the pair of the processing boards, so that the process can be easily succeeded.

Further, N+1 processing boards are provided for the processing amount of N processing boards. Even if one of the processing boards becomes faulty, the execution of the process can be continued without any influence to the system throughput.

Further, when the processing board becomes faulty, a new processing board is inserted, and then, the faulty processing board is removed. More than N processing boards always operate not to reduce the system throughput.

Further, each of the processing units mounted on the processing board can be removed independently regardless of a fault, so that the processing unit can be swapped at any time.

Further, the processing board can be removed regardless of a fault, so that the processing board can be swapped at any time.

Further, the proper recovery of the faulty processing board can be done by providing the concrete procedure for swapping the processing boards.

Further, the faulty processing board can be swapped properly by providing the fault recovery method for the faulty interrupt master processing board, wherein the processing boards are swapped after the process of the faulty processing board is succeeded.

Further, the faulty interrupt slave processing board can be swapped properly by providing the fault recovery method for the faulty interrupt slave processing board, in which the processing boards are swapped after the process of the faulty processing board is succeeded.

Further, the faulty interrupt master processing board can be swapped properly by providing the fault recovery method for faulty interrupt master processing board, which succeeds the process after a new processing board is inserted, and the faulty processing board is removed at the last step, so that the system throughput does not go down.

Further, the faulty interrupt slave processing board can be swapped properly by providing the fault recovery method for faulty interrupt slave processing board, in which the process is succeeded after a new processing board is inserted and the faulty processing board is removed at the last step. By this method, a new processing board is inserted at an earlier step, so that the processing board can be swapped without lowering the system throughput.

Further, the fault recovery method for a computer having a process queue for a plurality of the processing boards is provided, in which there is no process to be succeeded to another processing board when one of the processing board becomes faulty. An easier fault recovery can be done without rescheduling the process, which is already scheduled to the faulty processing unit.

Further, the interrupt multicast processing board can be swapped properly by providing the fault recovery method for interrupt multicast processing board, in which the processing boards are swapped after the process of the faulty processing board is succeeded.

Further, the faulty interrupt multicast processing board can be swapped properly by providing the fault recovery method for interrupt multicast processing board, which succeeds the process after a new processing board is inserted, and the faulty processing board is removed at the last step. The faulty processing board can be swapped without lowering the system throughput because a new board is inserted at an earlier step.

Further, the cache memory of the faulty processing board is flushed, so that the system can be recovered from the faulty status with keeping the coherence of the data.

The present invention has been described in connection with a number of specific embodiments thereof. Numerous extensions, modifications, and variations obvious to those skills in the art are also contemplated by the invention. Thus, the above description is given by way of example, only, and the present invention is not to be limited thereby, but to be limited only by the scope of the appended claims.

What is claimed is:

1. A processing board including a clock signal, the processing board for connecting to at least one system bus, the processing board comprising:

a single clock circuit supplying the clock signal;

at least three processing units, each processing unit connected to receive the clock signal and operating synchronous with the clock signal, each processing unit receiving and executing same instructions, each processing unit including a processor and each processing unit including a cache memory coupled to the processor of the processing unit, each processing unit having an output signal carrying outputs from the processor and the cache memory;

a majority unit having an input connected to each processing unit and an output connected to the system bus that receives the output signal from each processing unit, and provides a selected output signal to the system bus, the majority unit further having a control register connected to receive the selected output signal and to be written thereby with a value controlling connection status, isolation status and interrupt status for all of the processing units; and a processor bus connecting each processing unit to the majority unit;

wherein all elements are included on a single processing board.

2. The processing board of claim 1, wherein the majority unit is duplicated.

3. The processing board of claim 1, wherein the majority unit comprises:

(a) a majority circuit for comparing signals from the processing units and selecting one signal as a majority signal; and (b) a function circuit for interfacing the majority signal selected by the majority circuit with the external units.

4. The processing board of claim 3, wherein the majority circuit further comprises a freeze circuit for responding with response signals to the processing units when the function circuit is ready to receive a next majority signal from the majority circuit.

5. The processing board of claim 4, wherein the majority circuit comprises:

(a) compare means for receiving a first plurality of x signals from the processing units as input signals, and for creating a second plurality of signal combinations of y ($x>y>=2$) input signals, and for comparing the y input signals in each of the signal combinations to form a comparison result; and (b) select means for receiving the x input signals and selecting one input signal as the majority signal based on the comparison result of the compare means.

6. The processing board of claim 5, wherein the majority circuit further comprises error recognition means for recognizing an existence of a faulty processing unit among the processing units based on the comparison result of the compare means.

7. The processing board of claim 5, wherein each input signal has n bits, and the compare means comprises a first plurality of comparison circuits, corresponding to the combinations of the y input signals, each of which compares corresponding bits of the y input signals for detecting a correspondence of the y input signals and outputs a partial comparison result showing the correspondence of the y input signals.

8. The processing board of claim 4, wherein the freeze circuit comprises:

(a) error detect means for detecting a faulty processing unit based on the comparison result of the majority circuit;

(b) connect control means for not responding with the response signal to the faulty processing unit detected by the error detect means so that the execution of the instruction in the faulty processing unit is temporally suspended; and (c) notify means for notifying a detection of the faulty processing unit to other normal processing units.

9. The processing board of claim 8, wherein the freeze circuit further comprises isolate means for isolating one processing unit from other processing units for a single operation.

10. The processing board of claim 9, wherein the faulty processing unit has diagnose means for executing self diagnosis and memorizing the diagnosis result under the single operation by the isolate means, and wherein the normal processing units has analyze means for analyzing the diagnosis result memorized by the faulty processing unit.

11. The processing board of claim 10, further comprising synchronize means for synchronizing the faulty processing unit with the normal processing units based on an analysis result of the analyze means.

12. The processing board of claim 9, further comprising self diagnose means for diagnosing each processing unit in turn under the single operation by the isolate means when the processing board is reset.

13. The processing board of claim 10, wherein the freeze circuit further comprises diagnosis watch means for terminating the self diagnosis of the faulty processing unit by canceling the single operation under the isolate means when the self diagnosis is not completed in a predefined time.

14. The processing board of claim 10, having a memorize means for storing the diagnosis result in a memory space, wherein the function circuit comprises a check circuit for checking and limiting the memory space when the diagnose means writes the diagnosis result to the memorize means.

15. The processing board of claim 10, wherein the freeze circuit comprises diagnosis divide means for dividing the execution of the self diagnosis according to the diagnose means into a plurality of executions.

16. A recovery method for a processing board having at least three processing units each processing unit operating synchronous with a clock signal, receiving and executing same instructions, each processing unit having a processor and each processing unit having a cache memory coupled to the processor of the processing unit, the processing board having a majority unit, the majority unit coupled to each processing unit for selecting one processing unit of the at least three processing units and interfacing the one processing unit with external units, the majority unit further having a control register holding a value controlling connection and interrupt status of each of the processing units, the method comprising the steps of:

synchronizing all processing units to a single clock signal;

detecting in the majority unit a faulty processing unit;

generating a first control register value in which an interrupt flag and a connect flag, each corresponding to the faulty processing unit, have values to cause operation of the faulty processor to cease;

writing the first control register value to the control register causing operation of the detected faulty unit to cease;

generating a second control register value in which an isolate flag has a value to cause operation of a processing unit in isolation and in which the interrupt flag and the connect flag have values to cause operation of the faulty processing unit to occur;

writing the second control register value to the control register causing a self diagnosis test to execute in the faulty processing unit;

generating a third control register value in which interrupt flags and connect flags corresponding to each of the at least three processing units have values to cause a synchronous start of the at least three processing unit;

writing the third control register value to the control register causing the faulty processing unit to synchronize with other processing units.

17. The recovery method of claim 16, wherein the control register has a flag bit corresponding to each processing unit for connecting each processing unit to the external units, further comprising the step of:

setting a flag bit in the control register so as to suspend the operation of the faulty processing unit by disconnecting the faulty processing unit from the external units.

18. The recovery method of claim 16, wherein the control register has a flag bit for designating isolated operation of one of the processing units, further comprising the step of:

setting the flag bit in the control register so that the faulty processing unit operates alone to execute the self diagnosis.

19. The recovery method of claim 16, wherein the control register has a flag bit corresponding to each processing unit for connecting each processing unit to the external units, further comprising the step of setting the flag bit in the control register simultaneously so as to synchronize the faulty processing unit and the other processing units by designating the connection to the external units of the all processing units at the same time.

* * * * *